(12) United States Patent  (10) Patent No.: US 7,474,806 B2
Kondo et al.  (45) Date of Patent: Jan. 6, 2009

(54) INFORMATION PROCESSING APPARATUS

(75) Inventors: Tetsujiro Kondo, Tokyo (JP); Hideo Nakaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 11/588,648

(22) Filed: Oct. 27, 2006

(65) Prior Publication Data

US 2007/0247548 A1   Oct. 25, 2007

Related U.S. Application Data

(62) Division of application No. 09/980,130, filed as application No. PCT/JP01/02626 on Mar. 29, 2001, now Pat. No. 7,174,051.

(30) Foreign Application Priority Data

Mar. 30, 2000   (JP) .............................. 2000-093898

(51) Int. Cl.
   *G06K 9/62*   (2006.01)
   *G06K 9/32*   (2006.01)
   *H04N 9/74*   (2006.01)

(52) U.S. Cl. ................... 382/299; 382/224; 348/581

(58) Field of Classification Search .................. None
   See application file for complete search history.

(56) References Cited

U.S. PATENT DOCUMENTS 6,122,017 A   9/2000   Taubman ................... 348/620

6,625,333 B1   9/2003   Wang et al. ................. 382/300

FOREIGN PATENT DOCUMENTS

| JP | 5-300518 | 11/1993 |
|---|---|---|
| JP | 7-250344 | 9/1995 |
| JP | 9-37175 | 2/1997 |
| JP | 9-55962 | 2/1997 |
| JP | 10-56622 | 2/1998 |
| WO | 94/14278 | 6/1994 |
| WO | 96/07987 | 3/1996 |

*Primary Examiner*—Charles Kim
(74) *Attorney, Agent, or Firm*—Frommer Lawrence & Haug LLP; William S. Frommer; Thomas F. Presson

(57) ABSTRACT

A data processing apparatus is capable of executing a plurality of signal processes. The data processing apparatus switches processes of a pre-processing portion, a data processing portion, and a post-processing portion with a control signal supplied from a function controlling portion corresponding to a command supplied from the outside. Thus, the data processing apparatus executes for example processes for increasing the resolution, generating a picture dedicated for a right eye and a picture dedicated for a left eye, generating a luminance signal and color difference signals, changing the aspect ratio, generating pictures having difference resolutions, and converting the frame rate for input data corresponding to a request and outputs picture data generated as the processed result to an external device (for example, a displaying device and a record and reproduction device).

10 Claims, 42 Drawing Sheets

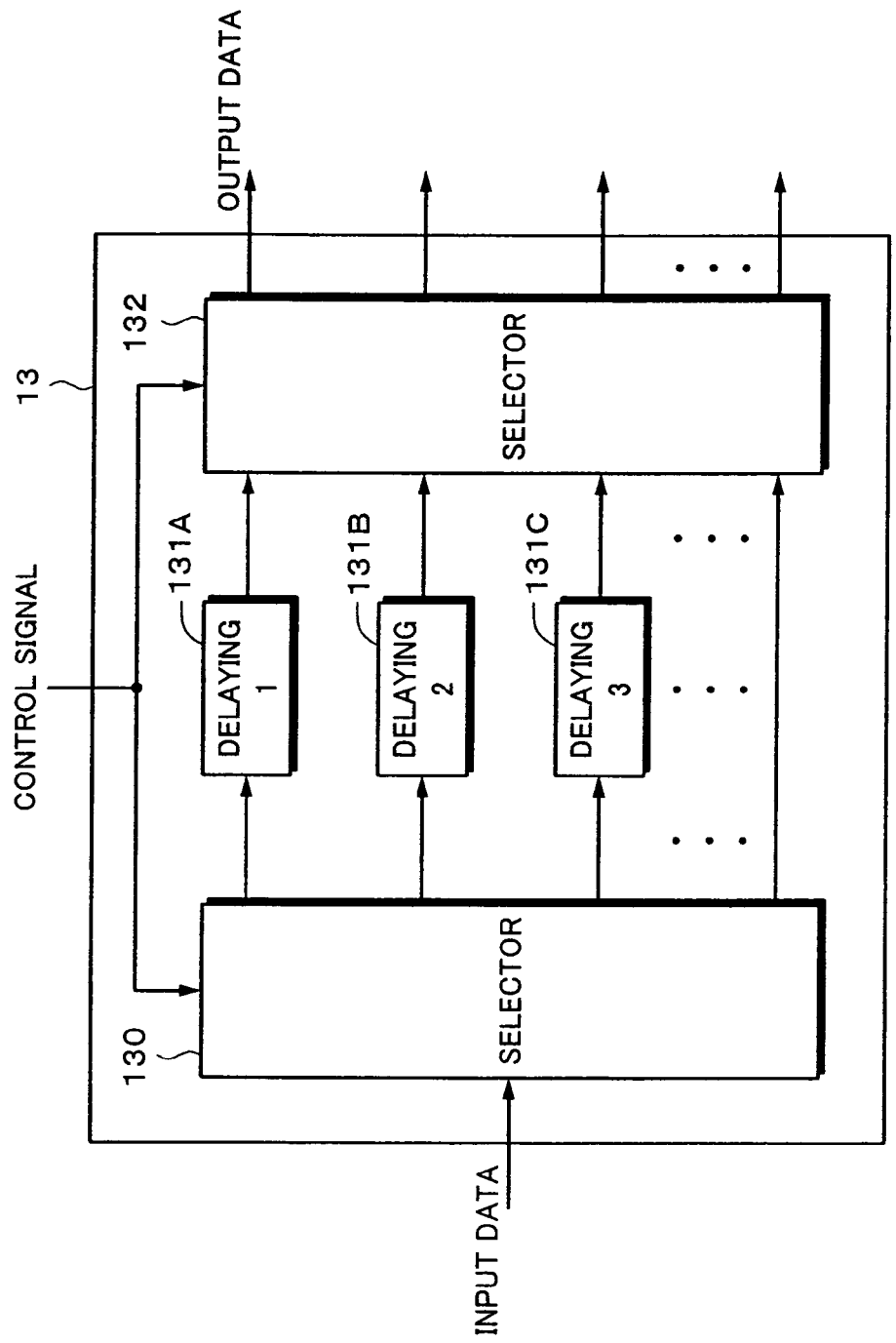

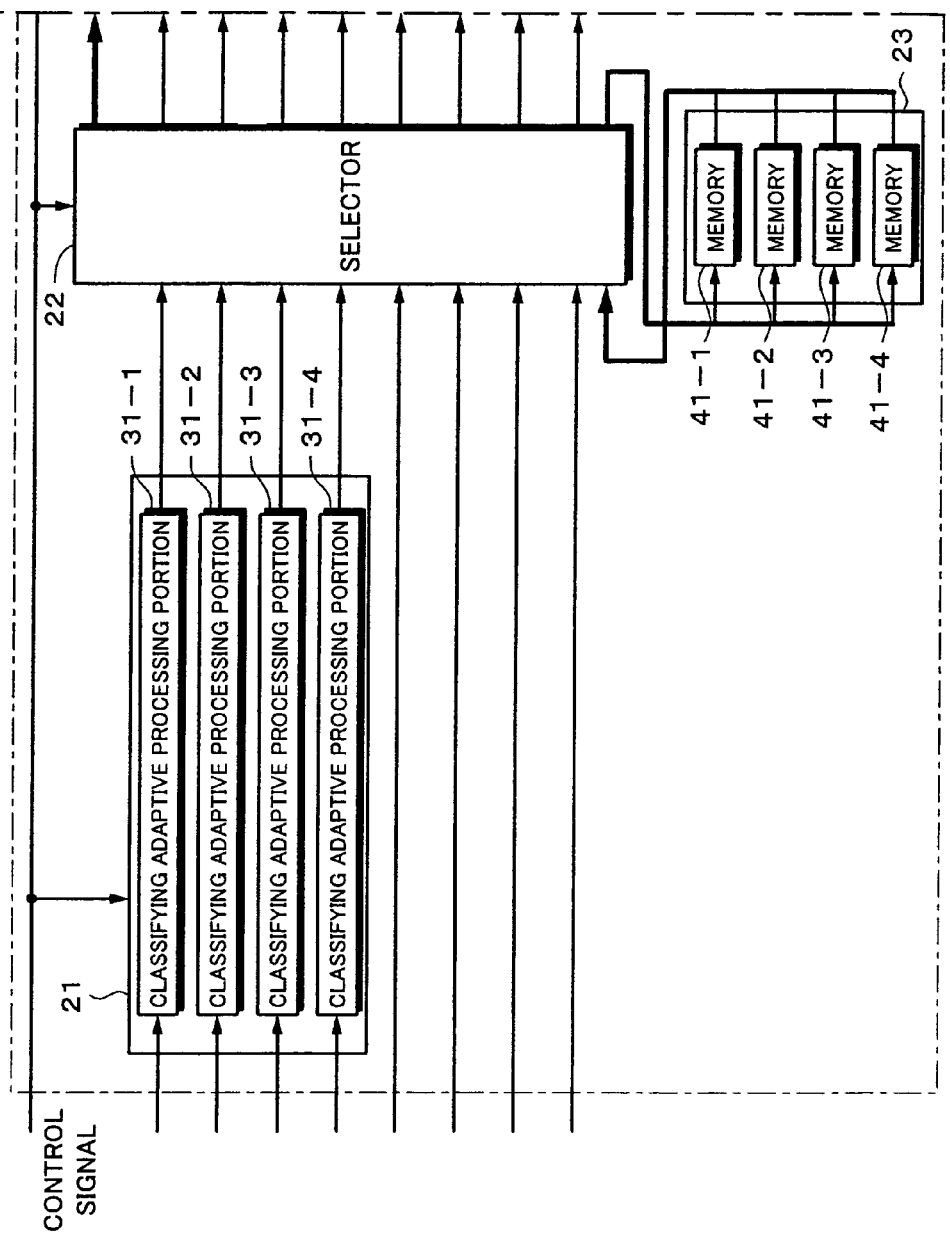

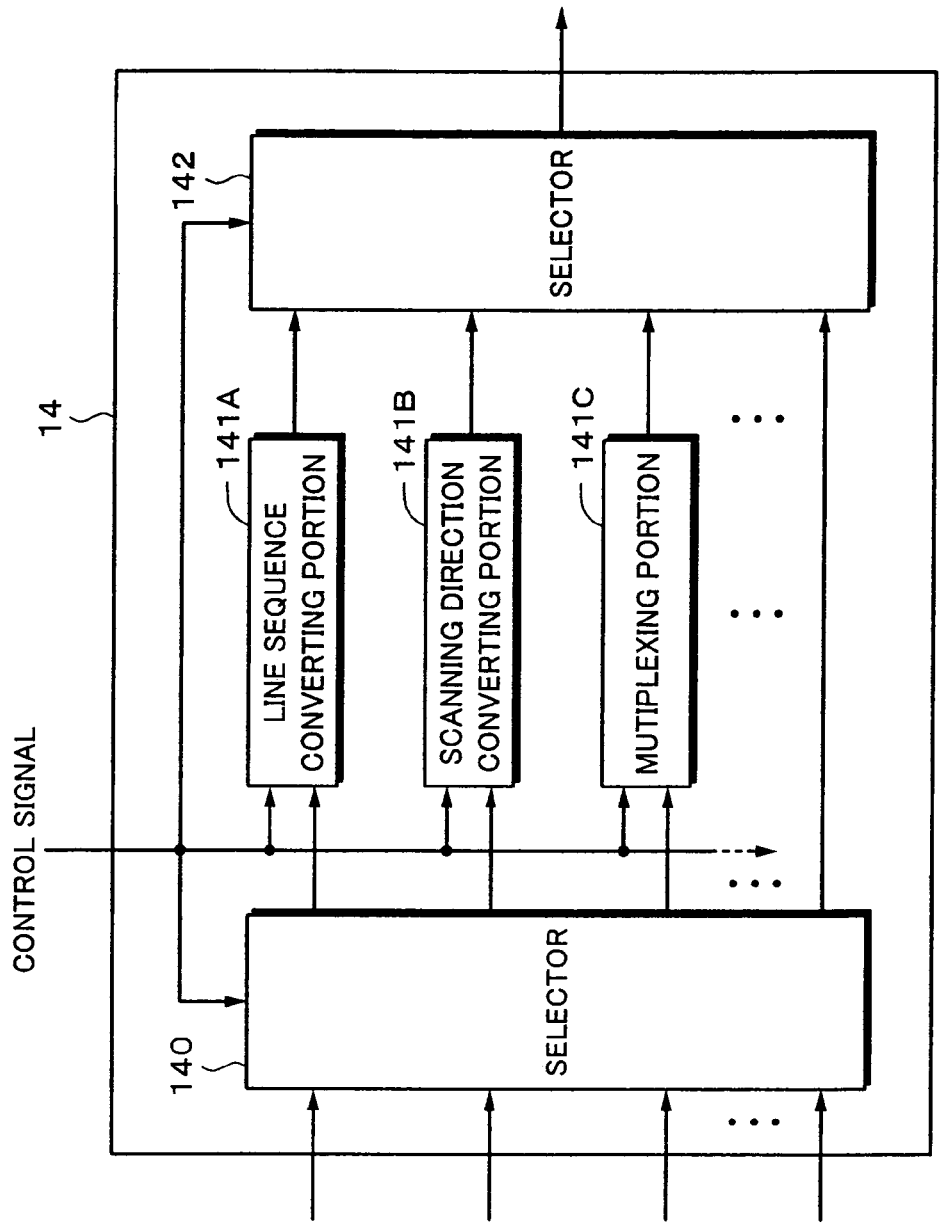

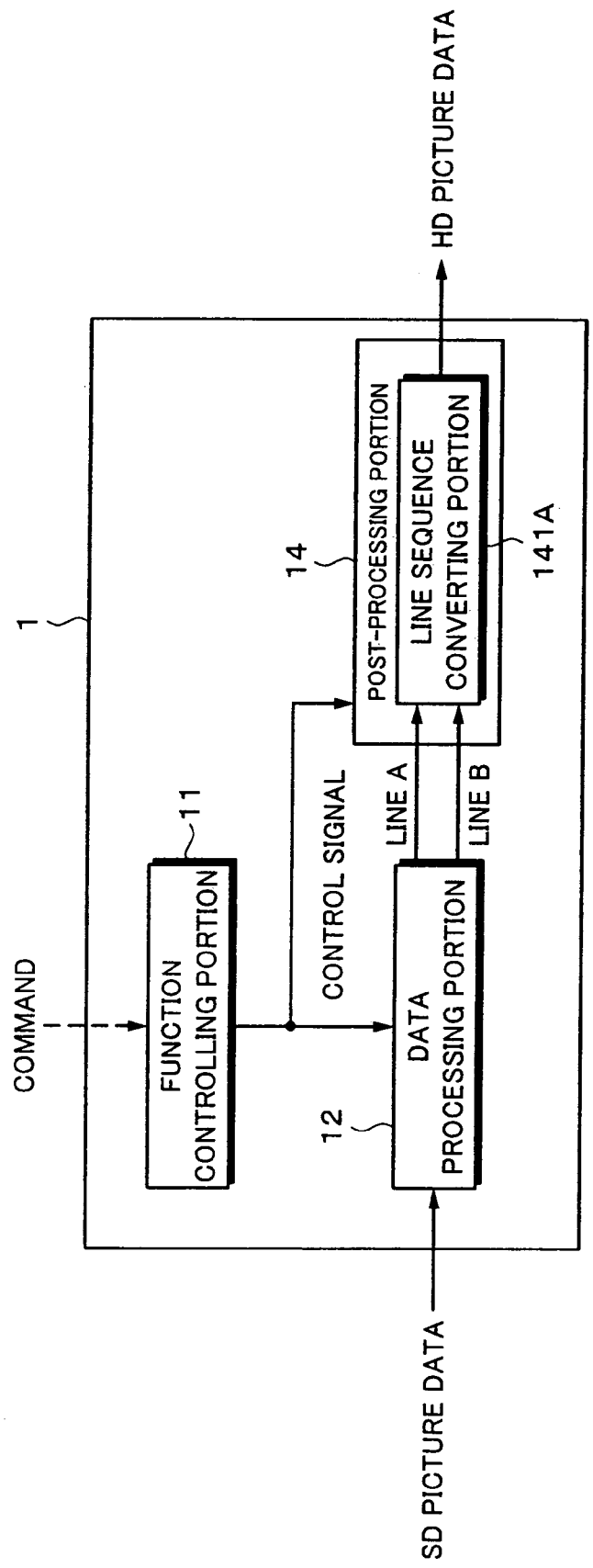

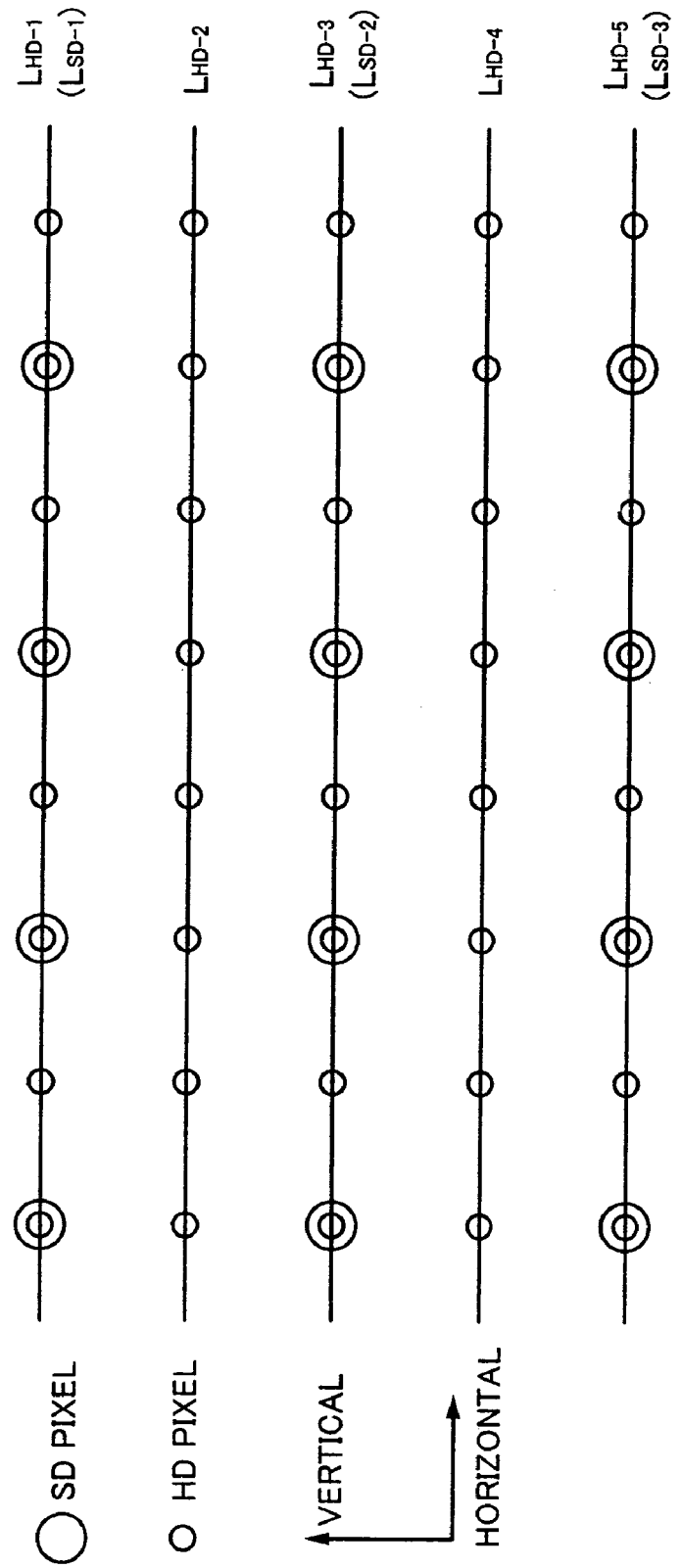

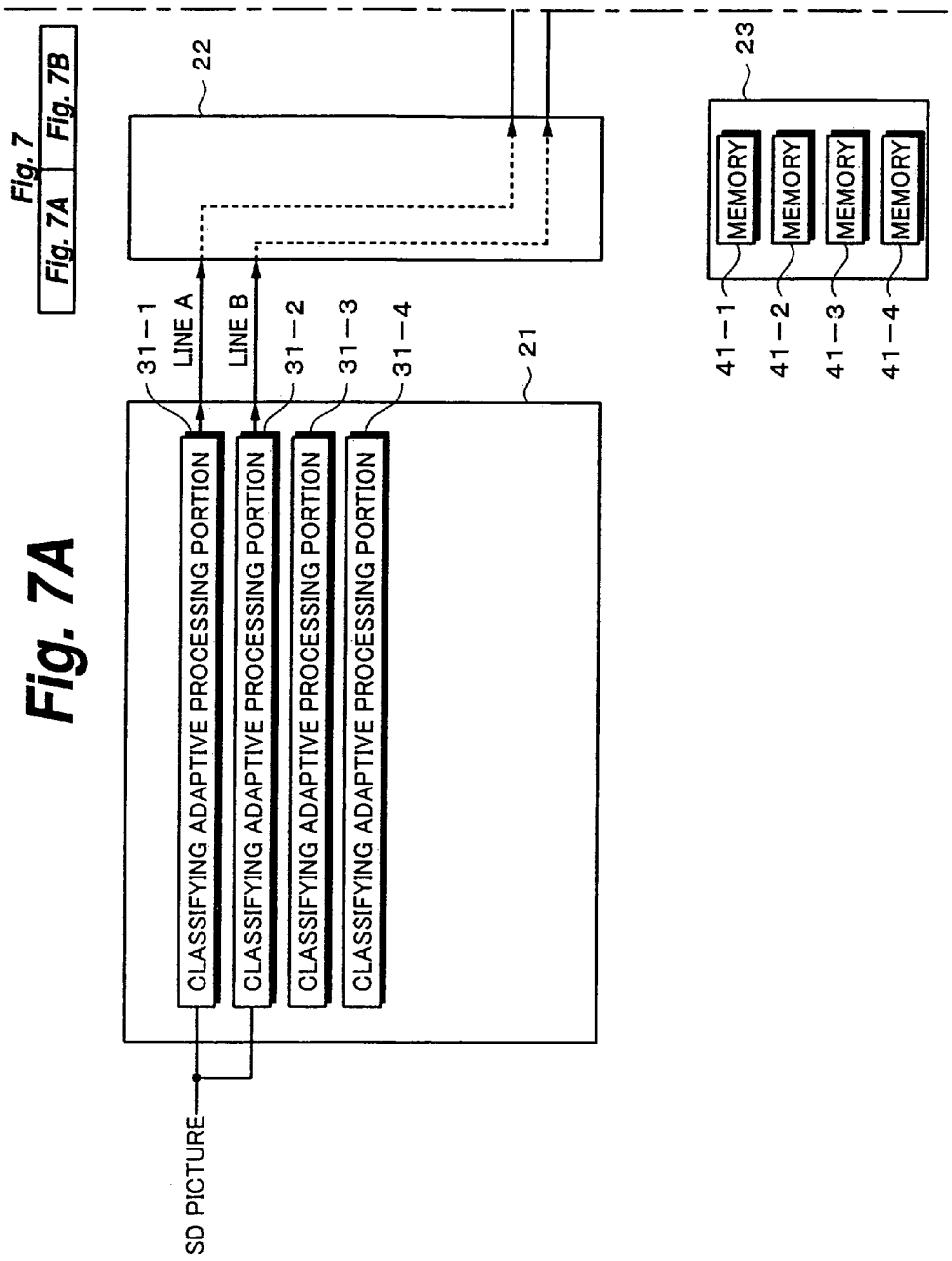

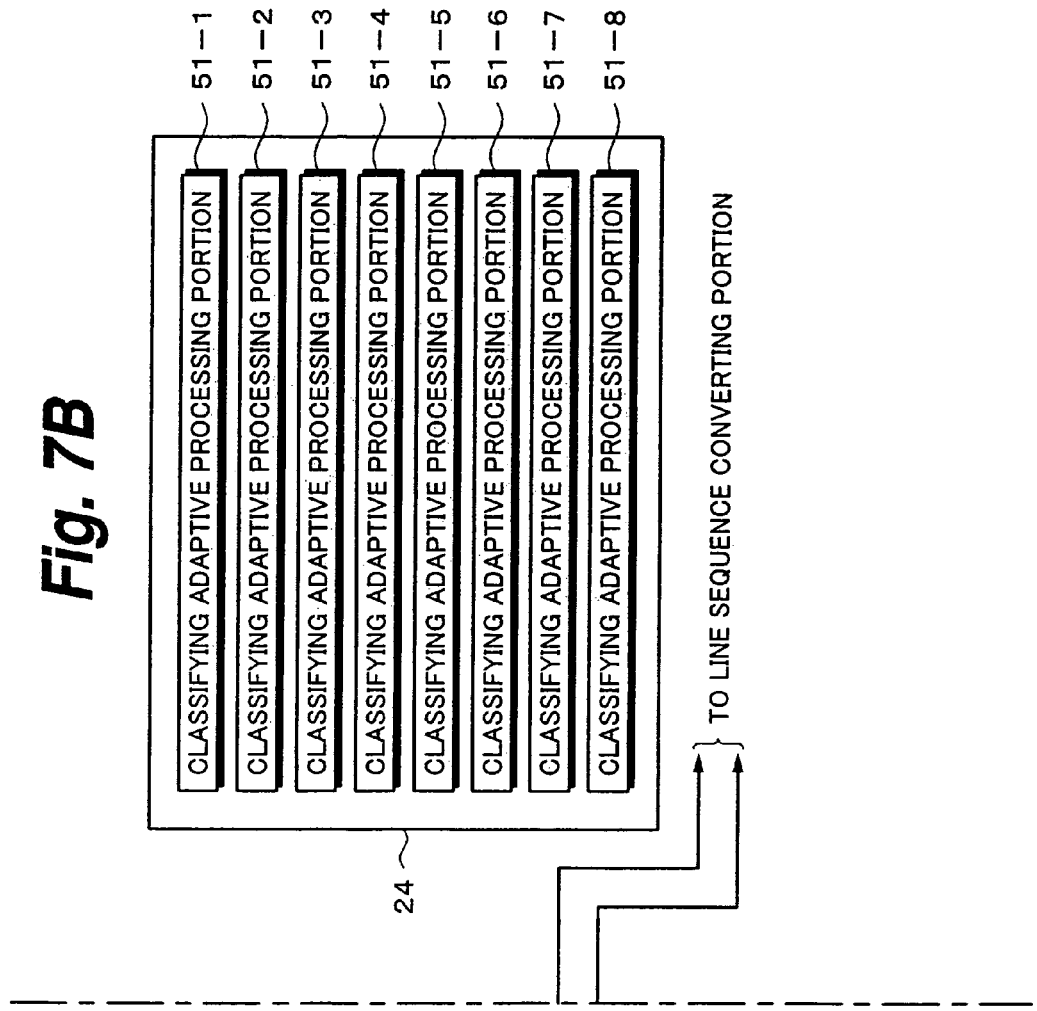

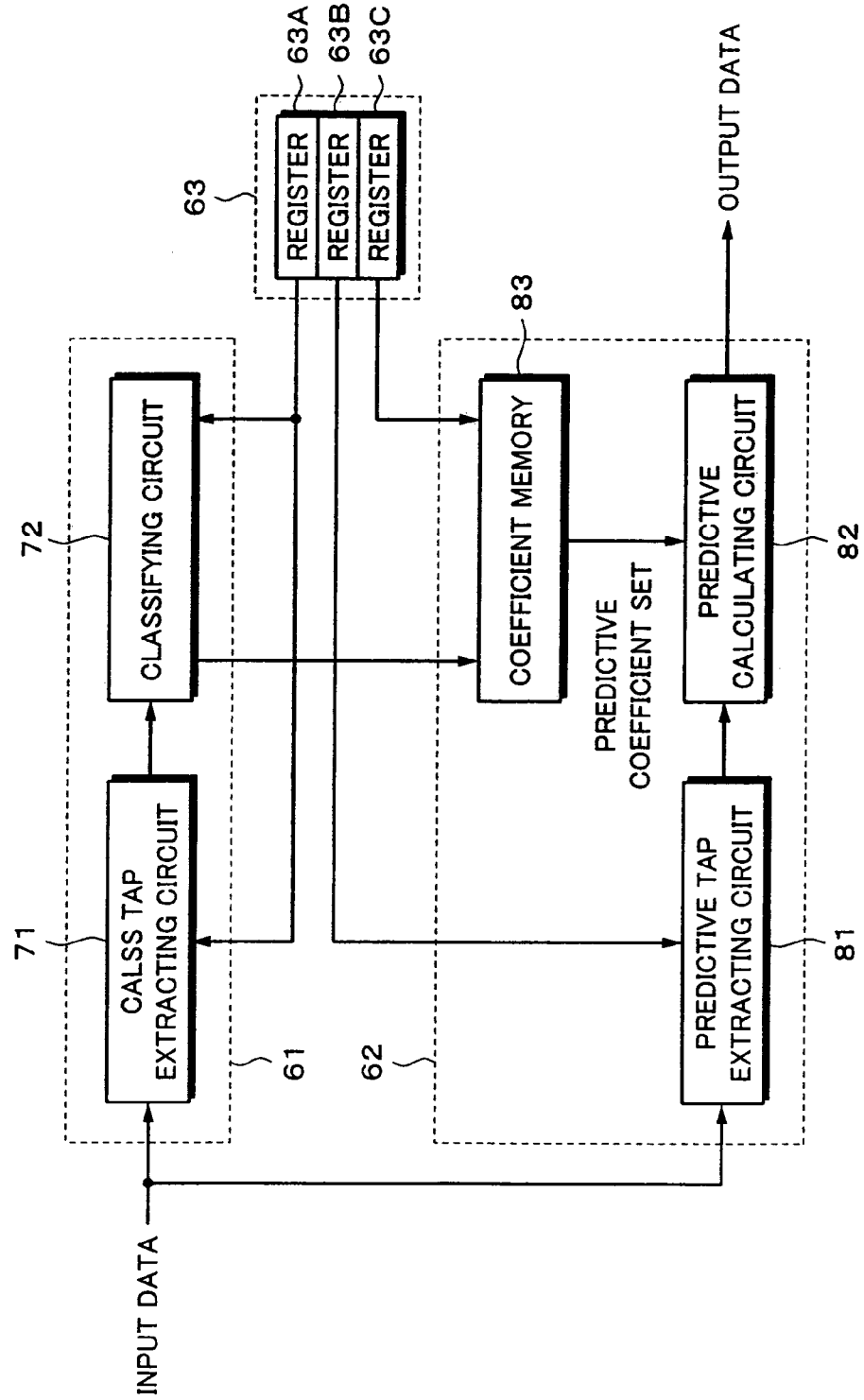

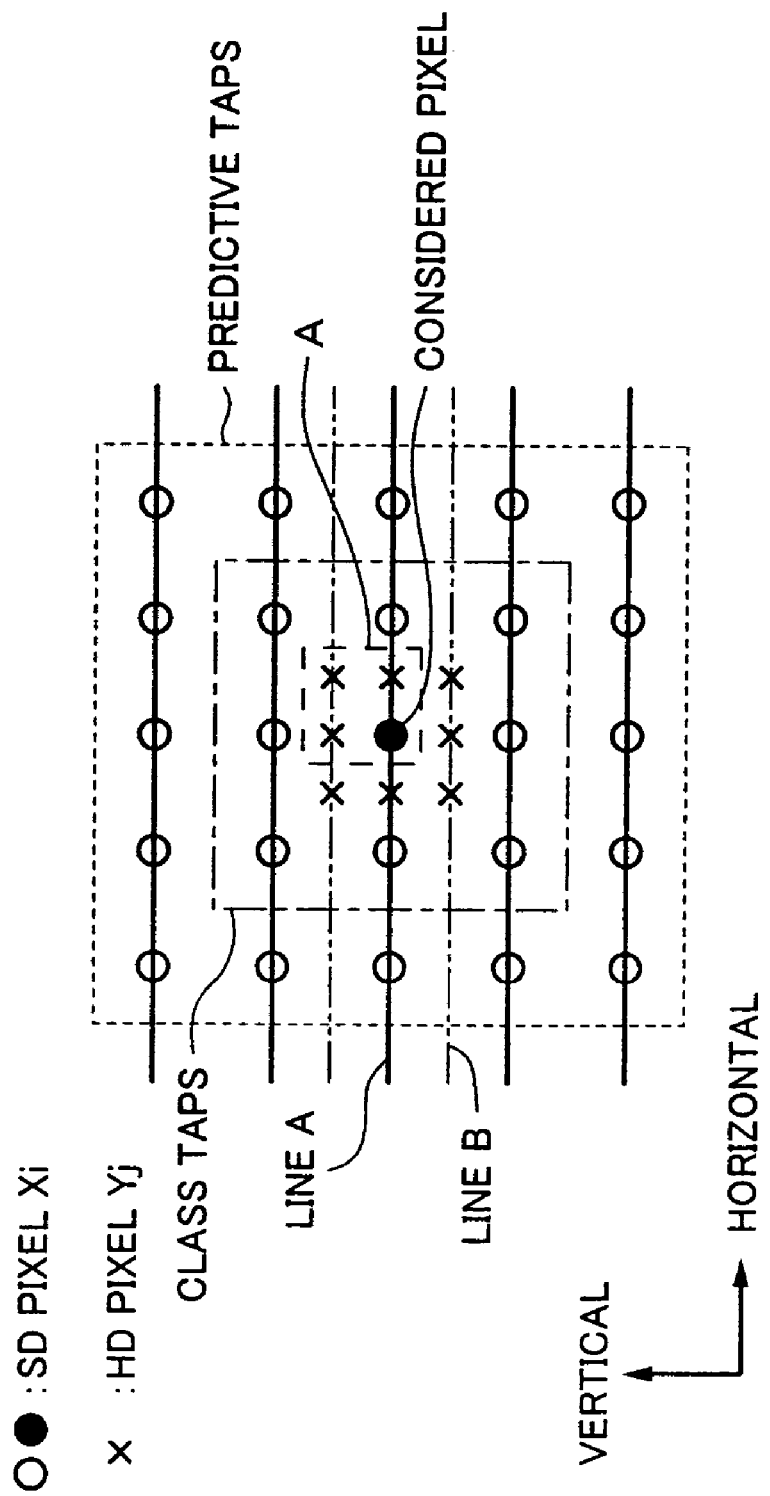

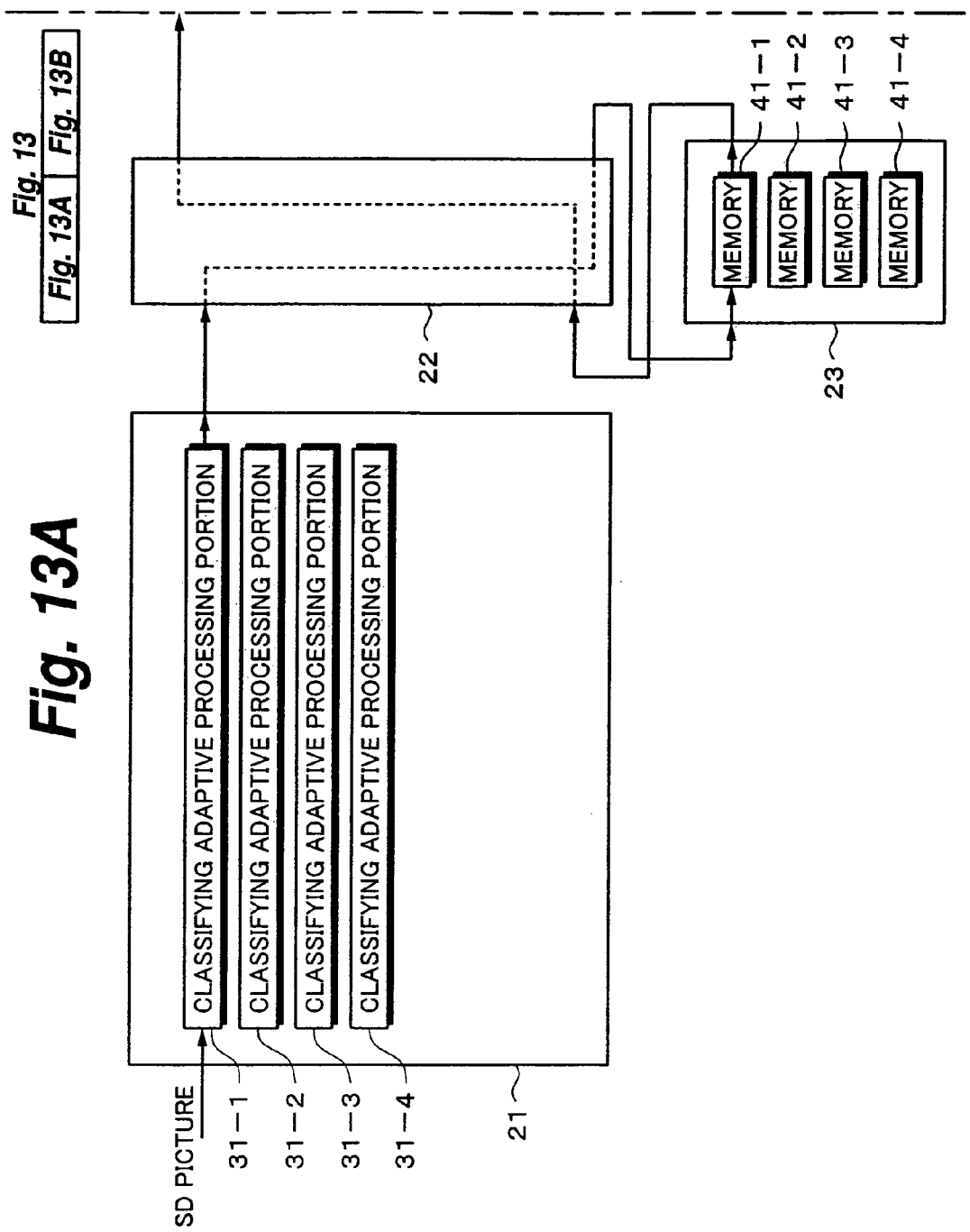

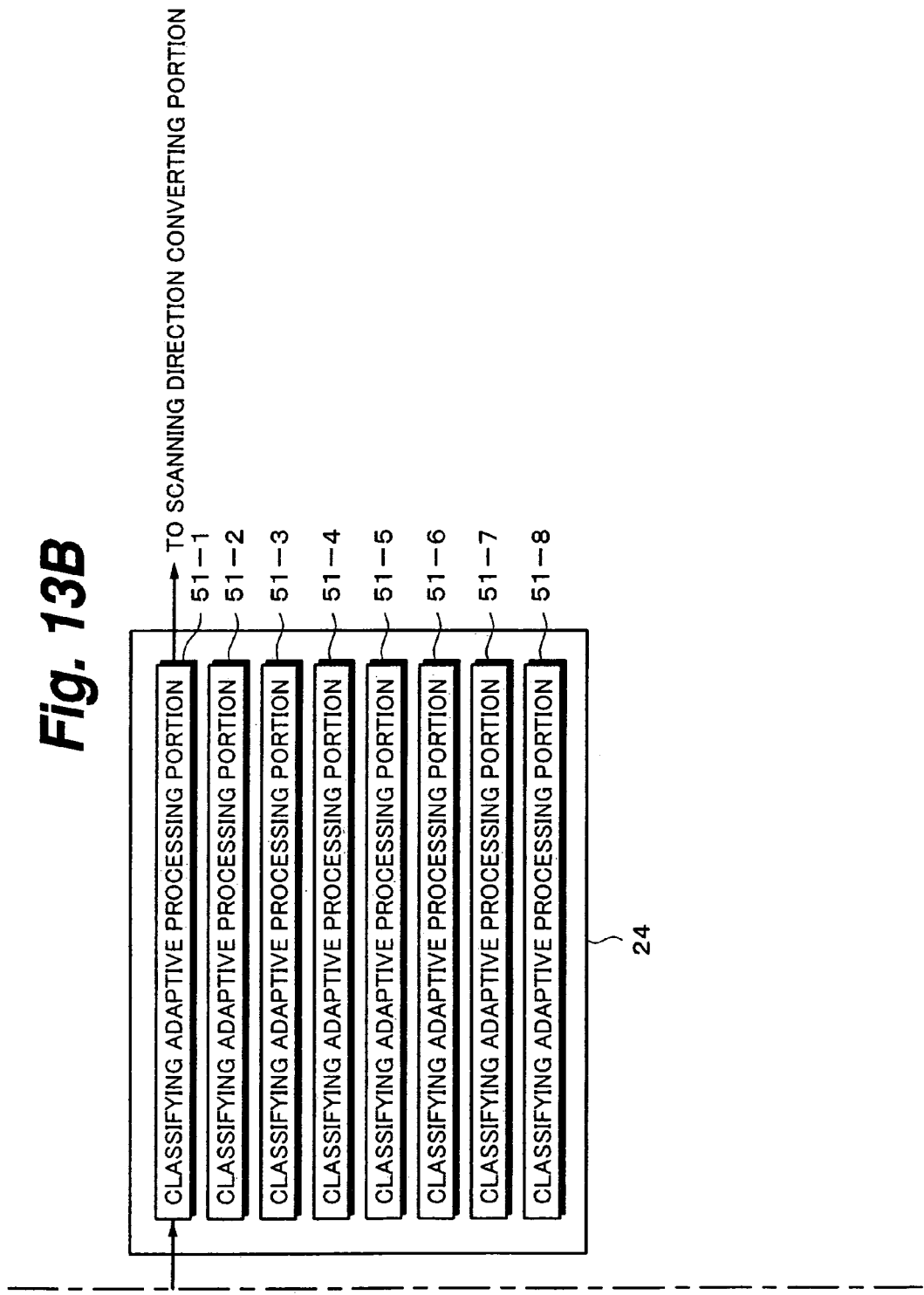

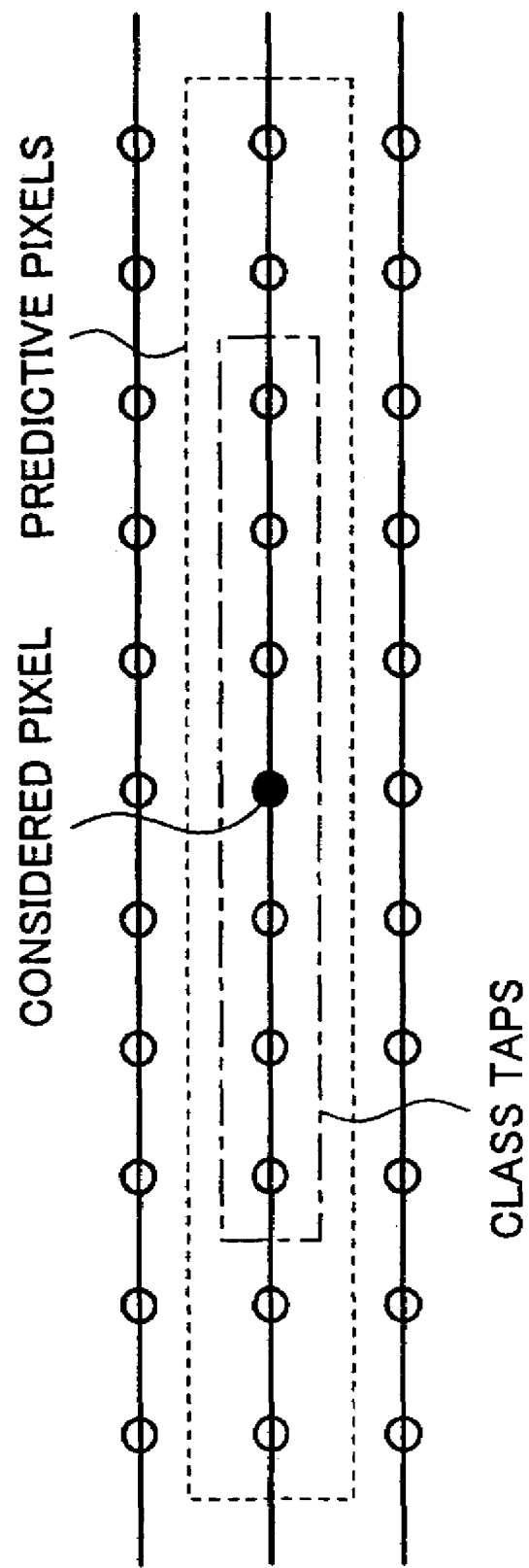

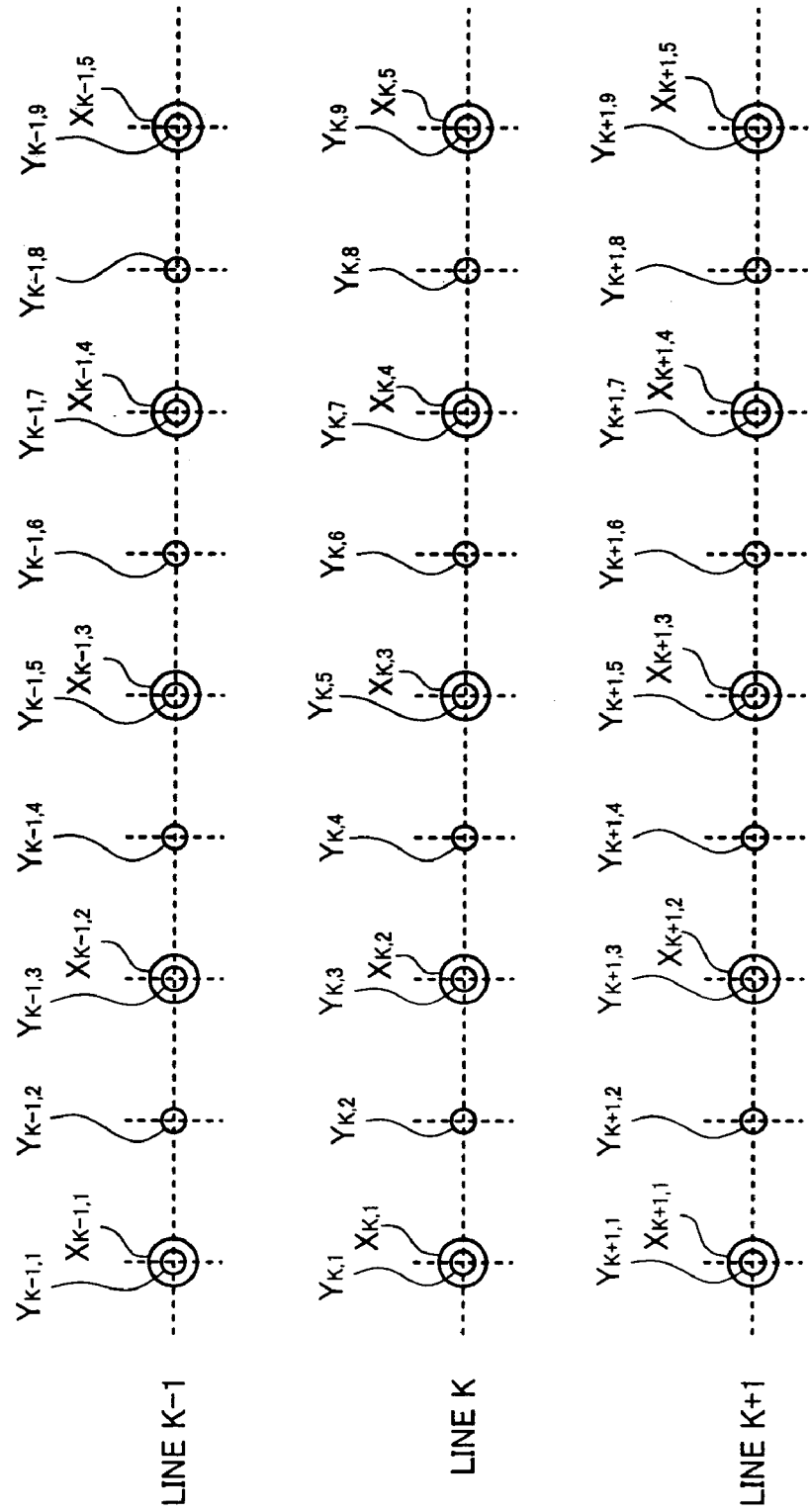

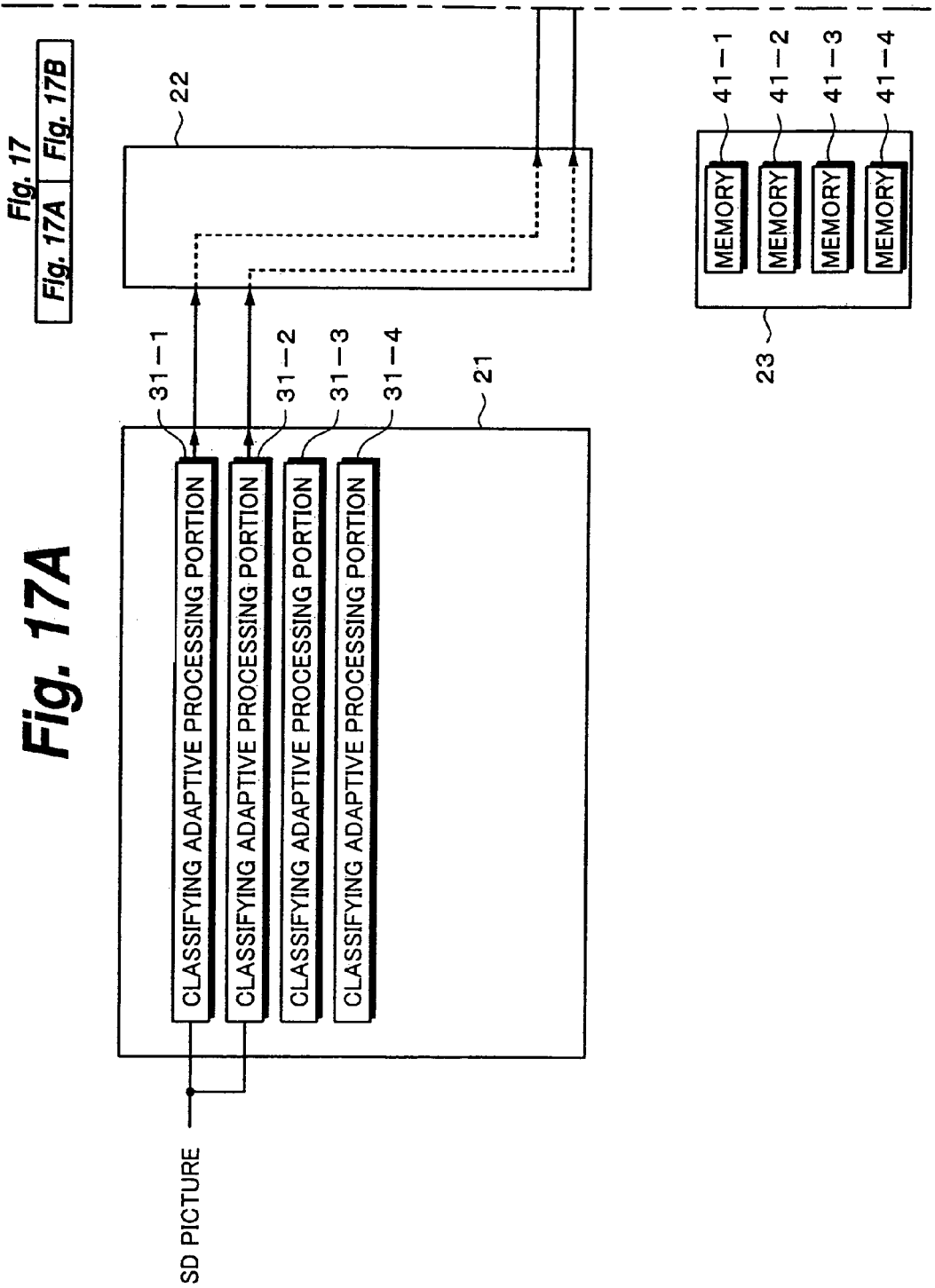

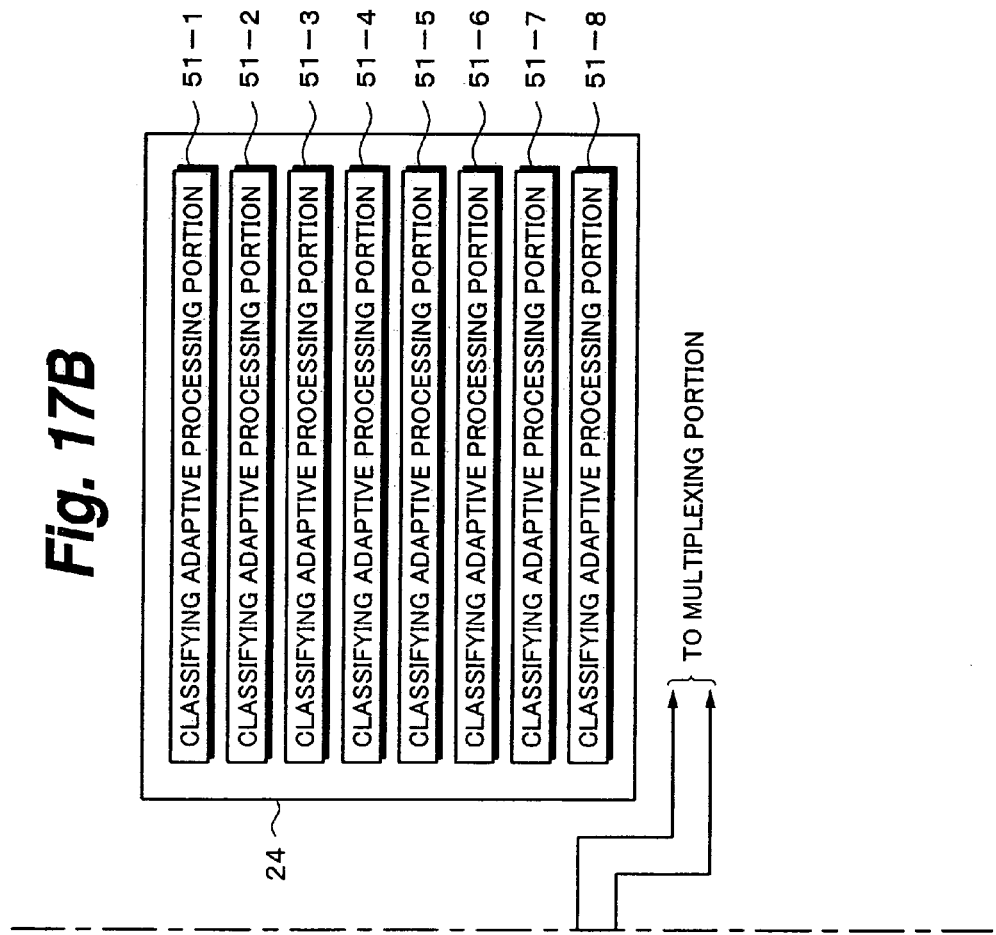

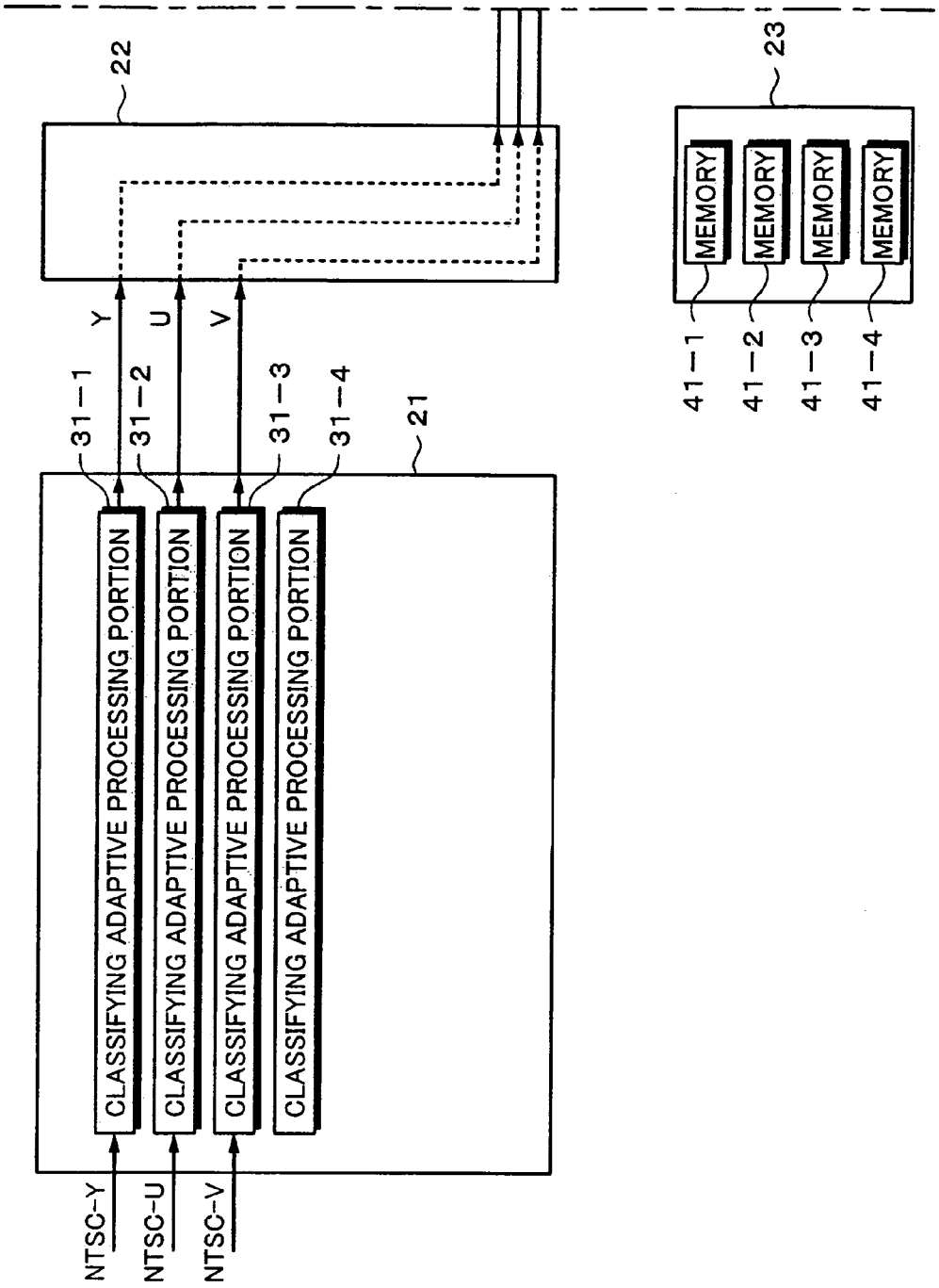

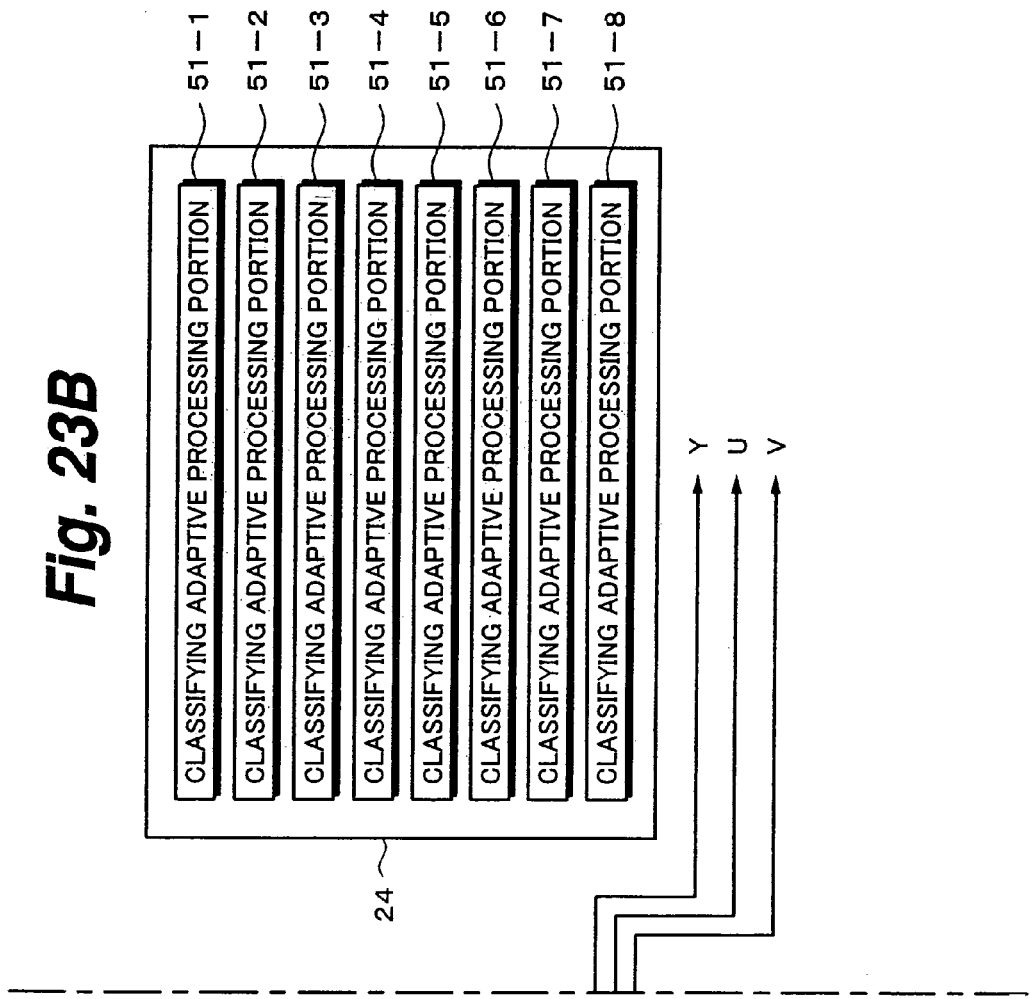

0 FIELD

−1FRAME (−2FIELD)

−1FRAME (−2FIELD)      0 FIELD

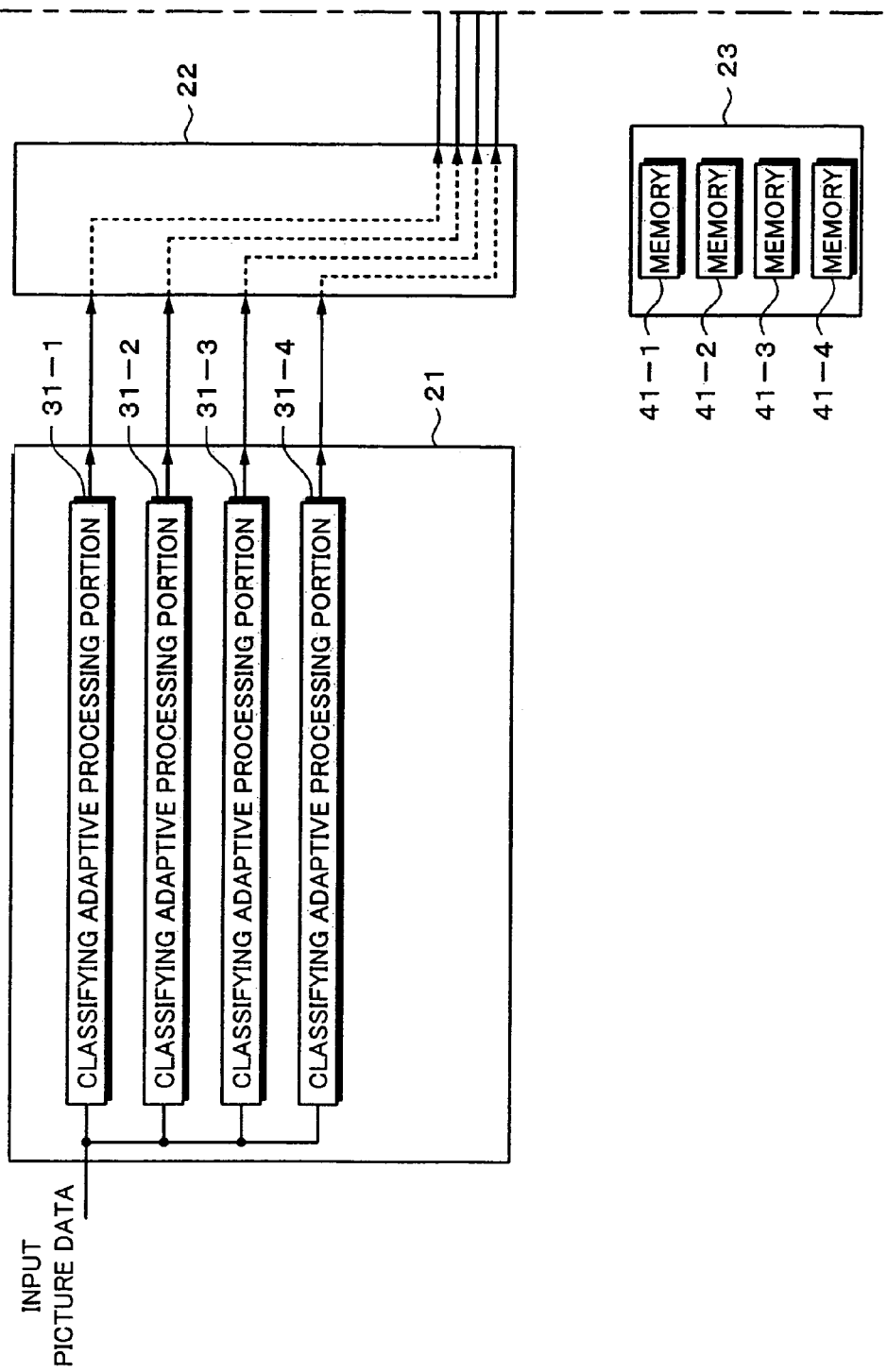

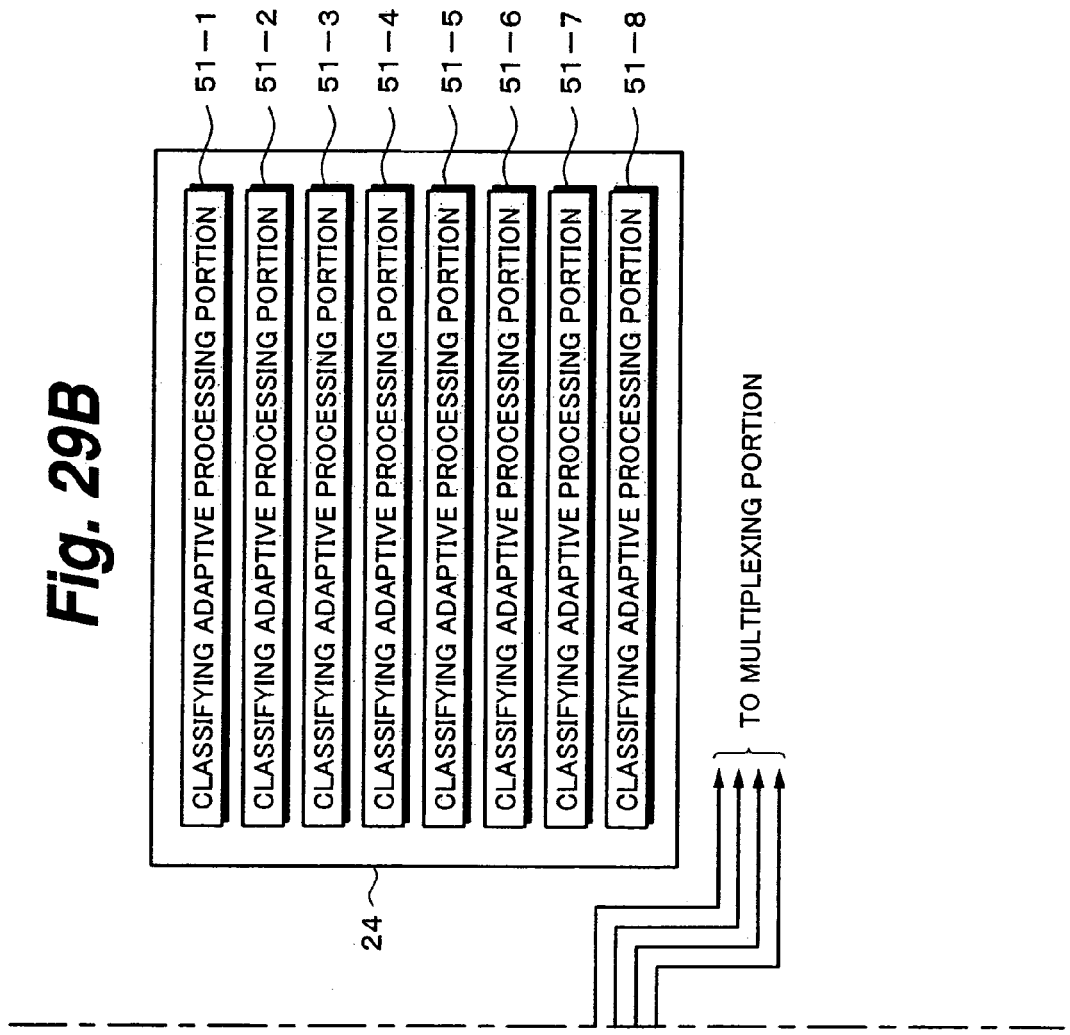

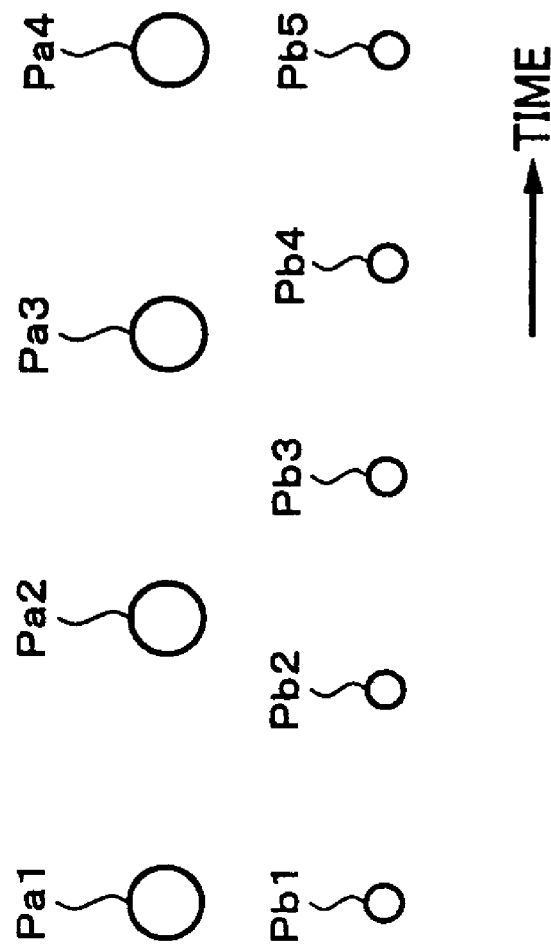

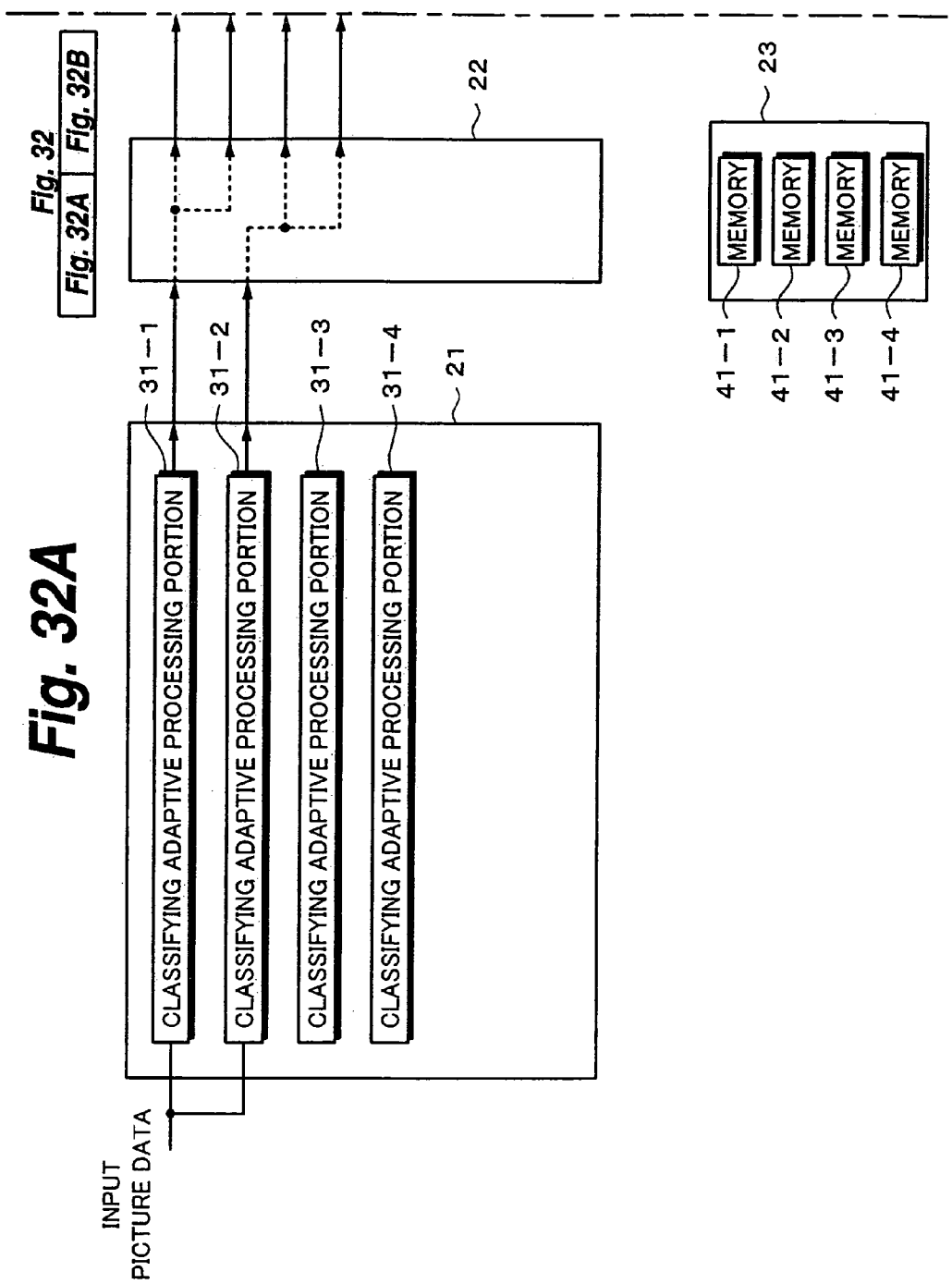

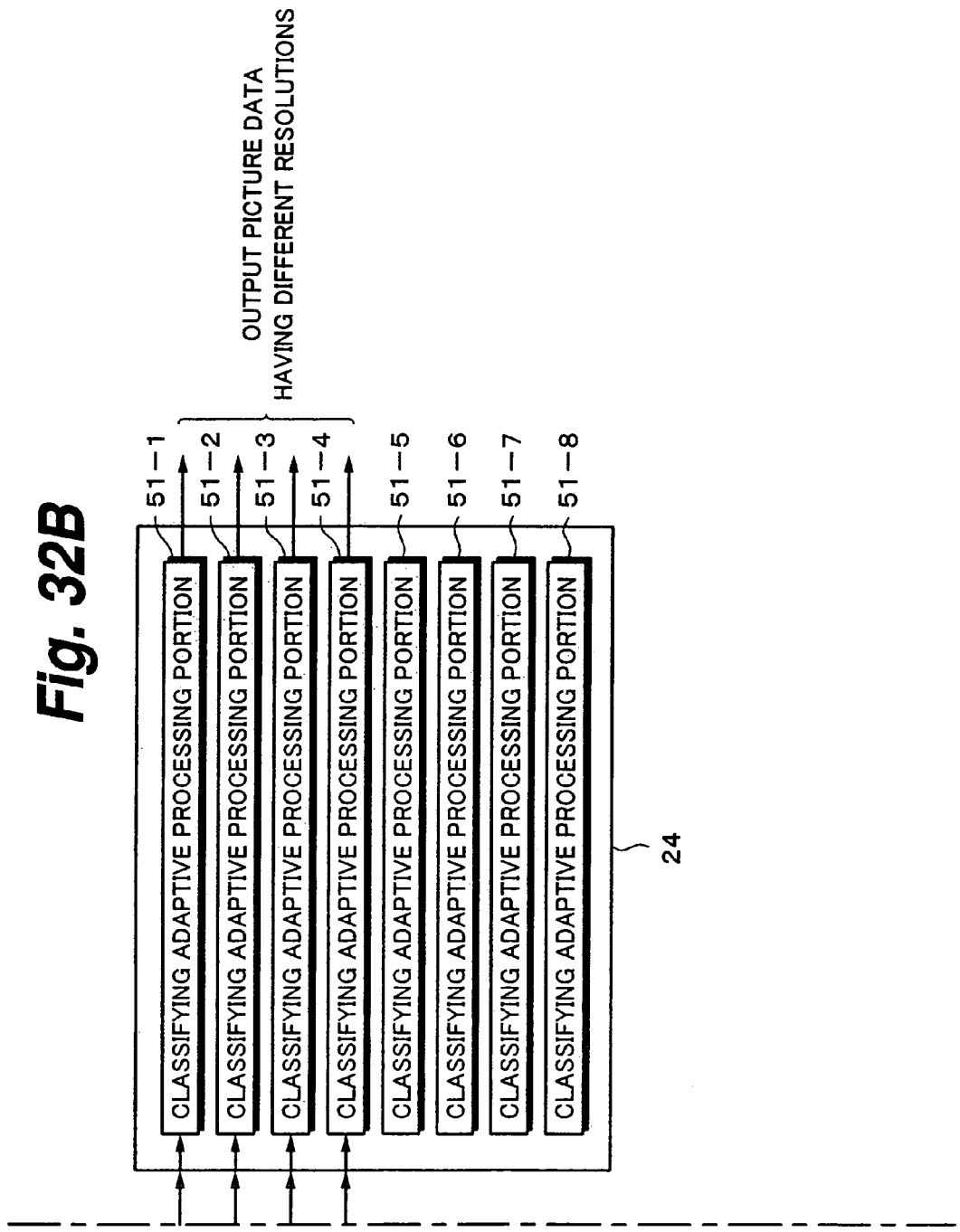

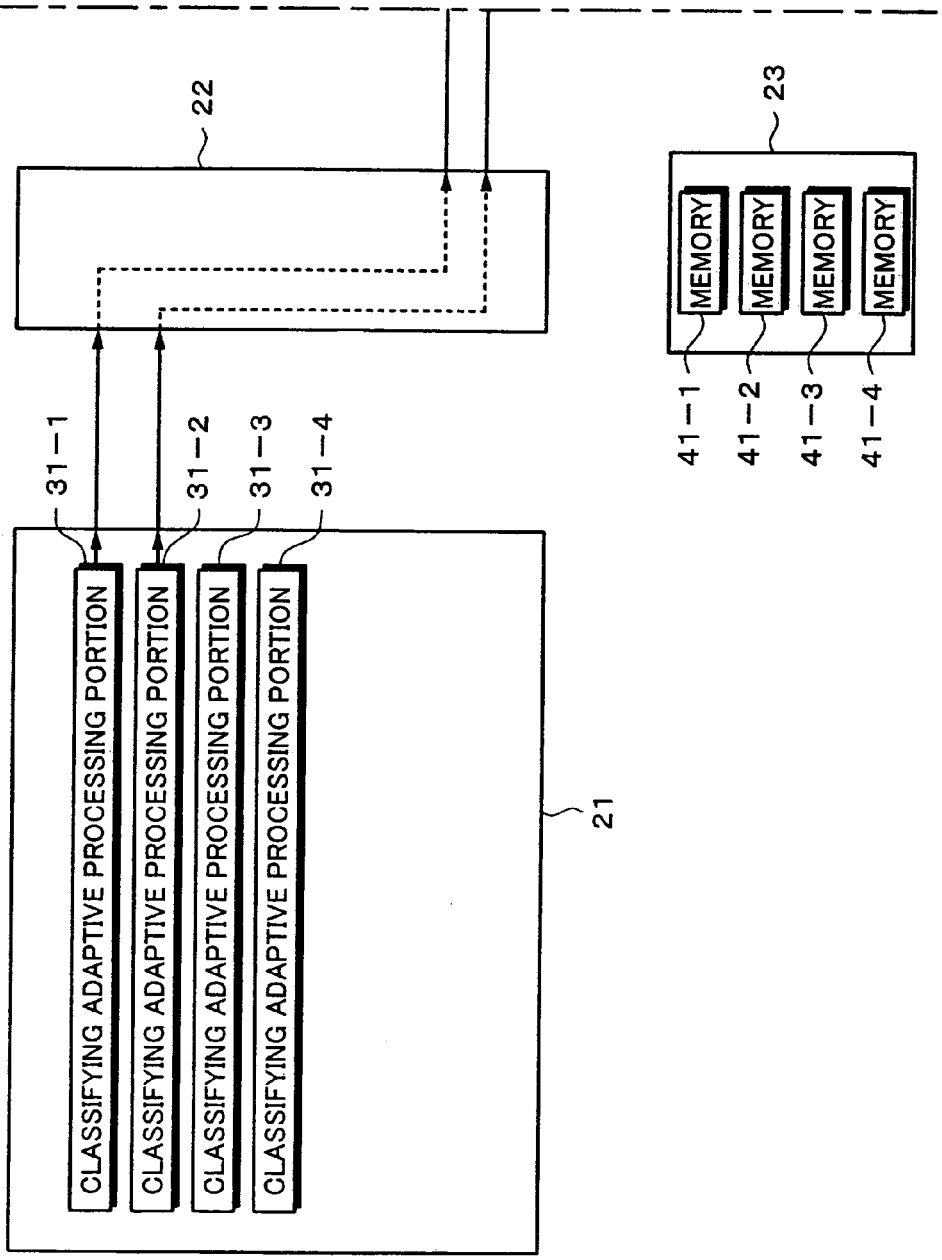

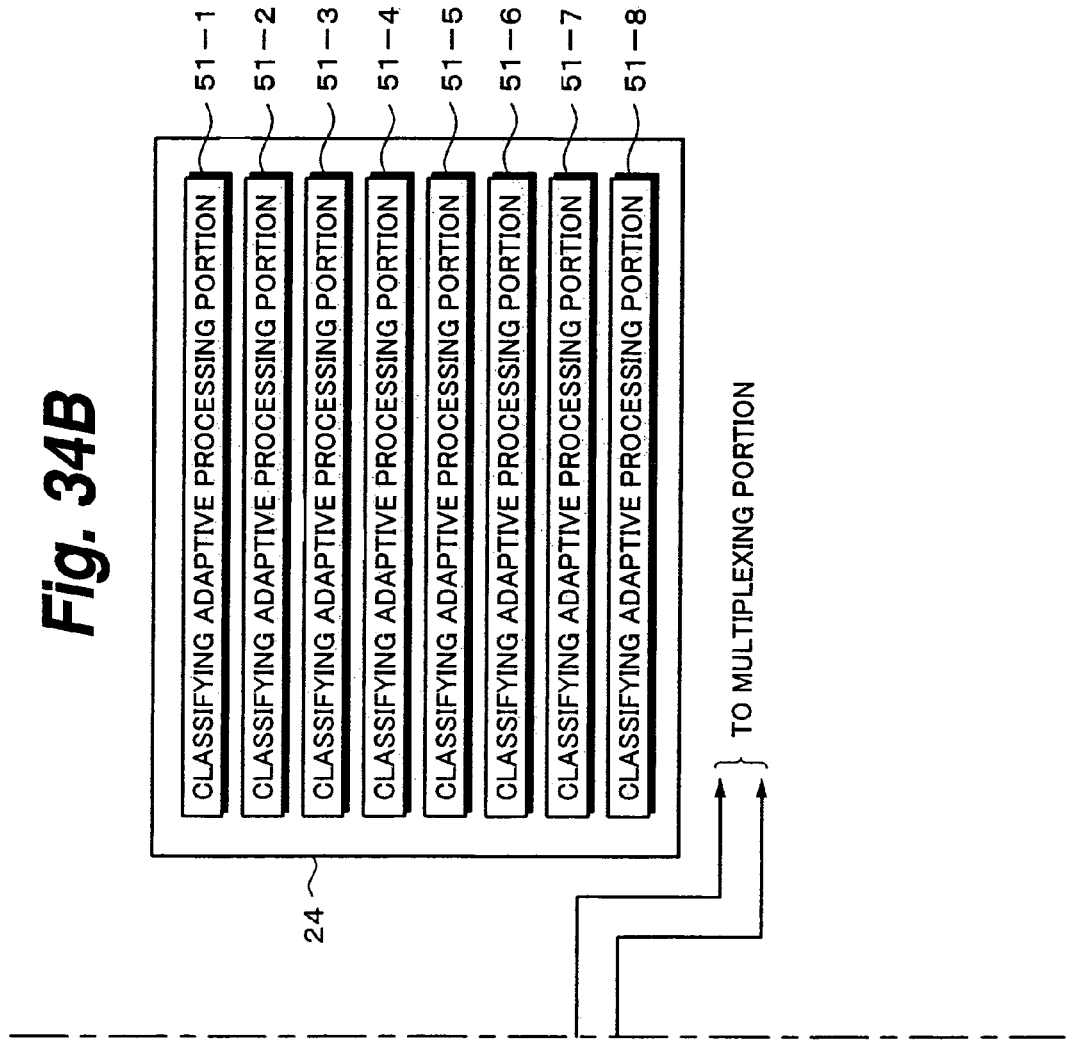

INFORMATION PROCESSING APPARATUS

This is a divisional of application Ser. No. 09/980,130, filed Nov. 28, 2001 now U.S. Pat No. 7,174,051, which was filed under 35 USC 371 and is based upon International Application No. PCT/JP01/02626, filed Mar. 29, 2001, with a claim of priority to Japanese Patent Application No. 2000-093898, filed Mar. 30, 2000, the entirety of which are incorporated herein by reference

TECHNICAL FIELD

The present invention relates to an information processing apparatus, in particular, to an information processing apparatus that can execute a plurality of signal processes.

BACKGROUND ART

A signal processing device disposed in a signal processing apparatus is normally structured so that one function is accomplished.

In other words, to accomplish a plurality of different signal processes, it is necessary to provide devices corresponding to the number of required processes. Thus, for example, it was difficult to compactly structure and reduce the cost of the apparatus.

DISCLOSURE OF THE INVENTION

The present invention was made from the above-point of view. According to the present invention, corresponding to a predetermined function execution request, the internal structure and process contents of the same hardware are changed so as to execute a plurality of processes.

An information processing apparatus of the present invention, comprising a plurality of classifying adaptive processing circuits for performing a classifying adaptive process for input information signals, and a switching circuit for switching a connection relation among the plurality of classifying adaptive processing circuits.

According to the information processing apparatus of the present invention, a plurality of classifying adaptive processing circuits perform a classifying adaptive process for a desired function corresponding to an input information signal. The relation of the connections of the plurality of classifying adaptive processing circuits is switched.

At least one of the classifying adaptive processing circuits is configured for switching the corresponding classifying adaptive process for the corresponding information signal as the connection relation of the switching circuit is switched.

At least one of the plurality of classifying adaptive processing circuits is configured for switching the structure of the corresponding classifying adaptive process as the connection relation of the switching circuit is switched.

The structure represents a structure of class taps or a structure of predictive taps.

At least one of the plurality of classifying adaptive processing circuits is configured for switching a coefficient of the corresponding classifying adaptive process so as to switch the process for the corresponding information signal as the connection relation is switched by the switching circuit.

The input information signals are output through the plurality of classifying adaptive processing circuits.

A pre-processing circuit is configured for switching a predetermined process as the connection relation is switched. The pre-processing circuit is configured for performing a predetermined process for the corresponding input information signal and inputting the processed result to the classifying adaptive processing circuit.

A post-processing circuit switches a process as the relation of the connections is switched. The post-processing circuit performs a predetermined process for an output of a classifying adaptive processing circuit.

Examples of processes that the classifying adaptive processing circuits accomplish are as follows.

The information signals are picture data composed of pixel information. One of the plurality of classifying adaptive processing circuits is configured for performing the classifying adaptive process corresponding to the pixel information of the corresponding input information signal and predicting pixel information that has to be present between the pixel information of the input information signal and pixel information adjacent thereto so as to improve the resolution of the picture data.

The information signals are picture data composed of pixel information. One of the plurality of classifying adaptive process circuits is configured for performing the classifying adaptive process for the corresponding input information signal using a prepared left eye coefficient and predicting pixel information of left-eye picture data and for performing the classifying adaptive process for the corresponding input information signal using a prepared right-eye coefficient and predicting pixel information of right-eye picture data so as to generate stereo picture data with the left-eye picture data and the right-eye picture data.

The information signals are picture data composed of pixel information. One of the plurality of classifying adaptive processing circuits is configured for performing the classifying adaptive process for the corresponding input information signal using a prepared luminance signal coefficient and predicting a luminance signal component of the picture data and another one of the plurality of classifying adaptive processing circuits is configured for performing the classifying adaptive process using prepared color difference signal coefficients and predicting color difference components of the picture data so as to separate the picture data into the luminance component and the color difference components.

The information signals are picture data composed of pixel information. At least two of the plurality of classifying adaptive processing circuits are configured for performing the classifying adaptive process for the pixel information having different phases and changing the number of pixel information that composes the picture data.

The information signals are picture data composed of pixel information. At least two of the plurality of classifying adaptive processing circuits are configured for performing the classifying adaptive process and obtaining a plurality of picture data having different resolutions corresponding to the classifying adaptive process performed by the plurality of classifying adaptive processing circuits.

One of the plurality of classifying adaptive processing circuits is configured for performing the classifying adaptive process for the corresponding input information signal and obtaining picture data having a first resolution and another one of the plurality of classifying adaptive processing circuits is configured for performing the classifying adaptive process for picture data having the first resolution and obtaining picture data having a second resolution.

The information signals are picture data composed of pixel information and structured in the unit of a frame. One of the plurality of classifying adaptive processing circuits is configured for performing the classifying adaptive process for the corresponding information signal that is input in the unit of a frame and generating picture data of frames chronologically preceded and followed by a frame of the input information signal.

BRIEF DESCRIPTION OF DRAWINGS

FIG. 2 is a block diagram showing an example of the structure of a pre-processing portion of the data processing apparatus;

FIGS. 3A and 3B are block diagrams showing an example of the structure of a data processing portion of the data processing apparatus;

FIG. 4 is a block diagram showing an example of the structure of a post-processing portion of the data processing apparatus;

FIG. 5 is a block diagram showing an example of the structure of a data processing apparatus 1 that executes a process for increasing the resolution in process mode (1);

FIG. 6 is a schematic diagram showing pixel arrangements of an SD picture and an HD picture;

FIGS. 7A and 7B are block diagrams showing an example of the connections of the data processing portion in the process mode (1);

FIG. 8 is a block diagram showing an example of the structure of a classifying adaptive processing portion that performs a prediction process;

FIG. 9 is a schematic diagram showing an example of class tap extraction information in the process mode (1);

FIGS. 13A and 13B are block diagrams showing an example of the connections of the data processing portion that performs the other processing method for the process mode (1);

FIG. 14 is a schematic diagram showing an example of class tap extraction information in the other processing method for the process mode (1);

FIG. 15 is a schematic diagram showing a pixel arrangement in the other processing method for the process mode (1);

FIGS. 17A and 17B are block diagrams showing an example of the connections of the data processing portion in the process mode (2);

FIGS. 23A and 23B are block diagrams showing an example of the connections of the data processing portion in the process mode (3);

FIGS. 29A and 29B are block diagrams showing an example of the connections of the data processing portion in the process mode (4);

FIG. 30 is a schematic diagram for explaining the classifying adaptive processing portion of the input data processing portion that performs a predictive process in the process mode (4);

FIGS. 32A and 32B are block diagrams showing an example of the connections of the data processing portion 12 in the process mode (5);

FIGS. 34A and 34B are block diagrams showing an example of the connections of the data processing portion in the process mode (6);

BEST MODES FOR CARRYING OUT THE INVENTION

Figure 1:
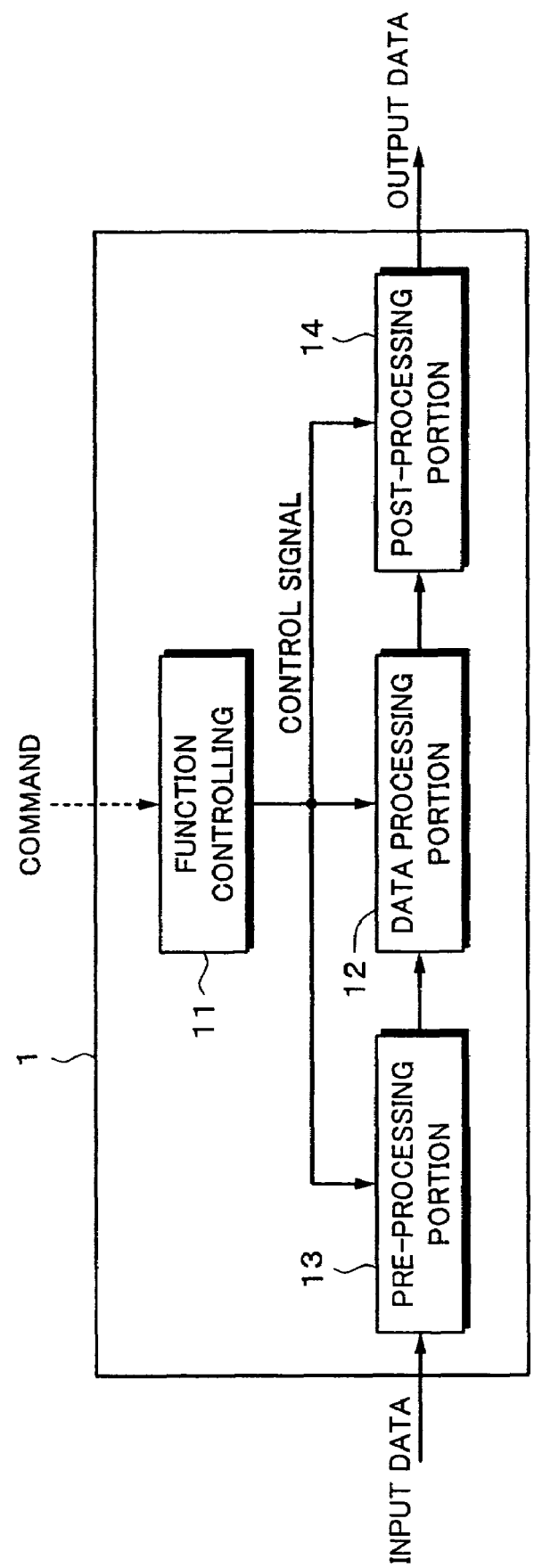
FIG. 1 is a block diagram showing an example of a basic structure of a data processing apparatus according to the present invention.

Next, with reference to the accompanying drawings, an embodiment of the present invention will be described. FIG. 1 shows an outline of an example of the structure of a data processing apparatus 1 according to the present invention. As shown in FIG. 1, a picture data as input data is supplied from a picture processing device such as a television receiver, a video camera, a VTR, a scanner, or a digital camera to the data processing apparatus 1 according to the present invention.

The data processing apparatus 1 according to the embodiment can execute process modes that accomplish for example the following contents corresponding to requests. Picture data that is generated as the processed result of each process mode is output as output data to an external device (for example, a displaying device or a recording and reproducing device).

(1) Increase of resolution (referred to as process mode (1)), (2) Generation of a picture dedicated for right eye and a picture dedicated for left eye (referred to as process mode (2)), (3) Generation of a luminance signal and color difference signals (referred to as process mode (3)), (4) Change of aspect ratio (referred to as process mode (4)), (5) Generation of a picture having a different resolution (referred to as process mode (5)), and (6) Conversion of frame rate (referred to as process mode (6)).

The details of the processes of those process modes performed by the data processing apparatus 1 will be described later.

The data processing apparatus 1 has a function controlling portion 11, a data processing portion 12, a pre-processing portion 13, and a post-processing portion 14. A command that causes a desired process to be executed is input to the function controlling portion 11. The function controlling portion 11 supplies a control signal corresponding to the input command to the data processing portion 12 so as to initialize the data processing portion 12 and executes a process corresponding to the command. In addition, the control signal that is output from the function controlling portion 11 is supplied to the pre-processing portion 13 and the post-processing portion 14. The control signal causes the pre-processing portion 13 and the post-processing portion 14 to execute predetermined processes.

The pre-processing portion 13 performs a predetermined pre-process for picture data as input data corresponding to the control signal supplied from the function controlling portion 11 and supplies the processed data to the data processing portion 12. In addition, the control signal is supplied from the function controlling portion 11 to the data processing portion 12. The data processing portion 12 is initialized with the control signal. The data processing portion 12 performs a classifying adaptive process corresponding to a process designated with the control signal for the supplied input data and outputs data generated as the processed result. An output of the data processing portion 12 is supplied to the post-processing portion 14. The post-processing portion 14 performs a predetermined post-process for the output of the data processing portion 12 corresponding to the control signal supplied from the function controlling portion 11 and outputs the result as output data to an external device.

FIG. 2 shows an example of the structure of the pre-processing portion 13. The pre-processing portion 13 has selectors 130 and 132 and a plurality of delaying circuits 131A, 132B, and so forth. A control signal that is supplied from the function controlling portion 11 is input to the selectors 130 and 132 so as to control the selections of the signal paths of the selectors 130 and 132. The delaying circuits 131A, 131B, and so forth have different delay times. For example, the delaying circuit 131A delays an input signal in the unit of a pixel. The delaying circuit 131B delays an input signal in the unit of a line. The delaying circuit 131C delays an input signal in the unit of a frame. Signals that are output from the delaying circuits 131A, 131B, 131C, and so forth are input to the selector 132. The selector 132 selects the signals that are output from the delaying circuits 131A, 131B, 131C, and so forth corresponding to the control signal supplied from the function controlling portion 11. The signals selected by the selector 132 are output from the pre-processing portion 13.

Alternatively, in the pre-processing portion 13, the signals that are output from the selector 130 may be directly input to the selector 132 not through the delaying circuits 131A, 131B, 131C, and so forth. Further alternatively, the selector 130 may output the same signal in parallel as a plurality of outputs. Further alternatively, the pre-processing portion 13 may have a processing circuit other than the delaying circuits 131A, 131B, and so forth.

Figure 3B:
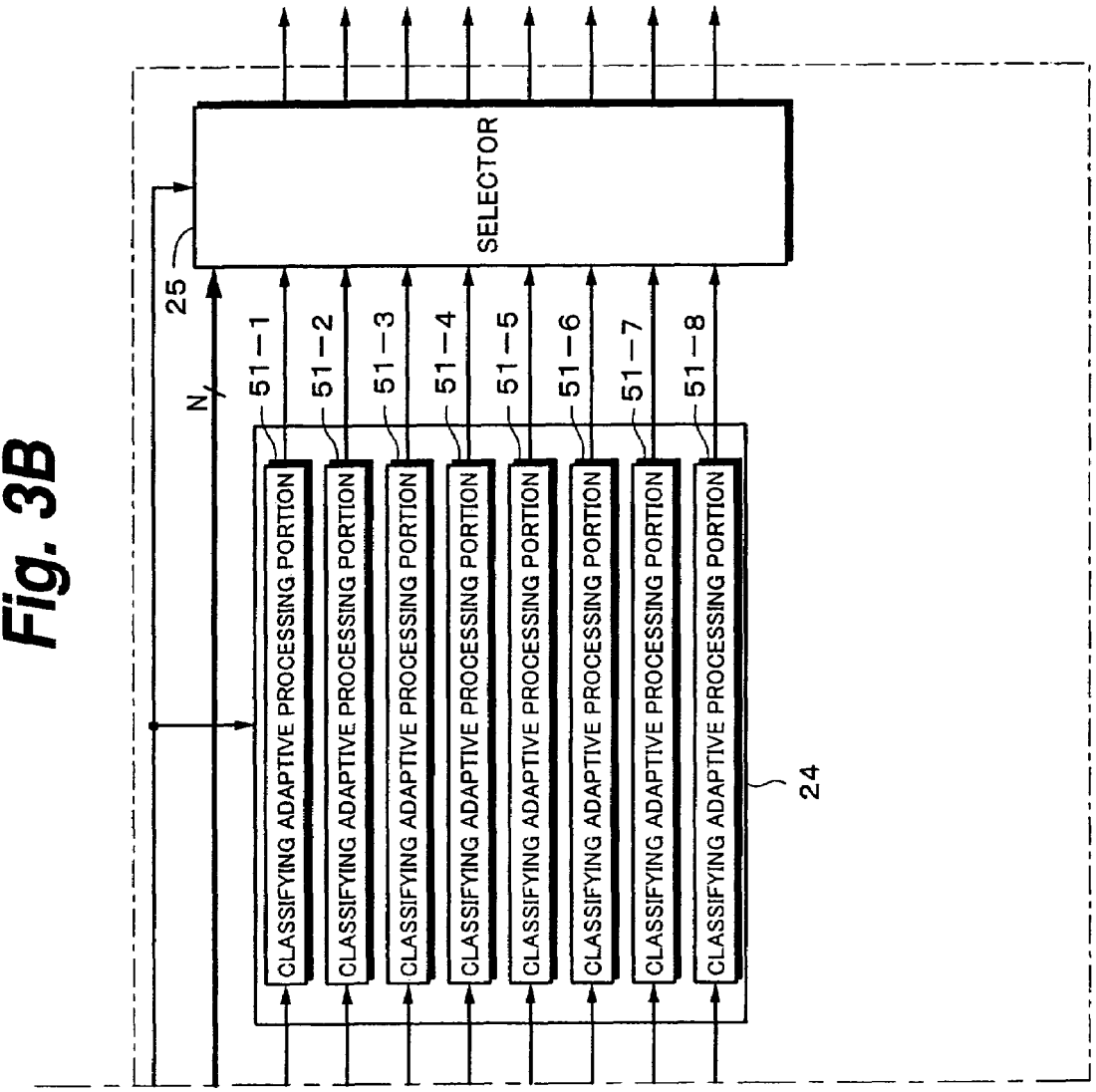

FIG. 3 shows an example of the structure of the data processing portion 12. The data processing portion 12 is composed of an input data processing portion 21, a selector 22, an intermediate data processing portion 23, an output data processing portion 24, and a selector 25.

The input data processing portion 21 has a plurality of classifying adaptive processing portions (in this example, four classifying adaptive processing portions 31-1 to 31-4 (hereinafter simply referred to as classifying adaptive processing portion 31 when it is not necessary to distinguish them) (such notation applies to other structural portions). The classifying adaptive processing portion 31 executes a classifying adaptive process for supplied data (namely, input data that is input to the data processing apparatus 1 or data that is input to the data processing apparatus 1 and pre-processed by the pre-processing portion 13) and supplies the generated data as the processed result to the selector 22.

The data that is processed (generated) in the input data processing portion 21 and the intermediate data processing portion 23 is supplied to the selector 22. The select portion 22 selects a destination for the supplied data (the destination is for example a memory 41 of the intermediate data processing portion 23 or a classifying adaptive processing portion 51 of the output data processing portion 24) and supplies the data to the selected destination.

The intermediate data processing portion 23 has a plurality of memories (in this example, four memories 41-1 to 41-4). The intermediate data processing portion 23 performs a write control and a read control of the memory 41 for data supplied from the selector 22. For example, the intermediate data processing portion 23 executes a process for changing a horizontal scanning sequence to a vertical scanning sequence. Data that is read from the memory 41 of the intermediate data processing portion 23 is returned to the selector 22.

The output data processing portion 24 has a plurality of classifying adaptive processing portions (in this example, eight classifying adaptive processing portions 51-1 to 51-8). The classifying adaptive processing portion 51 executes a classifying adaptive process for the data supplied from the selector 22 corresponding to the control signal received from the function controlling portion 11 and outputs the generated data as the processed result. Data that is output from the classifying adaptive processing portions 51-1 to 51-8 is input to the selector 25. The selector 25 selects data corresponding to the control signal that is supplied from the function controlling portion 11 and outputs the selected data.

FIG. 4 shows an example of the structure of the post-processing portion 14. The post-processing portion 14 has a selector 140, a plurality of processing portions 141A, 141B, and so forth, and a selector 142. Data that is output from the data processing portion 12 is input to the selector 140. The selector 140 switches paths of the input data corresponding to a control signal that is supplied from the function controlling portion 11 and inputs the switched data to the plurality of the processing portions 141A, 141B, and so forth.

According to the embodiment, the processing portion 141A is a line sequence converting portion that performs a conversion in the unit of a line. The processing portion 141B is a scanning direction converting portion that performs a conversion in the unit of a pixel. The processing portion 141C is a multiplexing portion that multiplexes data. The processing portions 141A, 141B, and so forth process input data corresponding to a control signal supplied from the function controlling portion 11.

Next, the structure and operation of the data processing apparatus 1 that executes the processes for accomplishing the above-described process modes (1) to (6) will be described.

FIG. 5 shows an example of the structure of the data processing apparatus 1 that executes the process for increasing the resolution in the process mode (1). In this example, an SD (Standard Density) picture (for example, picture data in an interlace format of which the number of lines is 525) (hereinafter, sometimes referred to as SD picture data) is input as input data from an external device to the data processing apparatus 1. It is assumed that the data processing apparatus 1 generates an HD (High Density) picture (for example, picture data in a progressive format of which the number of lines is 525 and of which the number of pixels in the horizontal direction is twice that of the SD picture) (hereinafter, sometimes, the HD picture data is referred to as HD picture data).

In this example, a command that causes the process for converting an SD picture into an HD picture to be executed is additionally input to the function controlling portion 11. The function controlling portion 11 outputs a control signal corresponding to the input command to the data processing portion 12.

The data processing portion 12 generates data of each line of the HD picture with the SD picture that is input as the input data to the data processing apparatus 1 corresponding to the control signal received from the function controlling portion 11. Accurately speaking, the data processing portion 12 predicts pixels arranged on each line.

In reality, as shown in FIG. 6, when a predetermined field of an SD picture is composed of lines $L_{SD-1}$, $L_{SD-2}$, $L_{SD-3}$, and so forth on which pixels denoted by large circles ○ (hereinafter referred to as SD pixels) are arranged, the data processing portion 12 generates lines $L_{HD-1}$, $L_{HD-2}$, $L_{HD-3}$ on which pixels of an HD picture denoted by small circles ○ are arranged at the same positions as the lines $L_{SD-1}$, $L_{SD-2}$, $L_{SD-3}$, and so forth of the SD picture (hereinafter, sometimes, a line of an HD picture at the same position as a line of an SD picture is referred to as line A) and lines $L_{HD-2}$, $L_{525P-4}$, and so forth of the HD picture at positions that are not same as the lines of the SD picture (hereinafter, a line of an HD picture at a position that is not same as a line of an SD picture is referred to as line B).

The data processing portion 12 separately generates pixels of line A and pixels of line B. In the post-processing portion 14 disposed downstream of the data processing portion 12, the selector 140 selects the line sequence converting portion 141A and outputs line A and line B supplied from the data processing portion 12 in line sequence. In other words, HD picture data is output as output data from the line sequence converting portion 141A to an external device through the selector 142.

In other words, in this example, the data processing apparatus 1 non-interlaces an SD picture as an interlace format picture, doubles the number of pixels in the horizontal direction, and thereby generates an HD picture having pixels four times larger than an SD pixel.

FIG. 7 shows an example of the connections of the data processing portion 12 that executes the process for increasing the resolution in the process mode (1). In this example, in the input data processing portion 21, the two classifying adaptive processing portions 31-1 and 31-2 are used. SD picture data that is input to the data processing apparatus 1 is supplied as input data to the classifying adaptive processing portions 31-1 and 31-2.

The classifying adaptive processing portion 31-1 executes a classifying adaptive process for generating line A (in the example shown in FIG. 6, $L_{HD-1}$, $L_{HD-3}$, $L_{HD-5}$, and so forth) that compose an HD picture with supplied SD picture data. In other words, in the classifying adaptive process, a process for predicting HD pixels arranged on line A is performed. The classifying adaptive processing portion 31-2 executes a classifying adaptive process for generating line B (in the example shown in FIG. 6, $L_{HD-2}$, $L_{HD-4}$, and so forth) that compose an HD picture with an SD picture. In other words, in the classifying adaptive process, a process for predicting HD pixels arranged on line B is performed.

Pixel data of line A and line B generated by the classifying adaptive processing portions 31-1 and 31-2 is supplied to the select portion 22.

The select portion 22 supplies pixel data of line A and line B simultaneously supplied from the classifying adaptive processing portions 31-1 and 31-2 of the input data processing portion 21 to the post-processing portion 14. In the post-processing portion 14, the selector 140 selects the line sequence converting portion 141A corresponding to a control signal supplied from the function controlling portion 11. Thus, line A and line B are supplied to the line sequence portion 141A. Line A and line B that compose the HD picture that are simultaneously supplied to the line sequence converting portion 13 are converted into a progressively scanned picture in the line sequence and output to an external device.

The intermediate data processing portion 23 and the output data processing portion 24 are not used in the process mode.

FIG. 8 shows an example of the structure of the classifying adaptive processing portion 31-1 of the input data processing portion 21. As was described above, the classifying adaptive processing portion 31-1 performs the process for line A. The classifying adaptive processing portion 31-1 comprises a classifying portion 61, an adaptive processing portion 62, and a register group 63. The classifying portion 61, the adaptive processing portion 62, and the register group 63 select a bank for the process mode corresponding to a control signal that is output from the function controlling portion 11 to the data processing portion 12 and execute various processes corresponding to a coefficient set of the selected bank.

The classifying portion 61 is composed of a class tap extracting circuit 71 and a classifying circuit 72. Successively designating HD pixels on line A of an HD picture as considered pixels, the classifying portion 61 classifies the considered pixels as predetermined classes.

In other words, the class tap extracting circuit 71 selects SD pixels (hereinafter, sometimes referred to as class taps) for each considered pixel from an SD picture, extracts the class taps, and supplies them to the classifying circuit 72.

A register 63A of the register group 63 registers information (hereinafter referred to as class tap extraction information) of a selected pattern of SD pixels as class taps for each classifying adaptive process executed by the classifying adaptive processing portion 31-1. In other words, before extracting class taps, the class tap extracting circuit 71 reads class tap extraction information necessary in the example (the class tap extraction information corresponds to a control signal supplied from the function controlling portion 11 to the data processing portion 12) and extracts class taps corresponding to the class tap extraction information.

FIG. 9 shows an example of class tap extraction information in the process mode (1). In FIG. 9, ● (black circle) and ○ (white circle) represent SD pixels. Assuming that a considered pixel is a black circle, class taps are composed of 3 pixels×3 pixels that are arranged around the considered pixel and that include the considered pixel. Predictive taps (that will be described later) are composed of 5 pixels×5 pixels wider than class taps by one pixel. In FIG. 9, X marks represent HD pixels that are finally formed corresponding to a considered pixel. As represented in area A shown in FIG. 9, four HD pixels are formed with one considered pixel. As a result, above-described line B is formed.

Figure 10:
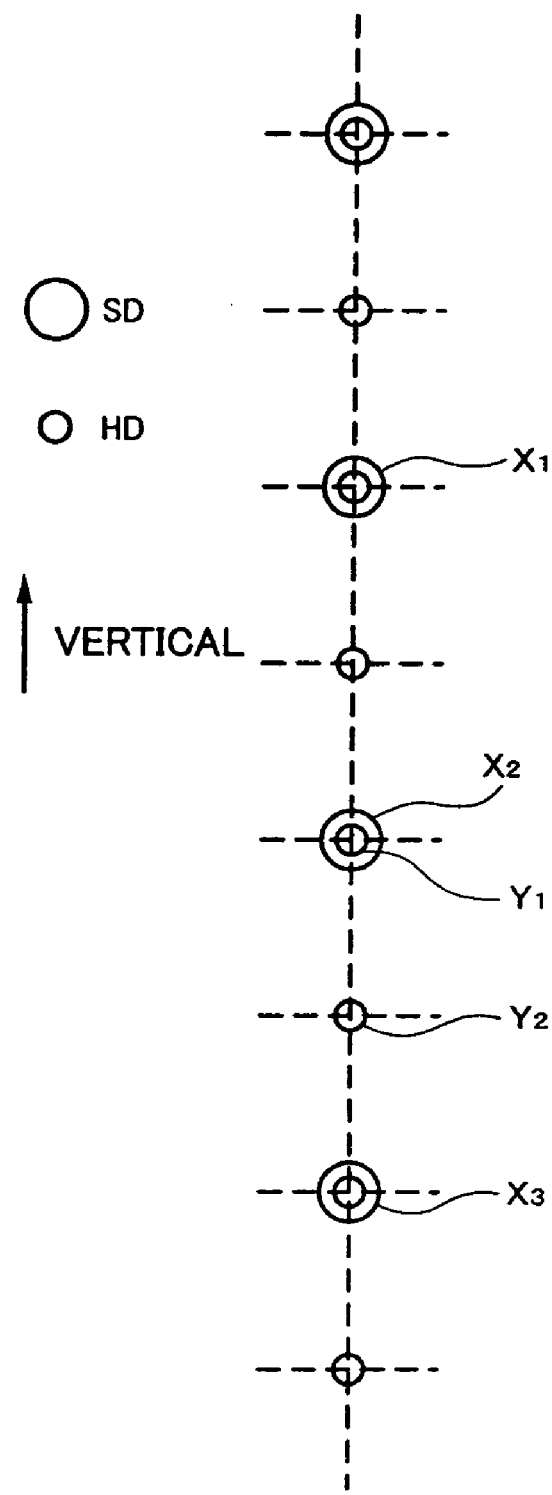
FIG. 10 is a schematic diagram showing other pixel arrangements of an SD picture and an HD picture.

Next, with reference to FIG. 10, the process will be described in more detail. FIG. 10 is a schematic diagram showing the detail of one sequence containing a considered pixel in the vertical direction in FIG. 9. For example, SD pixels denoted by large circles are arranged in one sequence containing a considered pixel of an SD picture of a predetermined field (namely, in the vertical direction). On the other hand, it is assumed that HD pixels denoted by small circles are arranged in one sequence corresponding to the above-described considered pixel of the SD picture. When HD pixel $Y_1$ of the SD picture is a considered pixel, corresponding to class tap extraction information that is read from the register 63A, a total of three SD pixels that are SD pixel $X_2$ that is the closest to HD pixel $Y_1$ (at the same position in the example shown in FIG. 10) and two SD pixels $X_1$ and $X_3$ vertically adjacent to SD pixel $X_2$ are selected as class taps of the considered pixel (HD pixel) $Y_1$.

Returning to FIG. 8, the classifying circuit 72 of the classifying portion 61 detects a feature of SD pixels that compose class taps supplied from the class tap extracting circuit 71 (for example, the distribution of pixel values) and supplies a class code that has been assigned for each feature to the adaptive processing portion 62 (coefficient memory 83). The class code is supplied as an address to the coefficient memory 83. As a pixel value, for example a luminance value of a pixel can be used.

Since each pixel is assigned eight-bit data, in the example, assuming that each SD pixel is assigned eight-bit data, the number of classes becomes huge. Thus, the required memory capacity increases.

Thus, actually, when classifying each considered pixel, the classifying circuit 72 performs the process for decreasing (compressing) the number of bits of each pixel that composes class taps. As an example of the method for the compressing process for the number of bits, ADRC (Adaptive Dynamic Range Coding) process is known.

In the ADRC, the maximum pixel value MAX and the minimum pixel value MIN are detected from pixels that compose a process block (class taps). In addition, the difference DR between the pixel value MAX and the pixel value MIN (=pixel value MAX−pixel value MIN) is calculated. The obtained DR is the dynamic range DR of the process block. The pixel value MIN is subtracted from each pixel value that composes the process block. Each subtracted value is divided by $DR/2^K$. As a result, each pixel value that composes class taps as the process block is re-quantized to K bits that are smaller than the originally assigned bits (eight bits). For example, when K=1, in the example shown in FIG. 10, the number of patterns of pixel values of three SD pixels is $(2^1)^3$. In comparison with the case that the ADRC is not performed, the number of patterns can be decreased.

The compressing process of the classifying circuit 72 is not limited to the ADRC. Instead, another compressing process such as vector quantization may be used.

The classifying circuit 72 decides the class of the considered pixel corresponding to the K-bit pixel value of each SD pixel that composes the class taps.

Before classifying the considered pixel, the classifying circuit 72 reads class tap extraction information necessary in the process mode from the register 63A of the register group 63, extracts the class taps corresponding to the class tap extraction information, and classifies the considered pixel with the extracted class taps.

The adaptive processing portion 62 is composed of a predictive tap extracting circuit 81, a predictive calculating circuit 82, and a coefficient memory 83. The predictive tap extracting circuit 81 selects SD pixels of the SD picture supplied to the adaptive processing portion 62 as predictive taps and supplies the predictive taps to the predictive calculating circuit 82.

A register 63B of the register group 63 registers information of selected patterns of predictive taps of the SD picture (hereinafter, sometimes, referred to as predictive tap extraction information) for each classifying adaptive process executed by the classifying adaptive processing portion 31-1. In other words, before forming predictive taps, the predictive tap extracting circuit 81 reads required predictive tap extraction information (predictive tap extraction information corresponding to a control signal supplied from the function controlling portion 11 to the data processing portion 12) from the register 63B and extracts the predictive taps from the input data corresponding to the predictive tap extraction information. In the process mode (1), as was described with reference to FIG. 9, the predictive taps are composed of 5 pixels×5 pixels arranged around the considered pixel.

The coefficient memory 83 stores predictive coefficient sets (that are obtained in the learning process that will be described later) for individual classes. When a class is supplied from the classifying circuit 72 of the classifying portion 61, a predictive coefficient set is read from the address corresponding to the class and supplied to the predictive calculating circuit 82.

The coefficient memory 83 is composed of a plurality of banks. Each bank stores predictive coefficient sets corresponding to the individual process modes. Each bank stores predictive coefficient sets of corresponding types. A register 63C of the register group 63 registers bank selection information that is information of bank selections corresponding to process modes.

Before reading a predictive coefficient set, the coefficient memory 83 reads bank selection information (that is coefficient information corresponding to a control signal supplied from the function controlling portion 11 to the data processing portion 12) corresponding to the process mode and sets a bank corresponding to the bank selection information. As described above, in the example, since the classifying adaptive processing portion 31-1 performs the process for line A, the coefficient memory 83 sets a bank that stores a predictive coefficient set corresponding to line A. Predictive coefficients are read from an address of the bank corresponding to the supplied class and supplied to the predictive calculating circuit 82.

Predictive taps are supplied from the predictive tap extracting circuit 81 to the predictive calculating circuit 82. In addition, a predictive coefficient set is supplied from the coefficient memory 83 to the predictive calculating circuit 82.

The predictive calculating circuit 82 performs a calculation of Expression (1) that is a linear combination model defined by a linear combination of a predictive coefficient W and a pixel value x using a predictive coefficient set (predictive coefficients $w_1, w_2$, and so forth) supplied from the coefficient memory 83 and pixel values (pixel values $x_1, x_2$, and so forth) of pixels that compose predictive taps supplied from the coefficient memory 83, obtains a predictive value E[y] of the considered pixel (HD pixel) y, and treats the calculated result as the pixel value of a HD pixel (HD pixel arranged on line A).

$$E[y]=w_1x_1+w_2x_2+\ldots \quad (1)$$

Alternatively, using a non-linear-combination model, a calculation can be performed.

As described above, pixel values of individual HD pixels arranged on line A of an HD picture are predicted. Thus, line A is generated.

The structure of which the classifying adaptive processing portion 31-2 performs a predictive process as a classifying adaptive process in the process mode (1) is basically the same as the structure of the above-described classifying adaptive processing portion 31-1. In other words, in the classifying adaptive processing portion 31-2, the class tap extracting circuit 71 and the coefficient memory 83 of the classifying portion 61 and the adaptive processing portion 62 extract class taps, predictive taps, and a predictive coefficient set corresponding to required tap extraction information, predictive tap extraction information, and bank selection information. As a result, pixel values of HD pixels arranged on line B of an HD picture (namely, a line at a position that is not the same as a line of the SD picture) are predicted. For example, the pixel value of HD pixel $Y_2$ shown in FIG. 10 is predicted. As a result, line B is generated.

Figure 11:
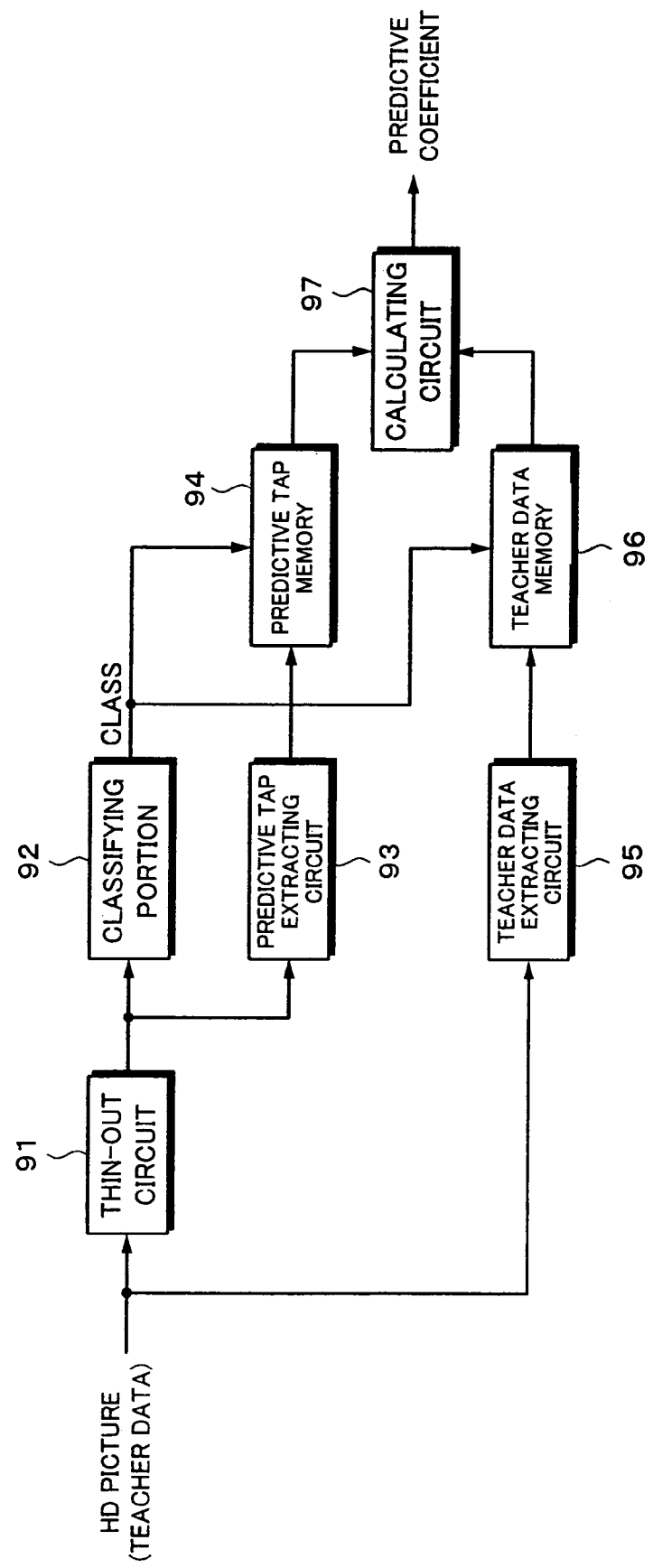
FIG. 11 is a block diagram showing an example of the structure of a learning device that performs a learning process for calculating predictive coefficients that are pre-stored in a coefficient memory of a classifying adaptive processing portion.

FIG. 11 shows an example of the structure of a learning device that performs a learning process for calculating predictive coefficients that are pre-stored to the coefficient memory 83 shown in FIG. 8. In the process mode (1), the learning process is performed for line A and line B. The learnt results for line A and line B are separately output.

An HD picture as teacher data in the learning process is supplied to both a thin-out circuit 91 and a teacher data extracting circuit 95. The thin-out circuit 91 thins out pixels of the HD picture as the teacher data so as to generate an SD picture. The thin-out circuit 91 supplies the SD picture to a classifying portion 92 and a predictive tap extracting circuit 93. For example, the thin-out circuit 91 halves the number of pixels in each of the horizontal direction and the vertical direction of the HD picture so as to form an SD picture.

The classifying portion 92 decides the class of the considered pixel in the same process as the classifying portion 61 shown in FIG. 8 and supplies the decided class to address terminals (AD) of a predictive tap memory 94 and a teacher data memory 96. The predictive tap extracting circuit 93 performs the same process as the predictive tap extracting circuit 81 shown in FIG. 8 so as to extract predictive taps. The predictive tap extraction circuit 93 supplies the extracted predictive taps to the predictive tap memory 94.

The predictive tap memory 94 stores the predictive taps supplied from the predictive tap extracting circuit 93 at an address corresponding to the class supplied from the classifying portion 92.

On the other hand, the teacher data extracting circuit 95 extracts an HD pixel as a considered pixel (designated by the classifying portion 92 and the predictive tap extracting circuit 93) from the supplied HD picture and supplies the HD pixel as teacher data to the teacher data memory 96.

The teacher data memory 96 stores teacher data supplied from the teacher data extracting circuit 95 at an address corresponding to the class supplied from the classifying portion 92.

The above-described process is performed for all pixels as considered pixels that compose an HD picture prepared for the learning process.

As a result, at the same address of the teacher data memory 96 or the predictive tap memory 94, an HD pixel of the class corresponding to the address as teacher data and SD pixels at the positions of predictive taps of the HD pixels as learnt data are stored.

In the predictive tap memory 94 and the teacher data memory 96, a plurality of pieces of information can be stored at the same address. Thus, a plurality of pieces of learnt data and teacher data that are classified as the same class can be stored at the same address.

A calculating circuit 97 reads predictive taps as learnt data or HD pixels as teacher data stored at the same address of the predictive tap memory 94 or the teacher data memory 96, respectively. Using the predictive taps or HD pixels that are read, by for example the method of least squares, a predictive coefficient of which the difference between predictive value and teacher data becomes minimum is obtained. In other words, the calculating circuit 97 solves a normal equation as Expression (2) for each class so as to obtain a predictive coefficient.

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{ij}\right)w_j = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{ij}\right)w_j = \left(\sum_{i=1}^{I} x_{i2}y_i\right) \\ \ldots \\ \left(\sum_{i=1}^{I} x_{ij}x_{i1}\right)w_1 + \left(\sum_{i=1}^{I} x_{ij}x_{i2}\right)w_2 + \ldots + \left(\sum_{i=1}^{I} x_{ij}x_{ij}\right)w_j = \left(\sum_{i=1}^{I} x_{ij}y_i\right) \end{cases} \quad (2)$$

The predictive coefficient set that has been obtained in the above-described manner is stored to the coefficient memory 83 shown in FIG. 8.

Since the structure of the classifying adaptive processing portion 31-2 of the input data processing portion 21 that performs the learning process is the same as that of the above-described classifying adaptive processing portion 31-1, the description will be omitted.

In the above-described example, luminance values are used as pixel values. When a signal is composed of luminance and color differences, the above-described process is performed for each of the luminance and color differences so as to generate an HD picture. In the case, the classifying adaptive processing portions 31-3 and 31-4 of the input data processing portion 21 may execute a classifying adaptive process using color differences and generate line A and line B that compose an HD picture.

The classifying adaptive process for converting an interlaced picture into a non-interlaced picture is described in Japanese Patent Application No. HEI 10-208116 (Japanese Patent Laid-Open Publication No. 2000-41223 laid open on Feb. 8, 2000) and the corresponding U.S. patent application (Ser. No. 09/358,272, filed on Jul. 21, 1999) both of which were filed by the applicant of the present invention.

Although the normal equation as Expression (2) used in obtaining predictive coefficients has been disclosed in prior art (for example, Japanese Patent Laid-Open Publication No. 2000-41223 laid open on Feb. 8, 2000), for allowing the reader to easily understand the present application, it will be described in detail.

To generalize Expression (1) of the linear combination model defined by linear combination of predictive coefficients and pixel values for calculating a predictive value E, defining a matrix W as a set of predictive coefficients $w_j$, a matrix X as a set of student data $x_{ij}$, and a matrix Y' as a set of predictive values $E[y_i]$ as Expression (3), an observation equation as Expression (4) is satisfied.

$$X = \begin{bmatrix} x_{11} & x_{12} & \ldots & x_{1j} \\ x_{21} & x_{22} & \ldots & x_{2j} \\ \ldots & \ldots & \ldots & \ldots \\ x_{I1} & x_{I2} & \ldots & x_{Ij} \end{bmatrix} \quad (3)$$

-continued $$W = \begin{bmatrix} w_1 \\ w_2 \\ \cdots \\ w_j \end{bmatrix}, Y' = \begin{bmatrix} E[y_1] \\ E[y_2] \\ \cdots \\ E[y_j] \end{bmatrix} \quad (4)$$

$$XW = Y'$$

In this case, a component $x_{ij}$ of the matrix X represents j-th student data of an i-th set of student data (a set of student data used for predicting i-th teacher data $y_i$). A component $w_j$ of the matrix W represents a predictive coefficient that is multiplied by j-th student data of a set of the student data. $y_i$ represents i-th teacher data. Thus, $E[y_i]$ represents a predictive value of i-th teacher data. In other words, y on the left side of Expression (1) is obtained by omitting the suffix i of the component $y_i$ of the matrix Y. $x_1, x_2, \ldots$ of the right side of Expression (1) are obtained by omitting the suffix i of the component $x_{ij}$ of the matrix X.

Now, by applying the method of least squares to the observation equation, a predictive value E[y] close to a pixel value y of an HD picture is obtained. In this case, when the matrix E as a set of residuals e of a predictive value E[y] to a pixel value y of an HD pixel is defined with Expression (5), a residual formula as Expression (6) is satisfied with Expression (4).

$$E = \begin{bmatrix} e_1 \\ e_2 \\ \cdots \\ e_j \end{bmatrix}, Y = \begin{bmatrix} y_1 \\ y_2 \\ \cdots \\ y_j \end{bmatrix} \quad (5)$$

$$XW = Y + E \quad (6)$$

In this case, the predictive coefficient $w_i$ for obtaining the predictive value E[y] close to a pixel value y of an HD picture is obtained by minimizing the square error of Expression (7).

$$\sum_{i=1}^{I} e_i^2 \quad (7)$$

Thus, when the result of which the square error is differentiated with the predictive coefficient $W_j$ becomes 0, (in other words) the predictive coefficient $w_j$ that satisfies Expression (8) becomes an optimum value for obtaining the predictive value E[y] that is close to the pixel value y of an HD pixel.

$$e_1 \frac{\partial e_1}{\partial W_j} + e_2 \frac{\partial e_2}{\partial W_j} + \ldots + e_I \frac{\partial e_I}{\partial W_j} = 0 \ (j = 1, 2, \ldots, J) \quad (8)$$

Thus, when Expression (6) is differentiated with the predictive coefficient $w_j$, Expression (9) is satisfied.

$$\frac{\partial e_i}{\partial W_1} = X_{i1}, \frac{\partial e_i}{\partial W_2} = X_{i2}, \ldots, \frac{\partial e_i}{\partial W_j} = X_{ij}, (i = 1, 2, \ldots, I) \quad (9)$$

With Expression (8) and Expression (9), Expression (10) is obtained.

$$\sum_{i=i}^{I} e_i x_{i1} = 0, \sum_{i=i}^{I} e_i x_{i2} = 0, \ldots, \sum_{i=i}^{I} e_i x_{i1} = 0 \quad (10)$$

Considering the relation among the student data $x_{ij}$, predictive coefficients $w_j$, teacher data $y_i$, and residuals $e_j$ of the residual equation as Expression (6), with Expression (10), the normal equations of Expression (2) can be obtained. In this case, for each normal equation as Expression (2), it is preferred to prepare a predetermined number of sets of student data $x_{ij}$ and teacher data $y_i$. Thus, the normal equations corresponding to the number J of predictive coefficients $w_j$ can be obtained. By solving Expression (2), an optimum predictive coefficient $w_j$ can be obtained.

Figure 12:
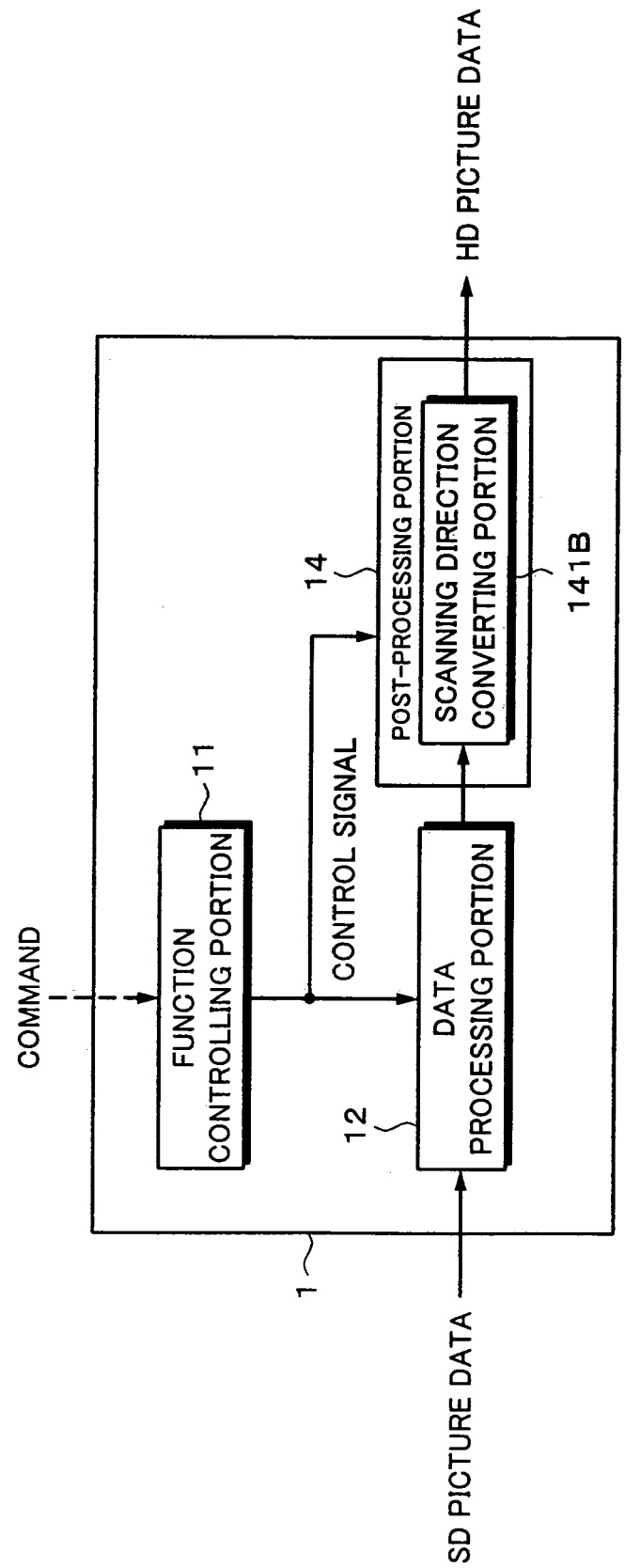
FIG. 12 is a block diagram showing an example of the structure of a data processing apparatus that performs another processing method for the process mode (1)

FIG. 12 shows an example of the structure of the data processing apparatus 1 that performs another processing method for increasing the resolution in the process mode (1). In the other processing method for the process mode (1), the post-processing portion 14 selects a scanning direction converting portion 14B.

The function controlling portion 11 outputs a control signal corresponding to a command that is input in this case to the data processing portion 12.

The data processing portion 12 is initialized with a control signal supplied from the function controlling portion 11. Thereafter, the number of pixels in the horizontal direction of an SD picture as input data supplied from an external device is doubled. Thereafter, a horizontal scanning sequence (television raster scanning sequence) is converted into a vertical scanning sequence. Moreover, the number of pixels in the Vertical direction is doubled. In other words, in the case, an HD picture with a higher resolution than an SD picture is generated.

However, since picture data that is output from the data processing portion 12 is still in the vertical scanning sequence, it is necessary to restore the picture data to the horizontal scanning sequence. Thus, in the data processing apparatus 1, the post-processing portion 14 disposed downstream of the data processing portion 12 selects the scanning direction converting portion 141B corresponding to a control signal supplied from the function controlling portion 11.

As with the intermediate data processing portion 23 of the data processing portion 12, the scanning direction converting portion 141B has a memory. By controlling writing and/or reading process of the picture data that is supplied from the data processing portion 12 to/from the memory, the vertical scanning sequence is converted into the horizontal scanning sequence. For example, picture data that is supplied from the data processing portion 12 to the scanning direction converting portion 141B is address-controlled so that pixels are written in the vertical scanning direction to the memory. When picture data is read from the memory, the memory is address-controlled so that pixels are read in the horizontal scanning direction. Thus, the scanning direction of data is converted from the vertical scanning direction to the horizontal scanning direction. The picture data restored to the horizontal scanning sequence by the scanning direction converting portion 141B is output as output data to an external device.

FIG. 13 shows an example of the connections of the data processing portion 12 that performs the other processing method in the process mode (1). In this example, in the input data processing portion 21, one classifying adaptive processing portion 31-1 is used. SD picture data that is input as input data to the data processing apparatus 1 is supplied to the classifying adaptive processing portion 31-1.

The classifying adaptive processing portion 31-1 performs a classifying adaptive process for generating a picture whose number of pixels in the horizontal direction is twice as many as the supplied SD picture data (hereinafter, sometimes, the generated picture is referred to as intermediate picture) and supplies picture data of the intermediate picture (hereinafter, sometimes, the picture data is referred to as intermediate picture data) to the selector 22.

In the example, in the intermediate data processing portion 23, the memory 41-1 is used. The intermediate picture data is supplied from the select portion 22 to the memory 41-1. The intermediate data processing portion 23 address-controls the memory 41-1 so that the data written in the horizontal scanning direction to the memory 41-1 is read in the vertical scanning direction therefrom. Thus, the intermediate data processing portion 23 converts the horizontal scanning sequence of the intermediate picture into the vertical scanning sequence and returns the converted picture to the selector 22.

In this example, in the output data processing portion 24, the classifying adaptive processing portion 51-1 is used. The intermediate picture data is supplied from the selector 22 to the classifying adaptive processing portion 51-1. The classifying adaptive processing portion 51-1 performs a classifying adaptive process for doubling the number of pixels in the vertical direction of the intermediate picture corresponding to the intermediate picture data supplied from the select portion 22 and supplies the generated picture data to the post-processing portion 14 disposed downstream of the classifying adaptive, processing portion 51-1.

The picture data supplied to the post-processing portion 14 is supplied to the scanning direction converting portion 141B selected by the selector 140 corresponding to a control signal supplied from the function controlling portion 11. The scanning direction converting portion 141B performs a write control and a read control for the memory so that picture data that is written in the vertical scanning direction to the memory is read in the horizontal scanning direction therefrom. As a result, the vertical scanning sequence of the picture data is restored to the horizontal scanning sequence. The picture (HD picture) restored to the horizontal scanning sequence by the scanning direction converting portion 141B is output as output data to an external device.

Next, the predictive process of the classifying adaptive processing portion 31-1 for the input data processing portion 21 according to the other processing method in the process mode (1) will be described.

The class tap extracting circuit 71 (see FIG. 8) of the classifying adaptive processing portion 31-1 reads class tap extraction information required in this example from the register 63A of the register group 63, forms class taps corresponding to the class tap extraction information, and supplies the class taps to the classifying circuit 72.

FIG. 14 shows an example of class tap extraction information corresponding to the other processing method in the process mode (1). FIG. 14 shows an example of class tap extraction information in the process for doubling the number of pixels in the horizontal scanning direction in the process mode (1).

In FIG. 14, ● (black circle) and ○ (white circle) represent SD pixels. Assuming that a considered pixel is a black circle pixel, class taps are composed of seven pixels arranged on a line of which the considered pixel is placed at the center thereof. On the other hand, predictive taps that will be described later are composed of 11 pixels that are wider than the class taps by two pixels.

The class taps and predictive taps used for the process for doubling the number of pixels in the vertical direction may be arranged in the vertical direction rather than the horizontal direction shown in FIG. 14.

Next, with reference to FIG. 15, this process will be described in detail. It is assumed that lines K−1 to K+1 are arranged in a predetermined field of an SD picture as input data. In FIG. 15, large circles ○ represent SD pixels. Small circles represent pixels of an HD picture whose number of pixels in the horizontal direction is twice as many as an SD picture. The pixels are arranged as input data on lines K−1 to K+1 of a predetermined field of the SD picture as shown in FIG. 15.

Now, the case that pixel $Y_{K,5}$ of an intermediate picture on line K is a considered pixel is considered. In the example, according to the class tap extraction information that is read from the register group 63A, a total of seven SD pixels that are SD pixel $X_{K,3}$ that is predicted as a pixel having the highest correlation to pixel $Y_{K,5}$ on line K, two SD pixels $X_{K,2}$ and $X_{K,1}$ arranged on the left of SD pixel $X_{K,3}$, two SD pixels $X_{K,4}$ and $X_{K,5}$ arranged on the right of SD pixel $X_{K,3}$, and SD pixels $X_{k-1,3}$ and SD pixel $X_{K+1,3}$ arranged on line K−1 and line K+1 at the positions corresponding to SD pixel $X_{K,3}$ are selected as class taps.

Before classifying the considered pixel, the classifying circuit 72 reads class tap extraction information required in the process mode from the register 63A of the register group 63, extracts class taps corresponding to the class tap extraction information, and classifies the considered pixel using the extracted class taps. The decided class of the considered pixel is supplied as an address to the coefficient memory 83 of the adaptive processing portion 62.

The predictive tap extracting circuit 81 of the adaptive processing portion 62 reads predictive tap extraction information required in the example from the register 63B of the register group 63, forms predictive taps corresponding to the predictive tap extraction information, and supplies the predictive taps to the predictive calculating circuit 82.

The coefficient memory 83 reads coefficient information required in the example from the register 63C of the register group 63. In the coefficient memory 83, a bank used corresponding to the predictive information is set. From the bank, a predictive coefficient set for doubling the number of pixels in the horizontal direction is read from predictive coefficient sets stored at an address corresponding to the class supplied from the classifying circuit 72. The predictive coefficient set that is read from the bank is supplied to the predictive calculating circuit 82.

The predictive calculating circuit 82 calculates Expression (1) with the predictive coefficient set supplied from the coefficient memory 83 and pixel values of SD pixels that compose predictive taps supplied from the predictive tap extracting circuit 81 and treats the predictive value of the considered pixel as a pixel value of a pixel of the intermediate picture. The intermediate picture composed of the predicted pixels is supplied to the selector 22.

Since the learning process according to the other processing method in the process mode (1) is basically the same as that of the data processing apparatus 1 in the process mode (1), the description thereof will be omitted.

Since the predictive process of the classifying adaptive processing portion 51-1 of the output data processing portion 24 in the example of the other processing method in the process mode (1) is basically the same as that of the classifying adaptive processing portion 31-1 of the input data processing portion 21 of the process mode (1), the detailed description thereof will be omitted. The classifying portion 61 of the classifying adaptive processing portion 51-1 and the predictive tap extracting circuit 81 and the coefficient memory 83 of the adaptive processing portion 62 extract class taps and predictive taps corresponding to tap extraction information, predictive tap information, and coefficient information required in the example of the other processing method in the process mode (1) and read a predictive coefficient set from the coefficient memory 83. Corresponding to the results, pixels for doubling the number of pixels in the vertical direction are predicted.

In addition, since the learning process of the classifying adaptive processing portion 51-1 of the output data processing portion 24 according to the other processing method in the process mode (1) is basically the same as the learning process of the classifying adaptive processing portion 31-1 in the above-described process mode (1), the description thereof will be omitted.

In the above description, the classifying adaptive processing portion 51-1 of the output data processing portion 24 executes the classifying adaptive process for generating a picture whose number of pixels in the vertical direction is doubled so as to generate an HD picture. However, the present invention is not limited to such an example. For example, as with the above-described process mode (1), according to the other processing method in the process mode (1), a classifying adaptive process for predicting pixels arranged on a line (line A) of which a line of an SD picture is present at the same positions as pixels that compose an HD picture and another classifying adaptive process for predicting pixels arranged on a line (line B) of which a line of an SD picture is not present at the same positions as pixels that compose an HD picture can be independently executed. In this case, these classifying adaptive processes of two classifying adaptive processing portions (for example, the classifying adaptive processing portions 51-1 and 51-2) of the output data processing portion 24 can be executed.

In the above-described classifying adaptive process is described in International Patent Laid-Open No. WO 96/07987 and the corresponding U.S. Pat. No. 5,903,481 filed by the applicant of the present invention.

Figure 16:
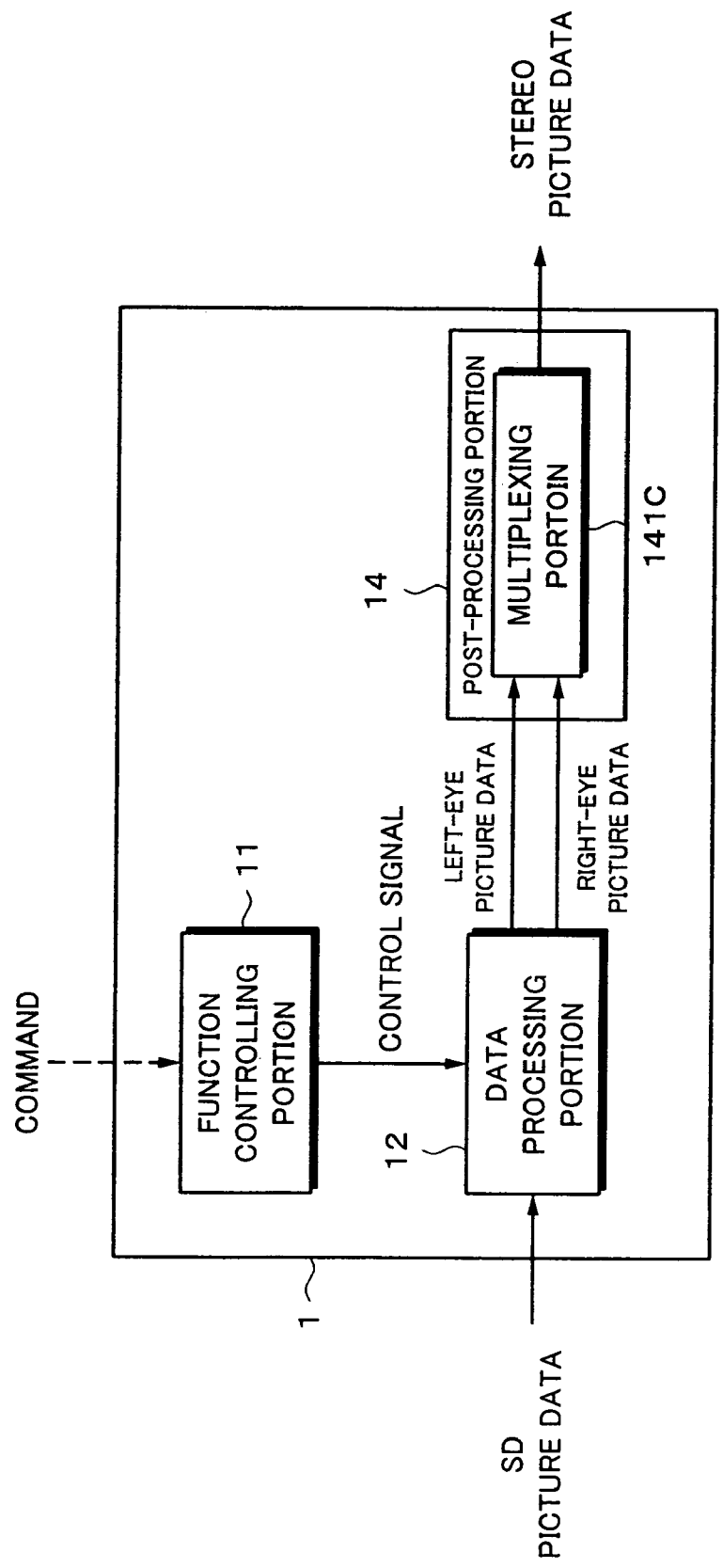
FIG. 16 is a block diagram showing an example of the structure of the data processing apparatus that executes a process for generating a picture dedicated for a left eye and a picture dedicated for a right eye in process mode (2)

FIG. 16 shows an example of the structure of the data processing apparatus 1 that executes a process for generating a picture dedicated for a right eye and a picture dedicated for a left eye in the above-described process mode (2). In the process mode (2), in the post-processing portion 14, the multiplexing portion 141C is used.

In the example, the data processing apparatus 1 generates a picture dedicated for a left eye (hereinafter referred to as left-eye picture) and a picture dedicated for a right eye (hereinafter referred to as right-eye picture) with SD picture data as input data supplied from an external device and outputs picture data (hereinafter referred to as stereo picture data) of the multiplexed picture (hereinafter referred to as stereo picture) as output data to an external device.

In this case, it is assumed that the SD picture data as input data is a television broadcast signal that has been A/D converted with a sampling clock of 13.5 MHz. In other words, the size of the SD picture is around 720 pixels (horizontal)×480 lines (vertical) per frame.

In this example, a command that causes the process for generating a left-eye picture and a right-eye picture to be executed is input to the function controlling portion 11. The function controlling portion 11 outputs a control signal corresponding to the input command to the data processing portion 12.

The function controlling portion 11 also extracts a vertical synchronous signal and a horizontal synchronous signal from the television broadcast signal and controls the data processing portion 12 and the multiplexing portion 141C of the post-processing portion 14 corresponding to the timings thereof.

After the data processing portion 12 is initialized with a control signal supplied from the function controlling portion 11, the data processing portion 12 generates a left-eye picture and a right-eye picture with an SD picture that is input as input data.

The multiplexing portion 141C of the post-processing portion 14 disposed downstream of the data processing portion 12 multiplexes the left-eye picture data and the right-eye picture data supplied from the data processing portion 12, generates stereo picture data, and outputs the generated stereo picture data as output data to an external device.

FIG. 17 shows an example of the connections of the data processing portion 12 in the process mode (2). In the example, in the input data processing portion 21, the two classifying adaptive processing portions 31-1 and 31-2 are used. SD picture data that is input as input data to the data processing apparatus 1 is supplied to the classifying adaptive processing portions 31-1 and 31-2.

The classifying adaptive processing portion 31-1 performs a classifying adaptive process for generating left-eye picture data with the supplied SD picture data. The classifying adaptive processing portion 31-1 supplies the generated left-eye picture data to the selector 22. On the other hand, the classifying adaptive processing portion 31-2 performs a classifying adaptive process for generating right-eye picture data with the supplied SD picture data. The classifying adaptive processing portion 31-2 supplies the generated right-eye picture data to the selector 22.

The selector 22 supplies the left-eye picture data and the right-eye picture data supplied from the classifying adaptive processing portions 31-1 and 31-2 of the input data processing portion 21 to the post-processing portion 14. In the post-processing portion 14, the route of the selector 140 for the supplied left-eye picture data and right-eye picture data is controlled corresponding to a control signal supplied from the function controlling portion 11. The left-eye picture data and right-eye picture data are supplied to the multiplexing portion 141C.

In the process mode (2), the intermediate data processing portion 23 and the output data processing portion 24 are not used.

Next, the predictive process of the classifying adaptive processing portion 31-1 of the input data processing portion 21 in the example will be described.

The class tap extracting circuit 71 (see FIG. 8) of the classifying adaptive processing portion 31-1 reads class tap extraction information required in the example from the register 63A of the register group 63. The classifying adaptive processing portion 31-1 designates each of pixels that compose the left-eye picture finally obtained in the classifying adaptive process as a considered pixel. The left-eye picture does not actually exist before the predictive process is performed. The classifying adaptive processing portion 31-1 extracts class taps corresponding to class tap extraction information corresponding to each considered pixel and supplies the extracted class taps to the classifying circuit 72.

Figure 18A:
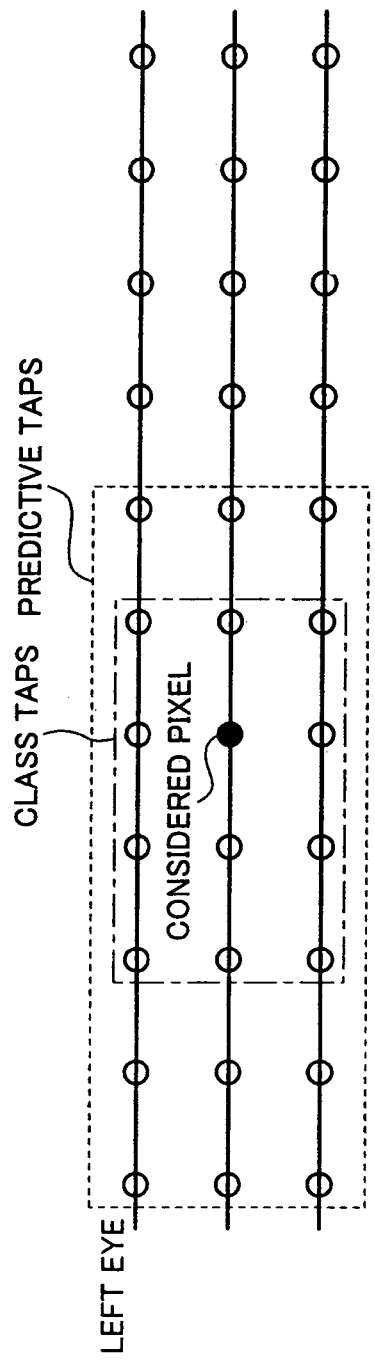
FIG. 18 is a schematic diagram showing an example of class tap extraction information in the process mode (2)
Figure 18B:
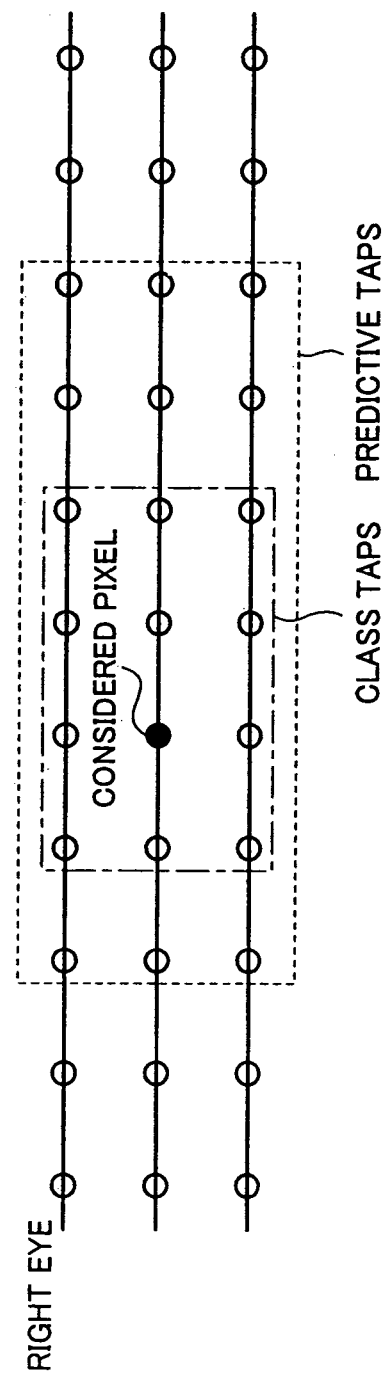

FIGS. 18A and 18B show examples of class tap extraction information in the process mode (2). FIG. 18A shows class tap extraction information for a left-eye picture. FIG. 18B shows class tap extraction information for a right-eye picture. In FIGS. 18A and 18B, ● (black circle) and ○ (white circle) represent SD pixels. Now, it is assumed that in a left-eye picture shown in FIG. 18A, a considered pixel is a black circle. In this case, class taps are composed of 4 pixels×3 pixels that contains a considered pixel and that slightly deviate from the considered pixel (in the example, by 0.5 pixels). On the other hand, predictive taps (that will be described later) are composed of 7 pixels×3 pixels that are wider to the right than the class taps by one pixel and to the left than the class taps by two pixels.

Unlike the left-side picture, in the right-side picture shown in FIG. 18B, class taps are composed of 4 pixels×3 pixels that slightly deviate from a considered pixel (by 0.5 pixels as with the left-eye picture). In the right-side picture, predictive taps are composed of 7 pixels×3 pixels that are wider to the left of the class taps by one pixel and to the right of the class taps by two pixels.

The classifying circuit 72 reads class tap extraction information required in the process mode (2) from the register 63A of the register group 63, decides the class of the considered pixel corresponding to the class tap extraction information, and supplies the class to the coefficient memory 83 of the adaptive processing portion 62.

Figure 19:
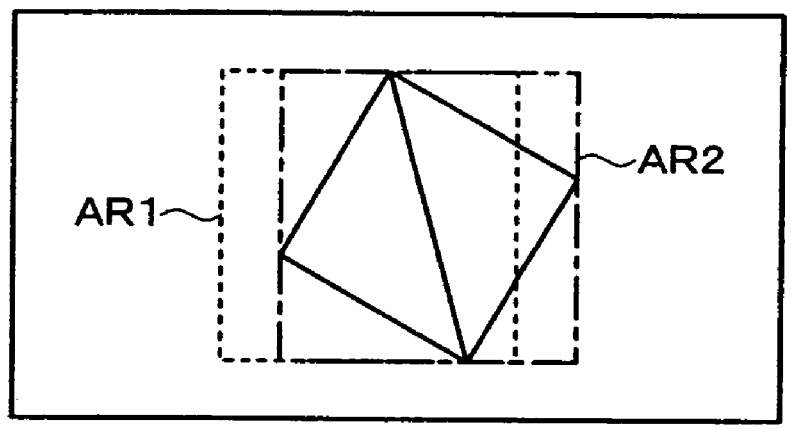
FIG. 19 is a schematic diagram showing in more reality predictive taps in the process mode (2)

The predictive tap extracting circuit 81 of the adaptive processing portion 62 reads predictive tap extraction information required in the process mode (2) from the register 63B of the register group 63. The predictive tap extracting circuit 81 extracts predictive taps from an SD picture supplied to the adaptive processing portion 62 for the considered pixel corresponding to the predictive tap extraction information that has been read and supplies the extracted predictive taps to the predictive calculating circuit 82. For example, as practically shown in FIG. 19, predictive taps AR1 denoted by a dotted line are formed and supplied to the predictive calculating circuit 82.

The coefficient memory 83 reads coefficient information required in the example from the register 63C of the register group 63 and sets a bank that is used corresponding to the coefficient information. The coefficient memory 83 reads a predictive coefficient set for generating a left-eye picture from predictive coefficient sets stored at an address of the bank corresponding to the class supplied from the classifying circuit 72 and supplies the predictive coefficient set to the predictive calculating circuit 82.

The predictive calculating circuit 82 calculates Expression (1) with the predictive coefficient set supplied from the coefficient memory 83 and pixel values of the SD picture that compose the predictive taps supplied from the predictive tap coefficient circuit 81 and designates the predictive value of the considered pixel as the pixel value of a pixel that composes the left-eye picture.

The left-eye picture composed of pixels having pixel values that have been predicted in such a manner are supplied to the selector 22.

Likewise, the classifying adaptive processing portion 31-2 processes a right-eye picture. Since the predictive process of the classifying adaptive processing portion 31-2 is basically the same as the predictive process of the classifying adaptive processing portion 31-1, the detailed description thereof will be omitted. The classifying portion 61 of the classifying adaptive processing portion 31-2, the predictive tap extracting circuit 81 of the adaptive processing portion 62, and the coefficient memory 83 extract class taps corresponding to tap extraction information, predictive tap extraction information, and coefficient information required in the process mode (2) and read a predictive coefficient set from the coefficient memory 83.

For example, the predictive tap extracting circuit 81 forms predictive taps AR2 (denoted by a dot-dash line shown in FIG. 19) that deviate by several pixels to the right of the predictive taps AR1 formed by the classifying adaptive processing portion 31-1. The amount of deviation between the predictive taps AR1 and AR2 can be set corresponding to parallax designated between a left-eye picture and a right-eye picture that are generated.

In addition, the coefficient memory 83 of the classifying adaptive processing portion 31-2 reads a predictive coefficient set for generating a right-eye picture from the bank and supplies the predictive coefficient set to the predictive calculating circuit 82. The predictive calculating circuit 82 calculates Expression (1) with the predictive coefficient set supplied from the coefficient memory 83 and the predictive taps supplied from the predictive tap extracting circuit 81 and designates the predictive value of the considered pixel as the pixel value of a pixel that composes the right-eye picture.

The right-eye picture composed of pixels having predicted pixel values is supplied to the selector 22.

Figure 20:
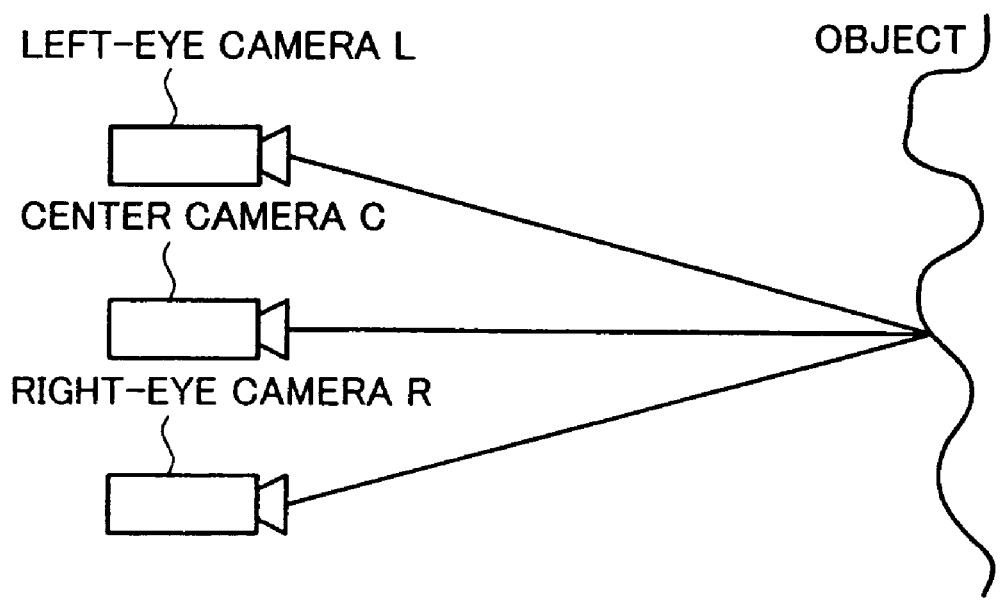
FIG. 20 is a schematic diagram for explaining a picture that is learnt.

Next, the learning process in the process mode (2) will be described. When the learning process is performed by the classifying adaptive processing portion 31-1, as shown in FIG. 20, an object is photographed by three television cameras (a left-eye camera L, a right-eye camera R, and a center camera C) disposed at positions having respective parallaxes. Among the three photographed pictures, pictures photographed by the left-eye camera L and the center camera C are used. However, in the learning process of the classifying adaptive processing portion 31-2, pictures photographed by the right-eye camera R and the center camera C are used.

Figure 21:
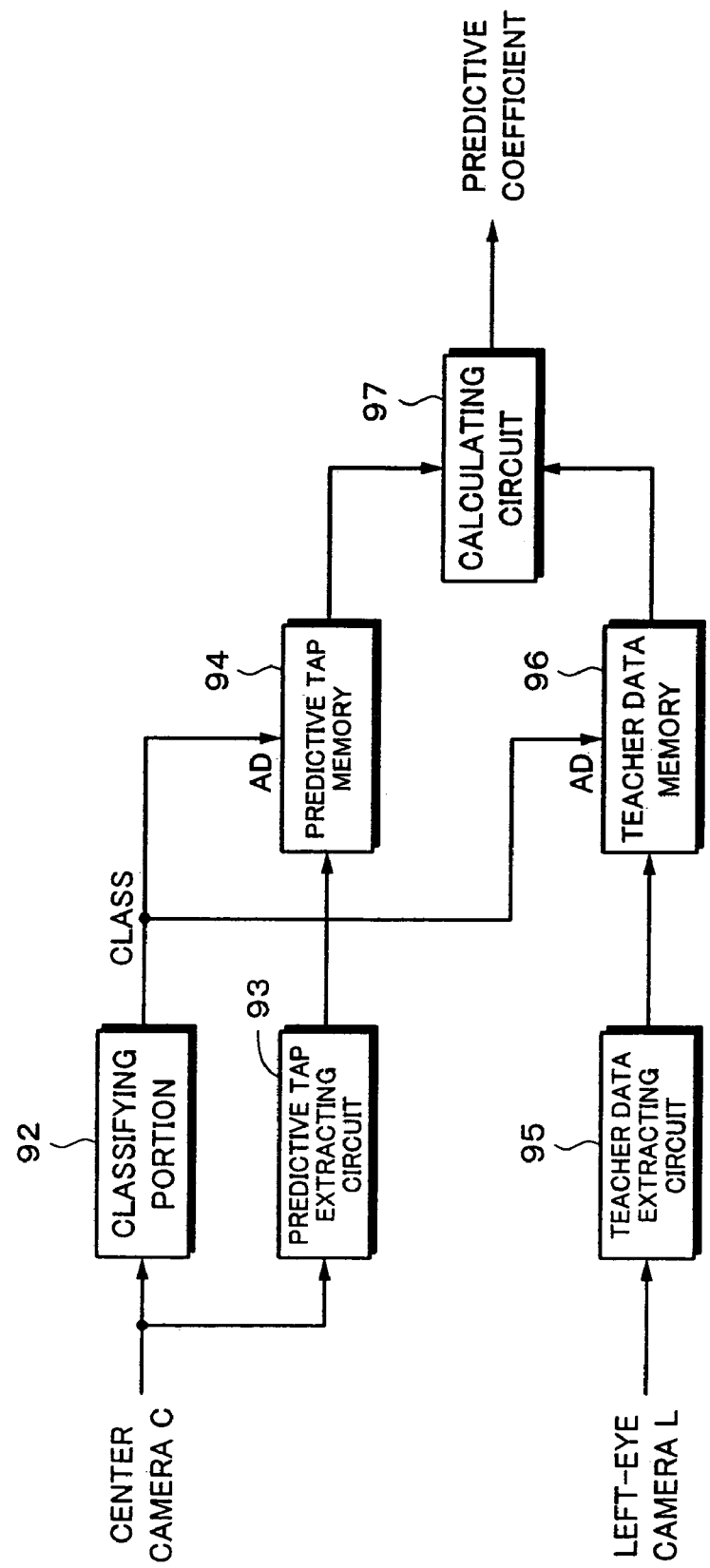
FIG. 21 is a block diagram showing an example of the structure of the classifying adaptive processing portion that executes a learning process in the process mode (2)

FIG. 21 shows an example of the structure of the classifying adaptive processing portions 31-1 and 31-2 that perform a learning process in the process mode (2). In the structure, the thin-out circuit 91 of the structure shown in FIG. 11 is not used.

A picture photographed by the center camera C is supplied to the classifying portion 92 and the predictive tap extracting circuit 93. A picture photographed by the left-eye camera L is supplied to the teacher data extracting circuit 95. In other words, in the example, the picture photographed by the center camera C is classified (namely, a class of the picture is decided). With teacher data that is a picture photographed by the left-eye camera L, a predictive coefficient that represents the correlation between the picture photographed by the center camera C and the picture photographed by the left-eye camera L is obtained for each class.

A set of predictive coefficients that have been obtained in such a manner is stored to the coefficient memory 83 of the classifying adaptive processing portion 31-1.

Since the processes of the classifying portion 92 to the calculating circuit 97 are basically the same as those in the case shown in FIG. 11, the description thereof will be omitted.

The learning process of the classifying adaptive processing portion 31-2 is the same as that of the classifying adaptive processing portion 31-1 except that a picture photographed by the right-eye camera R is teacher data. In other words, a predictive coefficient that represents the correlation between the picture photographed by the center camera C and the picture photographed by the right-eye camera R is obtained. A set of predictive coefficients that have been obtained in such a manner is stored to the coefficient memory 83 of the classifying adaptive processing portion 31-2.

The classifying adaptive process for generating a left-eye picture and a right-eye picture is described in Japanese Patent Laid-Open Publication No. HEI 9-55962 (laid open on Feb. 25, 1997) that was filed by the applicant of the present invention.

Figure 22:
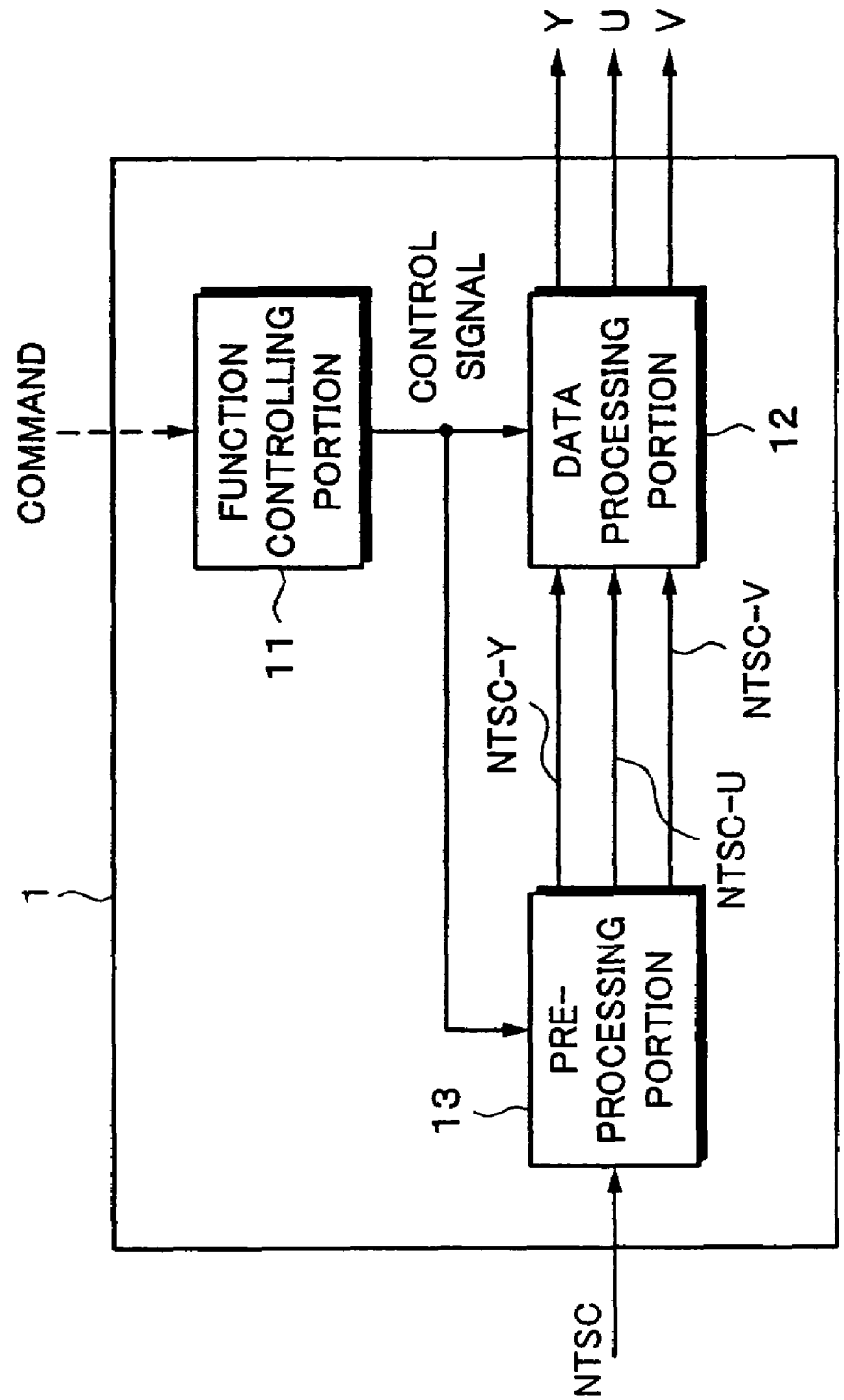
FIG. 22 is a block diagram showing an example of the structure of the data processing apparatus that executes a process for generating a luminance signal and color difference signals in process mode (3)

FIG. 22 shows an example of the structure the data processing apparatus 1 that executes a process for generating a luminance signal and color difference signals in the process mode (3). In this example, an NTSC (National Television System Committee) format picture (hereinafter referred to as NTSC picture) is supplied from an external device to the data processing apparatus 1. In this example, it is assumed that the NTSC picture data supplied to the data processing apparatus 1 is only an SD picture as a so-called composite video signal of which a luminance signal Y and color difference signals U and V are frequency-multiplexed (hereinafter, the composite video signal is referred to as composite signal NTSC).

The data processing apparatus 1 separates the supplied NTSC picture data into luminance Y and color differences U and V. When the NTSC picture data is supplied to the data processing apparatus 1, the pre-processing portion 13 performs a gain compensating process, a subcarrier reproducing process, a phase shifting process, and so forth for the NTSC picture data and supplies the processed NTSC picture data to the data processing portion 12. The data processing portion 12 performs the classifying adaptive process for the supplied data corresponding to the pre-learnt predictive coefficient set, generates the luminance signal Y and the color difference signals U and V, and outputs these signals. Hereinafter, these output signals are together referred to as component signal (Y, U, V). In the process mode (3), the pre-processing portion 13 is not the above-described delaying circuit, but a circuit that performs the gain compensating process, sub-carrier reproducing process, phase shifting process, and so forth.

FIG. 23 shows an example of the connections of the data processing portion 12 in the process mode (3). In the process mode (3), in the input data processing portion 21, the three classifying adaptive processing portions 31-1, 31-2, and 31-3 are used. Signals NTSC-Y, NTSC-U, and NTSC-V of which the SD picture data that is input as input data to the data processing apparatus 1 is pre-processed in a predetermined manner (that will be described later) are supplied to the classifying adaptive processing portions 31-1, 31-2, and 31-3, respectively.

The classifying adaptive processing portion 31-1 performs a classifying adaptive process for generating the luminance signal Y with the supplied signal NTSC-Y and supplies the generated luminance signal Y to the selector 22. Likewise, the classifying adaptive processing portions 31-2 and 31-3 perform classifying adaptive processes for generating the color difference signals U and V with the supplied signals NTSC-U and NTSC-V, respectively, and supply the generated color difference signals U and V to the selector 22.

The selector 22 supplies the luminance signal Y and the color difference signals U and V supplied from the classifying adaptive processing portions 31-1, 31-2, and 31-3 of the input data processing portion 21 as output signals to the post-processing portion 14. The post-processing portion 14 outputs the supplied signals as they are.

In the process mode (2), the intermediate data processing portion 23 and the output data processing portion 24 are not used.

Figure 24:
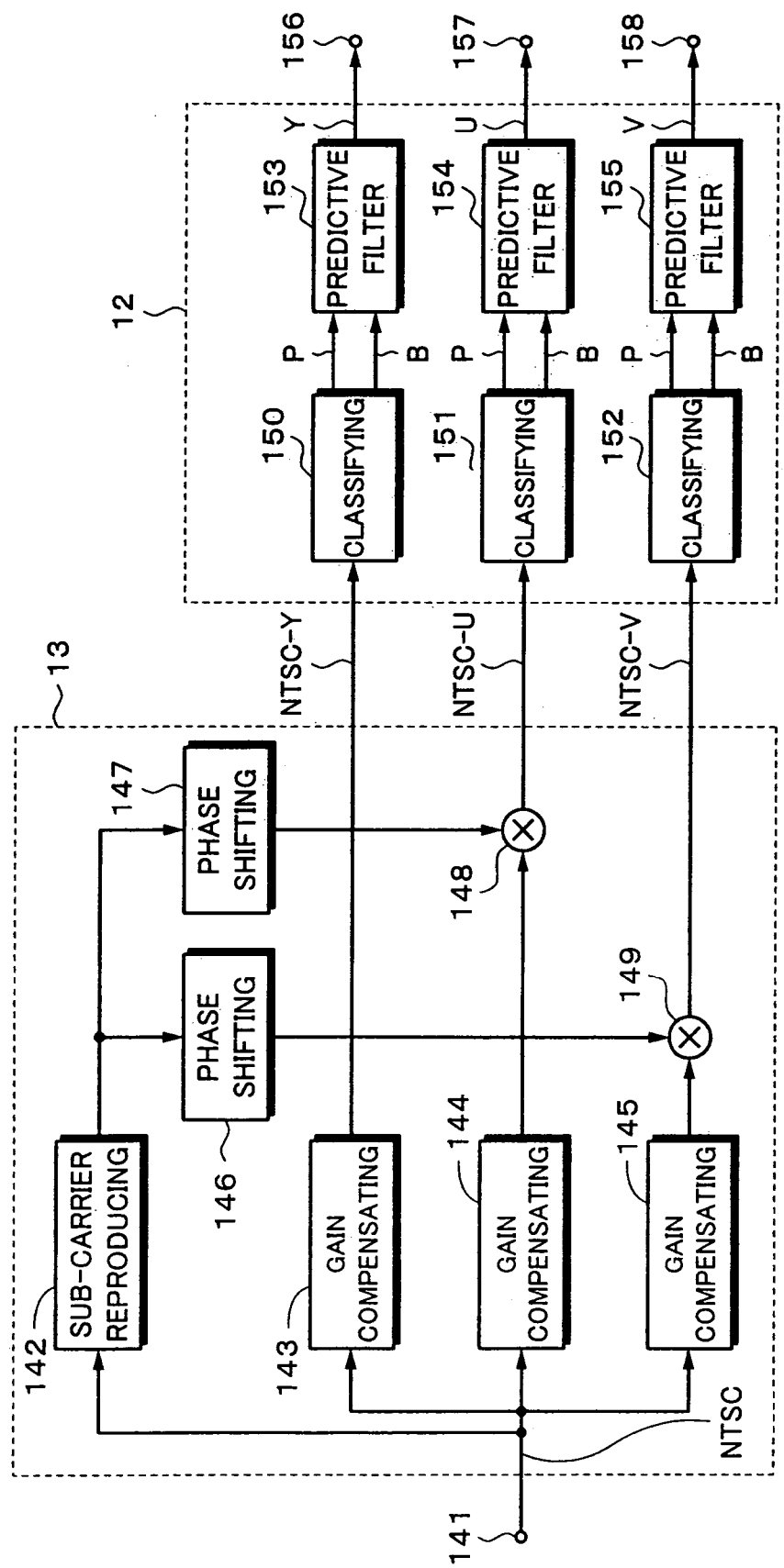
FIG. 24 is a block diagram showing an example of the structure of the data processing apparatus that accomplishes a Y/C separating device that separates a composite signal NTSC into a component signal (Y, U, V) corresponding to the classifying adaptive process in the process mode (3)

FIG. 24 shows an example of the structure of the data processing apparatus 1 that accomplishes a Y/C separating device that performs a classifying adaptive process for separating the composite signal NTSC into the component signal (Y, U, V) in the process mode (3). As denoted by a dot line shown in FIG. 24, a block disposed upstream of classifying circuits 50, 51, and 52 corresponds to the pre-processing portion 13. A block disposed downstream of the classifying circuits 50, 51, and 52 corresponds to the classifying adaptive processing portions 31-1, 31-2, and 31-3. A classifying portion 50 corresponds to the classifying portion 61 of the classifying adaptive processing portion 31. A predictive filter 53 corresponds to the adaptive processing portion 62 of the classifying adaptive processing portion 31. In FIG. 24, the register group 63 of the classifying adaptive processing portion 31 is omitted.

A composite signal NTSC is supplied from an input terminal-141. A sub-carrier reproducing circuit 142 extracts a sub-carrier from the supplied composite signal NTSC and reproduces it. In addition, the supplied composite signal NTSC is supplied to gain compensating circuits 143, 144, and 145. The gain compensating circuit 143 performs a gain compensation for converting the level of the composite signal NTSC into the level of the luminance signal Y. The signal that is output from the gain compensating circuit 143 is the NTSC-Y signal and supplied to the classifying circuit 150.

Likewise, the gain compensating circuit 144 compensates the gain. A multiplying circuit 148 multiplies a sub-carrier that has been phase-shifted by −123 degrees against the sub-carrier reproduced by the sub-carrier reproducing circuit 142 by the output of the gain compensating circuit 144 and thereby generates the NTSC-U signal. The NTSC-U signal is supplied to a classifying circuit 151.

Likewise, the gain compensating circuit 145 compensates the gain. A multiplying circuit 149 multiplies a sub-carrier that has been phase-shifted by −33 degrees against the sub-carrier reproduced by the sub-carrier reproducing circuit 142 by the output of the gain compensating circuit 145 and thereby generates the NTSC-V signal. The NTSC-V signal is supplied to a classifying circuit 152.

The classifying circuit 150 outputs class code P and data B generated with the supplied NTSC-Y signal to a predictive filter 153. The predictive filter 153 reads a filter coefficient corresponding to the supplied class code P. The predictive filter 153 calculates the filter coefficient and the supplied data B and thereby generates the luminance signal Y. The generated luminance signal Y is obtained from an output terminal 156.

The classifying circuit 151 outputs class code P and data B generated with the supplied NTSC-U signal to a predictive filter 154. The predictive filter 154 reads a filter coefficient corresponding to the supplied class code P, calculates the filter coefficient and the supplied data B, and thereby generates the color difference signal U. The generated color difference signal U is obtained from an output terminal 157.

Likewise, the classifying circuit 152 outputs class code P and data B generated with the supplied NTSC-V signal to a predictive filter 155. The color difference signal is obtained from the predictive filter 155 through an output terminal 158. In such a manner, the component signal (Y, U, V) can be obtained.

Figure 25A:
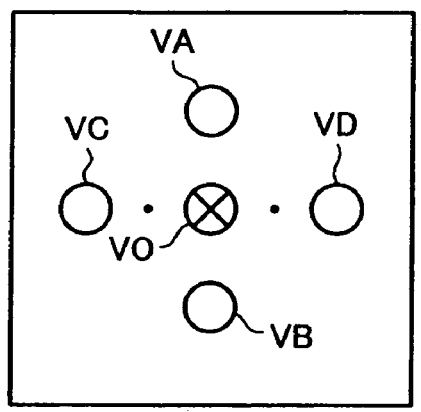
FIG. 25 is a schematic diagram showing an example of class tap extraction information in the process mode (3)
Figure 25B:
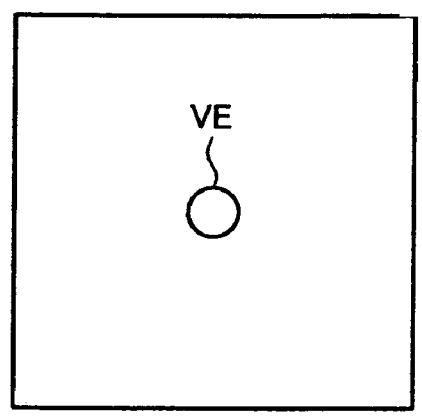

Next, with reference to FIGS. 25 and 26, class taps and predictive taps used in the process mode (3) will be described. As shown in FIGS. 25A and 25B, when a considered pixel is pixel V0, class taps are composed of pixel V0, pixels VA and VB on the upper and lower lines of pixel V0 at the corresponding positions of pixel V0 in the field of pixel V0 (0 field), pixels VC and VD that are apart from pixel V0 by one pixel in the horizontal direction, and pixel VE of the preceding frame (−1 frame=−2 frame) corresponding to pixel V0.

The reason why pixels VC and VD that are apart from pixel VO by one pixel in the horizontal direction are used is to synchronize the phase.

Figure 26:
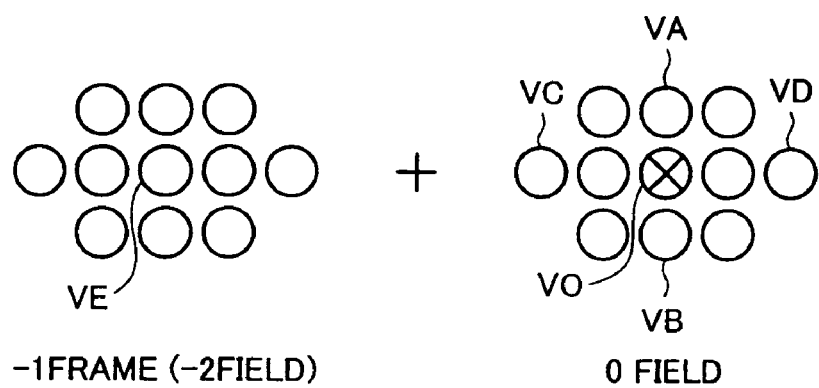
FIG. 26 is a schematic diagram showing an example of the predictive tap extraction information in the process mode (3)

On the other hand, as shown in FIG. 26, predictive taps are composed of pixel VO, pixels that immediately surround pixel VO in the field of pixel VO, the above-mentioned pixels VC and VD, and all the corresponding pixels of the preceding frame of the field of pixel VO. Since a coefficient is obtained in consideration of the difference of phases of pixels in the learning process (that will be described later), predictive taps can be extracted from pixels that have different phases.

Figure 27:
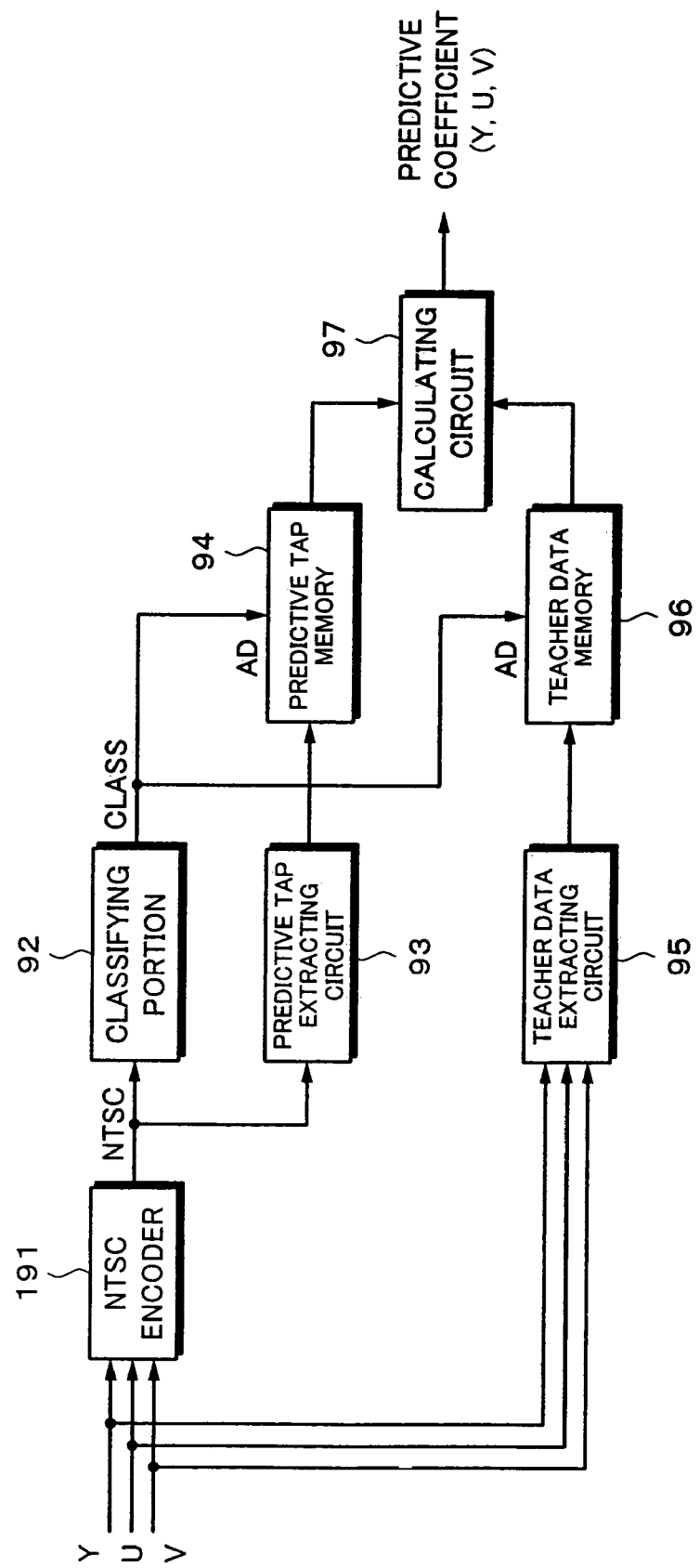
FIG. 27 is a block diagram showing an example of the structure of the classifying adaptive processing portion that executes a learning process in the process (3) is executed.

Next, the learning process in the process mode (3) will be described. FIG. 27 shows an example of the structure of the classifying adaptive processing portions 31-1, 31-2, and 31-3 that perform a learning process in the process mode (3). In the structure shown in FIG. 27, the thin-out circuit 91 of the structure shown in FIG. 11 is not used. Instead, an NTSC encoder 191 is disposed. In FIG. 27, similar portions to those in FIG. 11 are denoted by similar reference numerals and the detailed description thereof will be omitted.

Predetermined luminance signal Y and color difference signals U and V are supplied to the NTSC encoder 191. The NTSC encoder 191 encodes the input signals into a composite signal NTSC. The composite signal NTSC is supplied to a classifying portion 92 and a predictive tap extracting circuit 93. In other words, in such a structure, with the composite signal NTSC, a considered pixel is classified and predictive taps are extracted. In addition, the luminance signal Y and color difference signals U and V are supplied to a teacher data extracting circuit 95. In the structure, with teacher signal that are the luminance signal and color difference signals U and V, using the composite signal NTSC, a predictive coefficient set is generated.

A predictive coefficient set is generated for each of the luminance signal Y and color difference signals U and V. The predictive coefficient set corresponding to the luminance signal Y is applied for the classifying adaptive processing portion 31-1 (namely, the classifying circuit 150 and the predictive filter 153). The predictive coefficient set corresponding to the color difference signal U is applied for the classifying adaptive processing portion 31-2 (namely, the classifying circuit 151 and the predictive filter 154). The predictive coefficient set corresponding to the color difference signal V is applied for the classifying adaptive processing portion 31-3 (namely, the classifying circuit 152 and the predictive filter 155).

Figure 28:
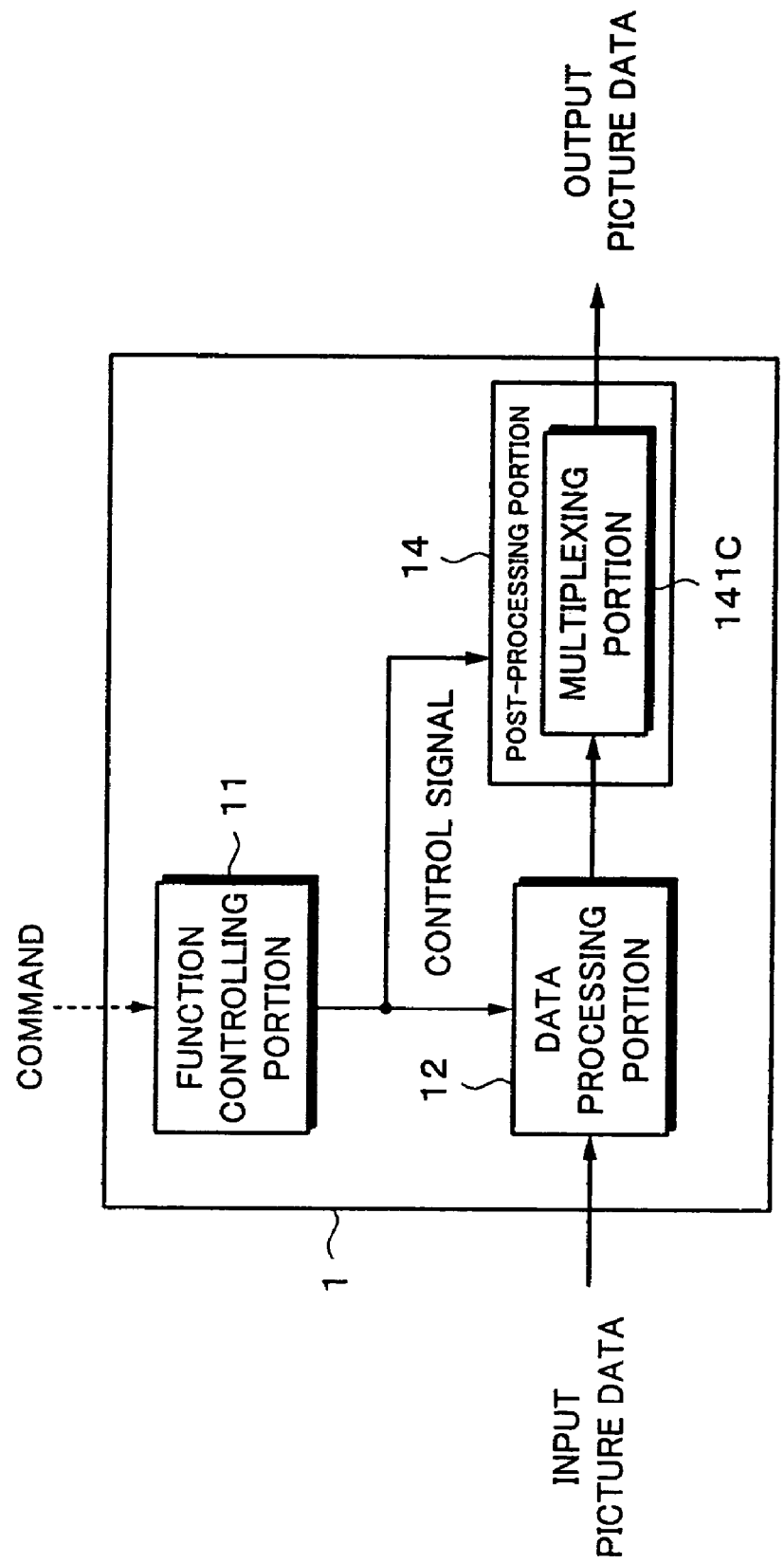
FIG. 28 is a block diagram showing an example of the structure of the data processing apparatus that converts the aspect ratio in process mode (4)

FIG. 28 shows an example of the structure of the data processing apparatus 1 that converts the aspect ratio in the above-described process mode (4). In this example, the data processing portion 12 increases the number of pixels only in the horizontal direction of a picture corresponding to picture data as input data (hereinafter referred to as input picture) and changes the aspect ratio.

In this example, with three chronologically successive pixels (three pixels arranged successively in the horizontal direction), four chronologically successive pixels (four pixels arranged successively in the horizontal direction) of a picture (hereinafter referred to as output picture) corresponding to picture data as output data are predicted. In this case, pixels of an output picture are newly predictively created. In other words, in this example, an output picture is generated in the state that the ratio of the number of pixels in the horizontal direction of the input picture to the number of pixel in the horizontal direction of the output picture is 3 to 4.

The function controlling portion 11 outputs a control signal corresponding to an input command to the data processing portion 12. The data processing portion 12 selects a bank corresponding to the process mode (4) corresponding to the control signal supplied from the data processing portion 12. The data processing portion 12 executes a classifying adaptive process for generating four pixels with three pixels corresponding to a coefficient set of the selected bank. The data processing portion 12 performs the classifying adaptive process for each of the four pixels. Thus, the selector 140 of the post-processing portion 14 selects the multiplexing portion 141C that performs a multiplexing process corresponding to a control signal supplied from the function controlling portion 11.

The multiplexing portion 141C multiplexes picture data supplied from the data processing portion 12. In other words, the multiplexing portion 141C outputs an output picture of which the aspect ratio of the input picture was changed as output data to an external device.

FIG. 29 shows an example of the connections of the data processing portion 12 in the process mode (4). In this example, in the input data processing portion 21, the four classifying adaptive processing portions 31-1 to 31-4 are used. An input picture is supplied to the classifying adaptive processing portions 31-1 to 31-4.

The input data processing portion 21 performs a predetermined classifying adaptive process for the input picture and outputs picture data of which the ratio of the number of pixels in the horizontal direction of an input picture to the number of pixels in the horizontal direction of an output picture is 3 to 4 to the selector 22.

The selector 22 supplies picture data supplied form the input data processing portion 21 to the post-processing portion 14. As was described above, in the post-processing portion 14, the selector 140 selects the multiplexing portion 141C corresponding to a control signal supplied form the function controlling portion 11. The picture data supplied to the post-processing portion 14 is supplied to the multiplexing portion 141C. The multiplexing portion 141C multiplexes the picture data supplied from the post-processing portion 14 and outputs the multiplexed picture data as output picture data.

The intermediate data processing portion 23 and the output data processing portion 24 are not used in the process mode (4).

Next, with reference to FIG. 30, the predictive process of the classifying adaptive processing portion 31 of the input data processing portion 21 in the process mode (4) will be described. FIGS. 30A and 30B schematically show pixels of an input picture and pixels of an output picture.

The classifying adaptive processing portion 31-1 performs a classifying adaptive process in such a manner that a pixel of an output picture that has a first phase relation to a pixel of an input picture (namely, a pixel arranged on the same vertical line as a pixel of an input picture) is designated as a considered pixel and predicts the pixel value of the considered pixel. In the example shown in FIG. 30, pixels Pb1 and Pb5 that compose an output picture and pixels Pa1 and Pa4 that compose an input picture and that correspond to pixels pb1 and pb5 are used as considered pixels.

The classifying adaptive processing portion 31-2 performs a classifying adaptive process in such a manner that a pixel that is immediately chronologically preceded by a pixel whose pixel value has been predicted by the classifying adaptive processing portion 31-1 (namely, a pixel having a second phase relation to a pixel of an input picture) is designated as a considered pixel and predicts the pixel value of the considered pixel. In the example shown in FIG. 30B, pixel Pb1 is a pixel whose pixel value is predicted by the classifying adaptive processing portion 31-1. Pixel Pb2 arranged adjacent to pixel Pb1 is a considered pixel designated by the classifying adaptive processing portion 31-2.

The classifying adaptive processing portion 31-3 performs a classifying adaptive process in such a manner that a pixel that is immediately chronologically preceded by a pixel whose pixel value is predicted by the classifying adaptive processing portion 31-2 (namely, a pixel having a third phase relation to a pixel of an input picture) is designated as a considered pixel and predicts the pixel value of the considered pixel. In the example shown in FIG. 30B, pixel Pb2 is a pixel whose pixel value is predicted by the classifying adaptive processing portion 31-2. Pixel Pb3 arranged adjacent to pixel Pb2 is a considered pixel designated by the classifying adaptive processing portion 31-3.

The classifying adaptive processing portion 31-4 performs a classifying adaptive process in such a manner that a pixel (having a fourth phase relation to a pixel of an input picture) that is immediately chronologically preceded by a pixel (in the example shown in FIG. 30B, pixel Pb3) whose pixel value is predicted by the classifying adaptive processing portion 31-3 is designated as a considered pixel and predicts the pixel value of the considered pixel. In the example shown in FIG. 30B, pixel Pb3 is a pixel whose pixel value is predicted by the classifying adaptive processing portion 31-3. Pixel Pb4 arranged adjacent to pixel Pb3 is a considered pixel designated by the classifying adaptive processing portion 31-4.

In other words, since the number of pixels in the horizontal direction is increased in the ratio of 3 to 4, there are four types of phase relations in the horizontal relation of a pixel (considered pixel) of an output picture and a pixel of an input picture. Each of the classifying adaptive processing portions 31-1 to 31-4 performs a classifying adaptive process corresponding to one of the four types of phase relations and supplies the generated pixel to the selector 22.

The selector 22 supplies picture data (pixel) supplied from the classifying adaptive processing portion 31 to the post-processing portion 14. As was described above, in the post-processing portion 14, the selector 14 supplies the supplied picture data to the multiplexing portion 141C corresponding to a control signal supplied from the function controlling portion 11. The multiplexing portion 141C multiplexes the picture data and outputs the multiplexed picture data to an external device. In such a manner, the aspect ratio is changed.

In the process mode (4), by increasing the number of pixels in the horizontal scanning direction, the aspect ration is changed. Likewise, by decreasing the number of pixels in the horizontal scanning direction, the aspect ratio can be changed.

Figure 31:
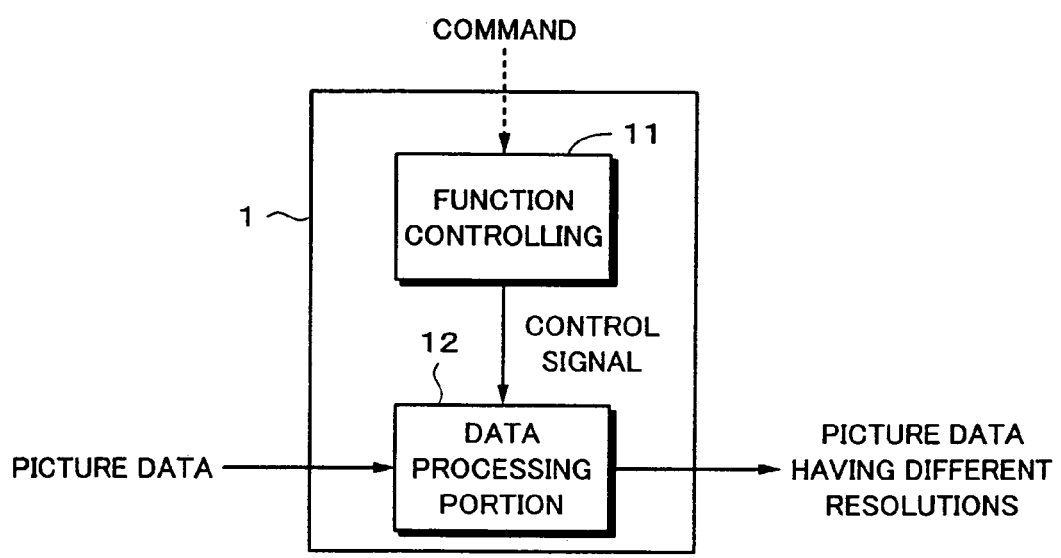
FIG. 31 is a block diagram showing an example of the structure of the data processing apparatus that generates a picture having a different resolution in process mode (5)

FIG. 31 shows an example of the structure of the data processing apparatus 1 that generates a picture having a different resolution in the above-described process mode (5). In the example, the data processing portion 12 generates picture data corresponding to a plurality of pictures having different resolutions with SD picture data as input data supplied from an external device and outputs the generated picture data as output data to an external device.

FIG. 32 shows an example of the connections of the data processing portion 12 in the process mode (5). In the example, in the input data processing portion 21, the classifying adaptive processing portions 31-1 and 31-2 are used. SD picture data as input data is supplied to the classifying adaptive processing portions 31-1 and 31-2.

The classifying adaptive processing portion 31 performs a classifying adaptive process for supplied SD picture data and supplies the generated picture data having a first resolution to the selector 22.

The classifying adaptive processing portion 31-2 performs a classifying adaptive process for the supplied SD picture data and supplies the generated picture data having a second resolution to the selector 22.

The selector 22 supplies picture data having the first resolution supplied from the classifying adaptive processing portion 31-1 of the input data processing portion 21 to the classifying adaptive processing portions 51-1 and 51-2 of the output data processing portion 24.

The selector 22 supplies the picture data having the second resolution supplied from the classifying adaptive processing portion 31-2 of the input data processing portion 21 to the classifying adaptive processing portions 51-3 and 51-4 of the output data processing portion 24.

In this example, in the output data processing portion 24, the classifying adaptive processing portions 51-1 to 51-4 are used.

The classifying adaptive processing portion 51-1 performs a classifying adaptive process for the picture data having the first resolution supplied through the selector 22 and generated by the classifying adaptive processing portion 31-1 and outputs the generated picture data having the third resolution as output data.

The classifying adaptive processing portion 51-2 performs a classifying adaptive process for the picture data having the first resolution supplied through the selector 22 and generated by the classifying adaptive processing portion 31-1 and outputs the generated picture data having the fourth resolution as output data.

The classifying adaptive processing portion 51-3 performs a classifying adaptive process for the picture data having the second resolution supplied through the selector 22 and generated by the classifying adaptive processing portion 31-2 and outputs the generated picture data having the fifth generation as output data.

The classifying adaptive processing portion 51-4 performs a classifying adaptive process for the picture data having the second resolution supplied through the selector 22 and generated by the classifying adaptive processing portion 31-2 and outputs the generated picture data having the sixth resolution as output data.

In the process mode (5), a plurality of pictures having different resolutions can be generated. Thus, for example, multi-windows having different sizes can be displayed.

The classifying adaptive process of each classifying adaptive processing portion of the input data processing portion 21 and the output data processing portion 24 may be the same as that of the above-described data processing apparatus 1 in the process mode (1). In addition, in the process mode (5), the same class taps and predictive taps as those in the above-described process mode (1) can be used.

Figure 33:
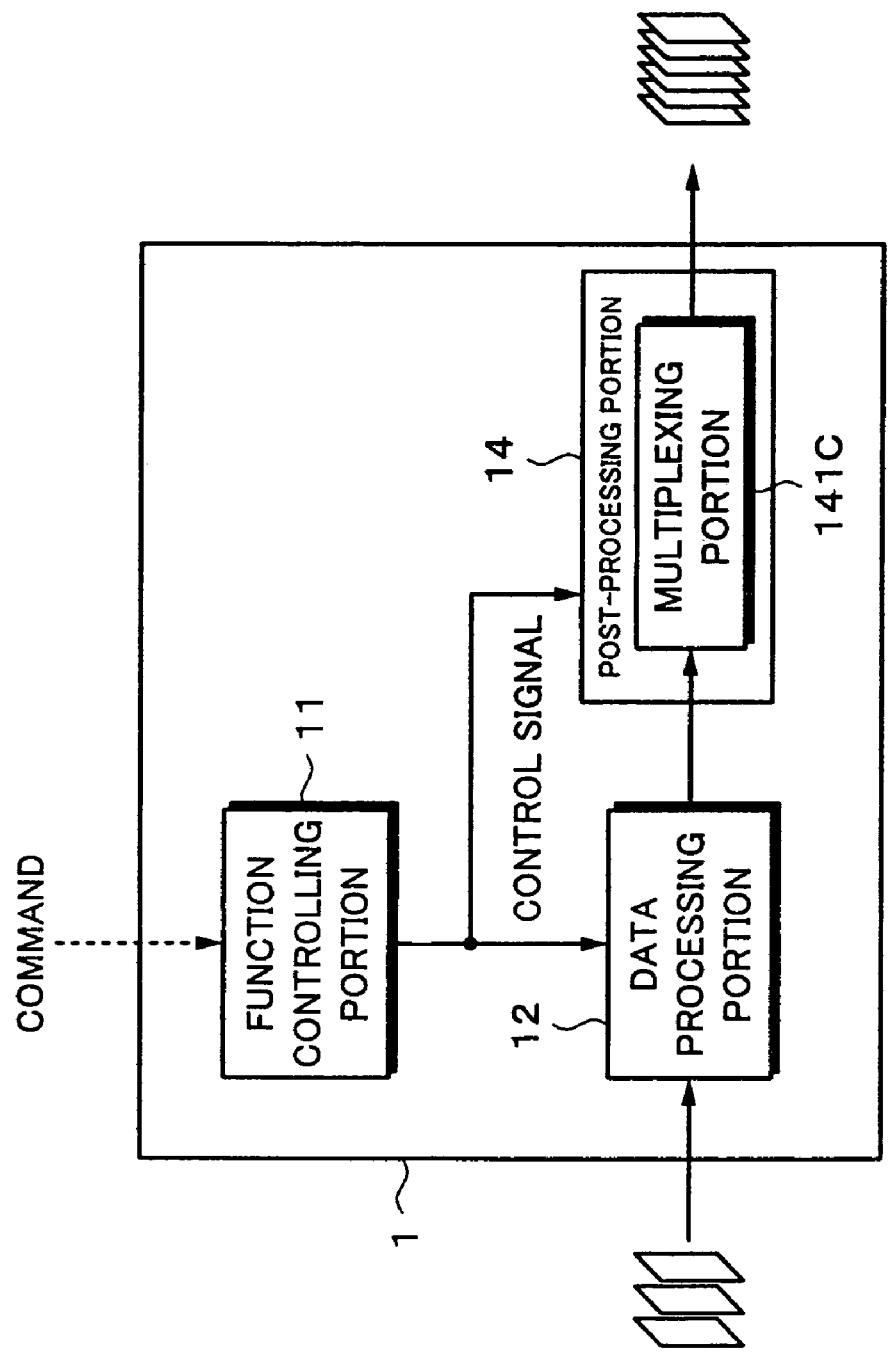
FIG. 33 is a block diagram showing an example of the structure of the data processing apparatus that converts a frame rate in process mode (6)

FIG. 33 shows an example of the structure of the data processing apparatus 1 that converts the frame rate in the above-described process mode (6). In this case, the data processing apparatus 1 converts the frame rate of a picture that is input as input data.

The function controlling portion 11 supplies a control signal corresponding to a command that is input in the process mode (6) to the data processing portion 12. The data processing portion 12 selects a bank for the process mode (6) corresponding to the control signal supplied from the function controlling portion 11. The data processing portion 12 executes a classifying adaptive process for generating a new frame with picture data as input data corresponding to a coefficient set of the selected bank. In the process mode (6), the post-processing portion 14 selects the multiplexing portion 141C corresponding to the control signal supplied from the function controlling portion 11 so as to multiplex a frame that is newly generated by the data processing portion 12.

A multiplexing portion 106 chronologically multiplexes picture data (as frames) supplied from the data processing portion 12 and outputs the multiplexed data as output data to the outside.

FIG. 34 shows an example of the connections of the data processing portion 12 in the process mode (6). In the example, in the input data processing portion 21, the classifying adaptive processing portions 31-1 and 31-2 are used. A picture as input data is input to each of the classifying adaptive processing portions 31-1 and 31-2.

Figure 35A:
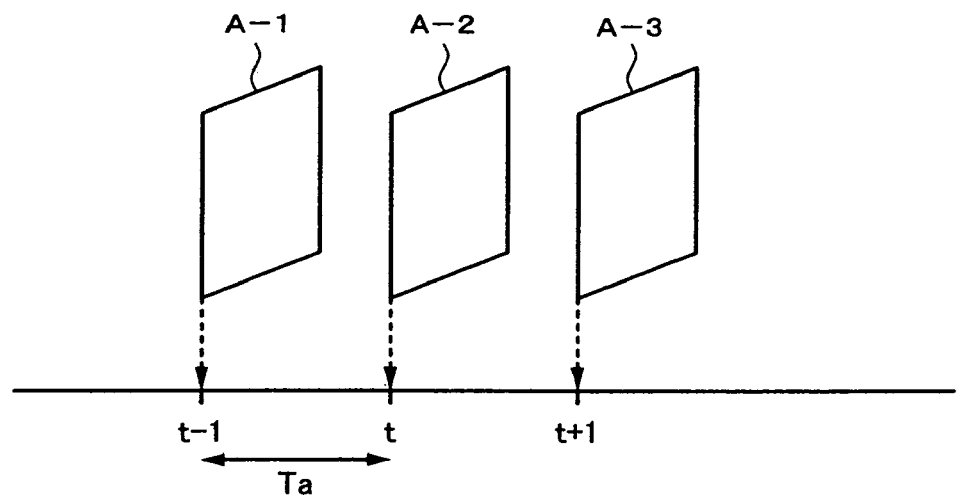
FIG. 35 is a schematic diagram for explaining frame structures of an input picture and an output picture.
Figure 35B:
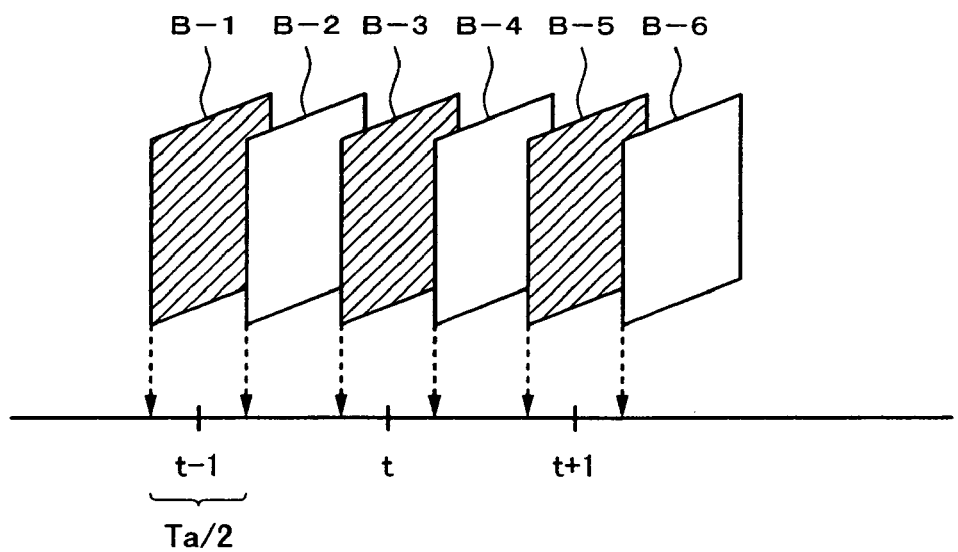

As shown in FIG. 35A, it is assumed that the input picture has a frame structure with a period of Ta. On the other hand, as shown in FIG. 35B, it is assumed that an output picture whose frame rate has been converted has a frame structure with a period of Ta/2. In other words, in this example, the frame rate is doubled.

In the classifying adaptive processing portion 31-1, the multiplex portion 141C performs a classifying adaptive process for generating a frame of an output picture that is chronologically preceded by a frame that composes an input picture. In reality, the classifying adaptive processing portions 31-1 and 31-2 treats a frame in the unit of a pixel. In the classifying adaptive process of the classifying adaptive processing portion 31-1, a frame that composes an output picture is generated. In the example shown in FIG. 35, as shown in FIG. 35B, frames B-2, B-4, and B-6 (white frames in FIG. 35B) of an output picture chronologically followed by frames A-1 to A-3 of an input picture shown in FIG. 35A are generated by the classifying adaptive processing portion 31-1 (see FIG. 35B). The classifying adaptive processing portion 31-1 supplies the generated frames to the selector 22.

The classifying adaptive processing portion 31-2 performs a classifying adaptive process for generating a frame that composes an output picture and that is chronologically followed by a frame that composes an input picture by the multiplexing portion 141C disposed downstream thereof. In the classifying adaptive process of the classifying adaptive processing portion 31-2, another frame that composes the output picture is generated. In the example shown in FIG. 35, as shown in FIG. 35B, frames B-1, B-3, and B-5 (hatched frames shown in FIG. 35B) of an output picture chronologically followed by frames A-1 to A-3 of an input picture shown in FIG. 35A are generated (see FIG. 35B). The classifying adaptive processing portion 31-2 supplies the generated frames to the selector 22.

The selector 22 supplies the frames supplied from the classifying adaptive processing portions 31-1 and 31-2 to the post-processing portion 14. The post-processing portion 14 supplies the frames selected by the selector 140 corresponding to the control signal supplied from the function controlling portion 11 to the multiplexing portion 141C. The multiplexing portion 141C multiplexes the supplied frames in the rule as was described with reference to FIG. 35B and outputs the multiplexed data as output data to an external device. In the process mode (6), in such a manner, the frame rate is converted.

Figure 36:
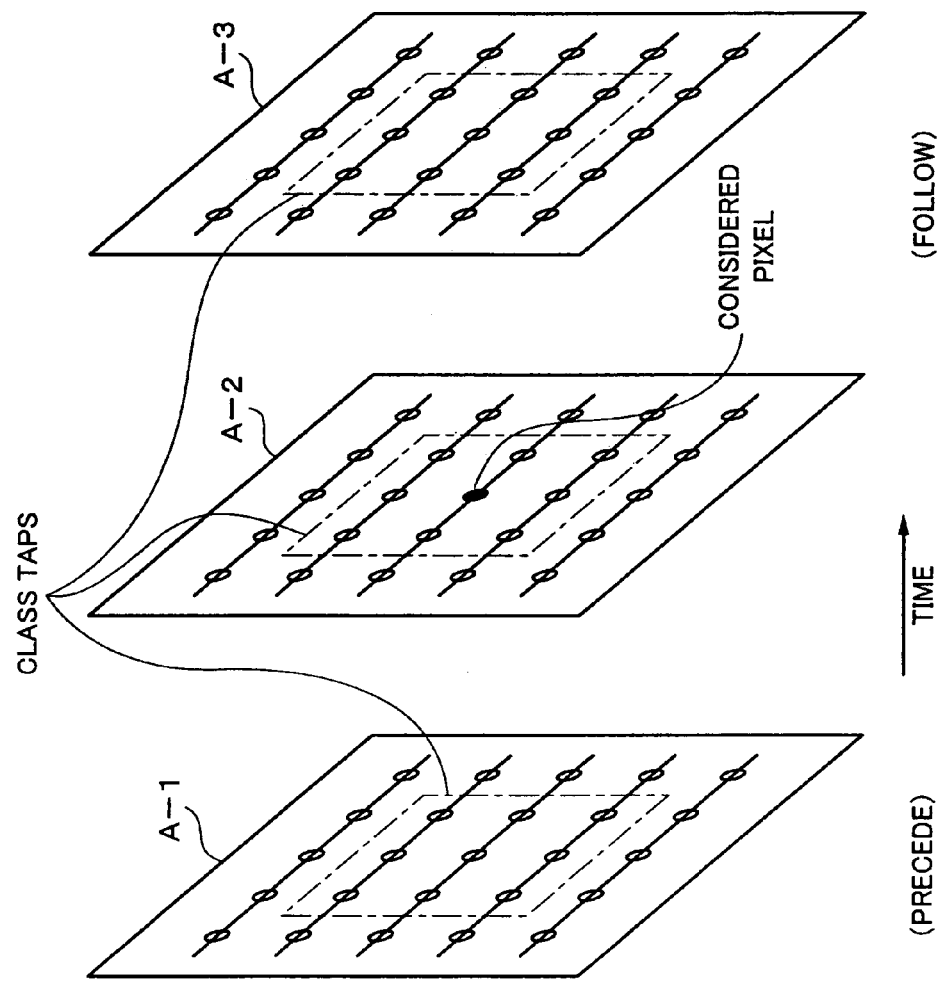
FIG. 36 is a schematic diagram showing an example of class tap extraction information in the process mode (6).

FIG. 36 shows an example of class tap extraction information in the process mode (6). Next, the class tap extraction information will be described with reference to FIG. 35A. In frame A-2 that contains a considered pixel, 3 pixels×3 pixels whose center pixel is the considered pixel are extracted as class taps. In frames A-1 and A-3 that are immediately preceded and followed by frame A-2, pixels corresponding to those extracted as the class taps in frame A-2 are selected as class taps. In other words, in the process mode (6), class taps are composed of 3 pixels×3 pixels×3 frames.

Predictive taps (not shown) include for example frame A-2 that has a considered pixel. A total of five frames composed of frame A-2, two frames preceded by frame A-2, and two frames followed by frame A-2 are extracted. In each of the five frames, 5 pixels×5 pixels wider than class taps by one pixel are extracted. In other words, in the process mode (6), predictive taps are composed of for example 5 pixels×5 pixels×5 frames.

The classifying adaptive process of the classifying adaptive processing portions 31-1 and 31-2 of the input data processing portion 21 may be the same as that of the data processing apparatus 1 in the process mode (1).

In the above description, an example of which the present invention is applied to picture data was explained. However, the present invention is not limited to such an example. In other words, the present invention can be applied to other data such as audio data.

Moreover, in the above description, the data processing apparatus 1 accomplishes the above-described process modes (1) to (6). However, the present invention is not limited to such an example. In other words, in the data processing apparatus 1, with a predetermined predictive coefficient set, a predetermined class tap structure, and a predetermined predictive tap structure, processes other than the process modes (1) to (6) can be accomplished.

The invention claimed is:

1. An information processing apparatus, comprising:
   a plurality of classifying adaptive processing circuits for performing a classifying adaptive process for an input information signal;
   a switching circuit for switching a connection relation among said plurality of classifying adaptive processing circuits;
   a pre-processing circuit for performing a predetermined process for the input information signal and switching the predetermined process as the connection relation is switched,
   wherein the pre-processing circuit includes gain compensating circuits performing gain compensation,
   wherein the information signals are picture data composed of pixel information,
   wherein one of said plurality of classifying adaptive processing circuits is configured for performing the classifying adaptive process for the corresponding input information signal using a prepared luminance signal coefficient and predicting a luminance signal component of the picture data and another one of said plurality of classifying adaptive processing circuits is configured for performing the classifying adaptive process using prepared color difference signal coefficients and predicting color difference components of the picture data so as to separate the picture data into the luminance component and the color difference components, and a function controlling circuit that outputs a control signal to at least the switching circuit and the pre-processing circuit to control the switching.

2. The information processing apparatus as set forth in claim 1,
   wherein at least one of said classifying adaptive processing circuits is configured for switching the corresponding classifying adaptive process for the corresponding information signal as the connection relation of said switching circuit is switched.

3. The information processing apparatus as set forth in claim 2, wherein at least one of said plurality of classifying adaptive processing circuits is configured for switching a coefficient of the corresponding classifying adaptive process so as to switch the process for the corresponding information signal as the connection relation is switched by said switching circuit.

4. The information processing apparatus as set forth in claim 1,
wherein at least one of said plurality of classifying adaptive processing circuit is configured for switching the configuration of extracted pixels as class taps or predictive taps as the connection relation of said switching circuit is switched.

5. The information processing apparatus as set forth in claim 1,
wherein the input information signals are output through said plurality of classifying adaptive processing circuits.

6. The information processing apparatus as set forth in claim 1,
wherein an output of said pre-processing circuit is input to the corresponding one of said plurality of classifying adaptive processing circuits.

7. The information processing apparatus as set forth in claim 1, further comprising:
a post-processing circuit for performing a predetermined process for the corresponding input information signal and switching the predetermined process as the connection relation is switched,
wherein an output of one of said plurality of classifying adaptive circuits is input to said post-processing circuit.

8. The information processing apparatus as set forth in claim 1,
wherein the information signals are picture data composed of pixel information, and
wherein one of said plurality of classifying adaptive processing circuits is configured for performing the classifying adaptive process based on the pixel information of the corresponding input information signal and predicting pixel information that has to be present between the pixel information of the input information signal and pixel information adjacent thereto so as to improve the resolution of the picture data.

9. The information processing apparatus as set forth in claim 1,
wherein one of said plurality of classifying adaptive processing circuits is configured for performing the classifying adaptive process for the corresponding input information signal and obtaining picture data having a first resolution and another one of said plurality of classifying adaptive processing circuits is configured for performing the classifying adaptive process for picture data having the first resolution and obtaining picture data having a second resolution.

10. The information processing apparatus as set forth in claim 1,
wherein the information signals are picture data composed of pixel information and structured in the unit of a frame, and
wherein one of said plurality of classifying adaptive processing circuits is configured for performing the classifying adaptive process for the corresponding information signal that is input in the unit of a frame and generating picture data of frames chronologically preceded and followed by a frame of the input information signal.

* * * * *